United States Patent [19]

Walba et al.

[11] Patent Number: 5,637,256

[45] Date of Patent: Jun. 10, 1997

[54] FERROELECTRIC LIQUID CRYSTALS FOR NONLINEAR OPTICS APPLICATIONS

[75] Inventors: David M. Walba, Boulder, Colo.; Maria B. Ros, Zaragoza, Spain; James A. Rego, Boulder, Colo.; Teresa Sierra, Zaragoza, Spain

[73] Assignee: University Research Corporation, Boulder, Colo.

[21] Appl. No.: 452,038

[22] Filed: May 26, 1995

Related U.S. Application Data

[62] Division of Ser. No. 137,093, filed as PCT/US92/03427, Apr. 24, 1992, Pat. No. 5,543,078, which is a continuation of Ser. No. 690,633, Apr. 24, 1991, abandoned.

[51] Int. Cl.⁶ .................. C09K 19/12; C07C 229/00; C07C 211/00; F21V 9/00
[52] U.S. Cl. .................. 252/299.66; 252/299.01; 252/299.64; 252/299.65; 252/299.67; 252/582; 560/43; 560/48; 564/441; 564/442; 564/443
[58] Field of Search .................. 252/299.01, 299.64, 252/299.65, 299.66, 299.67, 582; 560/43, 48; 564/441, 442, 443; 359/103

[56] References Cited

U.S. PATENT DOCUMENTS

| | | |
|---|---|---|
| 4,594,465 | 6/1986 | Chan . |
| 4,728,458 | 3/1988 | Higuchi et al. . |
| 4,808,333 | 2/1989 | Huynh-Ba et al. . |
| 5,335,303 | 8/1994 | Buchecker .................. 385/122 |
| 5,543,078 | 8/1996 | Walba et al. .................. 252/299.65 |

FOREIGN PATENT DOCUMENTS

| | | |
|---|---|---|
| 63-054336 | 3/1988 | Japan . |
| 63-284147 | 11/1988 | Japan . |
| 2-183231 | 7/1990 | Japan . |
| 2200912 | 8/1988 | United Kingdom . |
| 88/09320 | 12/1988 | WIPO . |

OTHER PUBLICATIONS

Walba et al. (1991) *ACS Symposium Series for Materials for Nonlinear Optics*, Marder et al. (eds.), Apr. 22–27, 1990, pp. 484–496.

Walba et al. (1991) Mol.Cryst. Liq. Cryst. 198:51–60.
Walba et al. (1993) Ferroelectrics 148:435–442.
Kapitza, H. et al. (1990) Abstract of oral presentation at the 13th International Liquid Crystal Conference, Jul. 22–27, 1990, University of British Columbia, Vancounver, BC, Canada.
Kapitza, H. et al. (1990) Adv. Mat. 2(11):539–543.
Walba et al. (1990) Abstract of oral presentation at the 199th National American Chemical Society Meeting, Boston, MA, Apr. 22–27, 1990.

*Primary Examiner*—Shean C. Wu
*Attorney, Agent, or Firm*—Greenlee, Winner and Sullivan, P.C.

[57] ABSTRACT

This invention provides chiral nonracemic compound of formula:

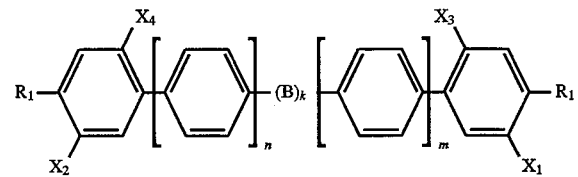

wherein n and m are 0 or 1, but one of n or m must be 1; k=0 or 1; B=COO or OOC; $X_1$, $X_2$, $X_3$ and $X_4$ are either H, an electron donor or an electron acceptor where at least one of the groups $X_1$, $X_2$, $X_3$ or $X_4$ is an electron acceptor and at least one of these groups is an electron donor and when one of $X_1$ or $X_3$ is an electron donor, the other is an electro a acceptor and when one of $X_2$ or $X_4$ is an electron donor, the other is an electron acceptor; and $R_1$ and $R_2$ can be various substituted and unsubstituted alkanes and monoalkenes. Compounds provided include those where one of $R_1$ or $R_2$ is a chiral non-racemic tail group, particularly a group selected from $-O-C^*H(CH_3)R_c$, $-O-C^*H(CH_3)COOR_d$, and $-O-CH_2C^*HF-C^*HF-R_2$ in which the $^*$ indicates an asymmetric carbon enriched in one stereoconfiguration where $R_c$, $R_d$, and $R_e$ can be various substituted and unsubstituted alkanes and monoalkenes. The compounds of this invention are useful in the preparation of FLC mixtures and non-linear optical materials.

42 Claims, No Drawings

FERROELECTRIC LIQUID CRYSTALS FOR NONLINEAR OPTICS APPLICATIONS

This application is a division of U.S. patent application Ser. No. 08/137,093 filed Nov. 19, 1993, now U.S. Pat. No. 5,543,078, which is the U.S. National Stage of PCT Application US92/03427, filed April 24, 1993, which is a continuation of U.S. patent application Ser. No. 07/690,633, filed Apr. 24, 1991, now abandoned. U.S. patent application Ser. No. 08/137,093 is incorporated by reference in its entirety herein.

This invention was made with at least partial support of the United States Government which has certain rights in this invention.

FIELD OF THE INVENTION

The present invention relates to liquid crystal compounds possessing molecular and supermolecular structure providing large bulk electronic second order nonlinear optical hyperpolarizability $X^{(2)}$ in easily processible optical quality films. These materials, which are ferroelectric liquid crystals (FLCs), have application in fast optical processing and switching devices.

BACKGROUND OF THE INVENTION

The bulk electrical polarization P of a material in an electric field (or the electric part of an optical field) may be expanded in powers of the field according to equ 1, where $P_s$ is the spontaneous polarization (i.e. polarization present in the absence of applied field, $X^{(1)}$ is the linear polarizability, $X^{(2)}$ is the second order nonlinear hyperpolarizability, or second order nonlinear susceptibility, $X^{(3)}$ is the third order nonlinear hyperpolarizability or third order nonlinear susceptibility. The subscripts i, j, k etc. correspond to the Cartesian coordinates x, y, or z for the system (Williams, D. J., (1984) Angew. Chem. Int. Ed. Engl. 23:690–703).

$$P = P_s + X_{ij}^{(1)} E_j + X_{ijk}^{(2)} E_j E_k + X_{ijkl}^{(3)} E_j E_k E_l + \ldots \quad \text{equ 1}$$

The sum of all terms to the right of $P_s$ in equ 1 give the induced bulk polarization in response to an applied field or fields. The spontaneous polarization $P_s$ is a vector, while the susceptibilities $X^{(1)}$ etc. are tensors with component values which are dependent upon the frequency of the applied fields. The square of $X^{(1)}$ driven by a DC or low frequency AC field is proportional to the dielectric constant of the material, while the square of $X^{(1)}$ driven by an optical frequency AC field is proportional to the refractive index of the material. All materials possess non-zero $X^{(1)}$ and $X^{(3)}$. There are certain symmetry requirements for $P_s$ and for $X^{(2)}$, however. Thus, in order to possess non-zero $P_s$, the system must have polar symmetry. Furthermore, within the electronic dipolar model, $X^{(2)}$ is zero unless the system possesses noncentrosymmetric symmetry (acentric). All materials with polar symmetry are acentric, but not all acentric materials are polar. Thus it is possible for a material to possess strictly zero $P_s$ by symmetry, but non-zero $X^{(2)}$ in the electronic dipolar model.

Materials possessing non-zero $X^{(2)}$ exhibit many effects of great current and potential utility. These include but are not limited to: 1) Second harmonic generation (SHG); 2) Sum and difference frequency generation; 3) Optical parametric amplification; 4) Optical rectification; and 5) A linear electrooptic effect (Pockel's effect). Effects 1, 2 and 3 depend upon the induction of optical frequency AC polarizations (or charge flow in the material changing in sign or magnitude at optical frequencies) in the material in response to optical frequency AC applied fields, and therefore derive from optical frequency $X^{(2)}$ values. These values of $X^{(2)}$ may be termed "ultrafast".

In general, the ultrafast $X^{(2)}$ is a lower limit, and the induced polarization in response to lower frequency applied fields will in general be larger (i.e. $X^{(2)}$ generally increases with decreasing driving field frequency, though the increase is not monotonic). Very large increases in $X^{(2)}$ occur at frequencies where resonant absorption of the driving radiation occurs. For the applications of interest in this invention, however, non-resonant interactions of the material with driving and induced fields are preferred.

Currently $X^{(2)}$ materials are utilized extensively for frequency conversion (effects 1 and 2 above), and more experimentally in electro-optic modulators (effect 5). Typically these materials are inorganic single crystals (for example single crystals of potassium dihydrogen phosphate (KDP) or lithium niobate (LiNbO$_3$). For many applications, particularly in the emerging opto-electronics and photonics industry, easily processible thin films possessing $X^{(2)}$ are of great potential utility. Uses of $X^{(2)}$ thin films include, for example, electro-optic switching and frequency processing in guided-wave geometries. Guided-wave geometries are useful in, for example, integrated optical circuits or specialized devices such as optical parametric amplifiers or electro-optic modulators.

For some of these potential applications, the film must work in concert with other materials, such as silicon or other semiconductor integrated circuits. This requires that the film be processed onto or with the semiconductor or other material in a controlled way, affording a hybrid device. In some thin film applications inorganic crystals are relatively difficult to utilize, being difficult to hybridize with semiconductors.

It has been known for some time that organic materials possess potential advantages in $X^{(2)}$ applications (see Prasad, P. N., (1990) Chem. Mater. 2(6):660–669). These include: 1) Easy processibility relative to inorganic crystals; and 2) Potentially large and relatively easily tuned values of the $X^{(2)}$ components. The potential for easy processibility derives by analogy to the relatively easy creation of, for example, organic polymer and liquid crystal films of optical quality. The potential for large $X^{(2)}$ derives in part from experimentally determined values of the molecular susceptibilities of organic molecules. Thus, the polarization of a molecule in the presence of applied electric fields is given by equ 2, where μ is the molecular dipole moment, α is the molecular linear polarizability, β is the molecular second order hyperpolarizability, etc.

$$P = \mu + \alpha_{ij}^{(1)} E_j + \beta_{ijk}^{(2)} E_j E_k + \gamma_{ijkl}^{(3)} E_j E_k E_l + \ldots \quad \text{equ 2}$$

Using the technique of, for example, electric field induced second harmonic generation (EFISH) in isotropic solutions, it is possible to measure the magnitude of certain components of β for many organic molecules. A fairly good estimate of $X^{(2)}$ may be made based upon these β values, and using such estimates, it may be shown that $X^{(2)}$ for organic materials may in principle be much larger than those exhibited by inorganic crystals (Prasad, P. N., (1990) supra).

Finally, the potential for tunability derives from the great structural diversity of organic molecules combined with some relatively simple models for the molecular origins of β. Thus, while the level of understanding of the molecular origins of β is not quantitative, it is easy to predict qualitatively the magnitude of β expected for new organic molecules using the "two-state model" (Williams, D. J., (1984)

supra and Prasad, P. N., (1990) supra). In this model, using the valence bond structures of the ground and first electronically excited states one may calculate the expected β value in response to driving fields far from resonance. At the current state of the art, these calculations give only a qualitative picture of the hyperpolarizability of the molecules.

More simply, it is generally appreciated that the molecular β increases with increasing difference in molecular dipole moment of the ground state and first electronically excited state of the molecule. Furthermore it is generally known that this occurs when a donor group and an acceptor group are oriented ortho or para on a benzene ring. Donor and acceptor refer to the ability of the group to either donate electron density (donor) or donate positive charge density (acceptor) to an aromatic ring. When the donor and acceptor are regiochemically placed on the benzene ring such that negative charge transfer from the donor to the acceptor can occur according to simple resonance arguments (i.e. they are conjugated), then a large β should result. With a single benzene ring the conjugated substituents are ortho or para, as indicated in the following diagram for p-nitroaniline—a prototypical organic NLO molecule. An axis, termed here the "β axis", may be defined for such molecules. This axis is along the line connecting the donor substituent with the acceptor substituent. If the molecular coordinate system is defined such that the β axis is along y, then $\beta_{y,yy}$ will be a large component of the β tensor.

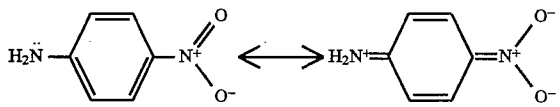

Furthermore, it is understood that the larger the distance between the donor and acceptor, the larger the β which will result for a given donor-acceptor pair (β goes up approximately as the square of the distance separating the donor and acceptor). Thus, para nitroaniline has a larger β than the ortho isomer. Furthermore, conjugation between the donor and acceptor can be across a larger grouping than one benzene ring, as long as the conjugation is not broken. Thus, stilbenes, tolanes, and diphenyl azo compounds substituted at the p-p' positions with donor and acceptor groups possess very large β values, with the β axis on the line between the donor and acceptor, stilbenes and azo compounds larger than tolanes. The prototypical organic molecule with very large β is disperse red 1, a diphenyl azo compound, whose ground state structure and charge transfer resonance structure are:

wavelengths where glass fiber has the minimum dispersion (>1.0 μm) the red shift in $\lambda_{max}$ for the NLO molecules may not be a disadvantage.

From the above discussion and data it can be seen that organic molecules may be designed qualitatively to possess a given β value consistent with a given $\lambda_{max}$. It is not the subject of this invention to teach new donor-acceptor pairs or new conjugating spacers. Rather, this invention can take advantage of most known or new donor-acceptor pairs, and also known or new conjugating spacers.

It is known that in order to possess useful $X^{(2)}$ the NLO molecules must be combined to create a material, in some cases a thin film, and in some cases a bulk sample, typically much larger than the size of the molecules, but possessing acentric symmetry (Williams, D. J., (1984) supra and Prasad, P. N. (1990) supra). Furthermore, it is sufficient but not necessary for the material to possess polar order. Furthermore, it is understood that when the donor, acceptor and conjugating spacer (the β axis) lie on or close to a polar axis of a medium with polar order, and are oriented along the polar axis in a polar fashion, then the $X^{(2)}$ of the material is optimized for that donor-conjugating spacer-acceptor unit.

Several methods for achieving the combination of the NLO molecules into the desired $X^{(2)}$ material are known. These include: 1) Single crystals or oriented microcrystalline solids (see for example Marder, S. R., et al., (1989) Science 245:626–628); 2) Langmuir-Blodgett multilayers or self-assembling multilayers (see for example Popovitz-Biro, R., et al., (1988) J. Am. Chem. Soc. 110(8):2672–2674) and Tillman, N., et al., (1988) J. Am. Chem. Soc. 110:6136–6144); and 3) Electrically poled polymer films (see for example Williams, D. J. (1984) supra, Dembek, A. A., et al., (1990) Chemistry of Materials 2(2):97–99, and Park, J., et al., (1990) Chem. Mater. 2:229–231). The present invention provides a new method for achieving the NLO material by combining donor-conjugating spacer-acceptor arrays (the β axis) oriented with good polar order along the polar axis of ferroelectric liquid crystal samples, which are typically but not necessarily thin films. Furthermore, the method of the present invention possesses important advantages over any of the previously existing methods.

It is known that often the molecular β impart a large molecular dipole moment in the ground state along the β axis, and that upon crystallization, these units often orient antiparallel to afford centrosymmetric symmetry in the crystal. Thus, for example, p-nitroaniline, while possessing a useful β value, gives centrosymmetric crystals with very small or zero $X^{(2)}$ (exactly zero in the electronic dipolar model).

It is also known that it is often possible by relatively small modifications to the structure of the molecules, to obtain

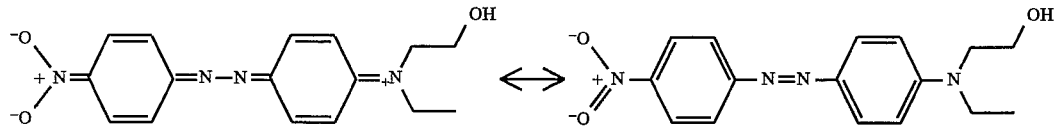

Furthermore, it is known that when β gets large with increasing conjugation, then the farthest red resonant electronic absorption peak ($\lambda_{max}$) is red-shifted, leading to increased resonant absorption at longer wavelengths close to $\lambda_{max}$ relative to a molecule with less conjugation or a smaller conjugation length. For some applications blue-shifted resonant absorption (i.e. towards the UV, affording more visible clarity) is advantageous, such as frequency doubling into the blue part of the visible spectrum. For some applications, such as electro-optic modulators which typically operate at polar crystals with good polar orientation of the β axis along the polar axis. Thus, for example, when the p-nitroaniline molecule is substituted with a methyl group ortho to the nitro grouping, the resulting methyl nitroaniline (MNA) fortuitously crystallizes with appropriate symmetry for $X^{(2)}$, and indeed MNA crystals have a very large $X^{(2)}$ value with moderate resonant visible absorption.

It is also known that organic single crystals, especially those formed from non-ionic molecules, often called Van der Waals crystals, are typically difficult to process into optical quality materials. This may be due to the fact that crystal growth is a kinetic, rather than a thermodynamic phenomenon, and crystal nucleation at multiple sites leads to the formation of domain wall defects which scatter light. The scattering of light from defects is highly undesirable in NLO materials. Furthermore, it is also difficult to control the organic crystal growth in thin film applications, especially for hybrid devices where the organic film must be oriented correctly on a specific substrate surface.

This lack of processibility presents a major disadvantage of organic crystals for $X^{(2)}$ applications. The problems with crystals led to the invention of several alternative approaches, especially for thin film applications. Two such approaches involve growing a crystalline or non-crystalline film from a substrate one molecular monolayer at a time. In the Langmuir-Blodgett method, NLO molecules are synthesized such that they also form monolayers (LB films) on water. This is achieved by controlling the hydrophilicity and hydrophoebicity of parts of the molecules, and can lead to excellent control over the orientation of molecular fragments, including the functional arrays affording large $\beta$, in the monolayers on water.

By careful dipping of a substrate into the monolayer film it is possible to deposit the monolayer with good structural control onto the surface of the substrate. Additional dipping cycles, with additional methods needed to achieve bulk polar order, can afford multilayers with appropriate structure for $X^{(2)}$. In a somewhat related process, it is possible with correctly designed NLO molecules possessing reactive functional groupings to dip a substrate into an isotropic solution of NLO molecules, and obtain a structurally well-defined monolayer covalently bound to the substrate. Chemical modification of the resulting new surface to introduce appropriate reactivity at the surface, followed by another dipping cycle, etc., can afford multilayers with structure appropriate for NLO applications.

In both of these approaches, many dipping cycles (>1,000) are required to achieve materials of good utility for NLO applications. Furthermore, the structural stability of the resulting multilayers, especially the LB multilayers, is not currently known. In addition, the optical quality achievable for such films is not known. Finally, these techniques are inefficient in time, and presumably cost, and limit the possible geometries of the $\beta$ axis relative to the substrate surface since for all known examples the polar axis must be normal to the substrate surface. These factors represent disadvantages of the multilayer approaches for creation of $X^{(2)}$ thin films.

Molecules possessing a dipole moment and $X^{(2)}$ axis (typically colinear) can be either doped into a polymer matrix, or covalently attached to the polymer matrix. When such polymer matrix is then heated to a temperature above a glass transition temperature and subjected to an electric field, the NLO molecules will tend to align with their dipoles parallel to the field, affording the bulk polar order giving $X^{(2)}$. If the field is removed, the NLO molecules rapidly revert to their random state, destroying the $X^{(2)}$ of the sample. However, if the sample is cooled with the field applied below the polymer glass transition, then the polar order induced by the field can be "frozen" into the sample. The field can then be removed to give an optical quality film with useful $X^{(2)}$.

It is known that such films are typically unstable over time. That is, the NLO molecules, whether covalently attached to the polymer molecules, or doped into the polymer, will over time randomize their orientation, destroying some of the $X^{(2)}$ of the sample. While many approaches for stabilizing the polar order present in such films are being explored (chiefly cross-linking of the polymer lattice to stabilize the positions of the molecules temporally), the polar order in such films in the absence of applied fields is inherently unstable thermodynamically. In addition, the degree of orientation of the molecular $\beta$ axis along the polar axis achievable with the largest possible poling electric fields is relatively poor. The good optical quality of non-crystalline or microcrystalline polymer films, and their relative ease of manufacture, are advantages of the poled polymer method for creating $X^{(2)}$ films. The thermodynamic instability of $X^{(2)}$ poled polymers and the poor degree of structural control in the films are disadvantages of the method.

In liquid crystals (LCs), mesogen molecules spontaneously self-assemble into true fluids which are anisotropic. Typically, the mesogens are rod-shaped molecules. The long axis of the molecules, and also the optic axis of the LC phase, is called the director, which is represented by the unit vector n̂. It is relevant for the present invention that for all known LC phases, all properties of the phases are invariant with sign of the director (often represented as n̂→-n̂). Thus, there is no spontaneous polar order along the director for any known LC phases.

When the liquid crystal is such that the molecules self-assemble into a layered structure, the liquid crystal phase is called smectic. Smectic LCs may be considered as a stack of 2-dimensional fluid phases each approximately one molecular length in thickness. There are many smectic LC structures. In some of these, the director is tilted coherently with respect to the layer normal (ẑ), affording a tilted, layered structure. In this case, the thickness of the molecular layers is typically smaller than the molecular length. The plane containing n̂ and ẑ is termed the tilt plane.

While there is no fundamental reason why smectic C phases cannot possess spontaneous polar order, to our knowledge no smectic C phase possessing such order has ever been reported. Thus, all known smectic C phases possess the following symmetry elements for the phase: 1) A $C_2$ axis of symmetry normal to the tilt plane (satisfying the empirical fact that n̂→-n̂); and 2) A $\sigma$ (mirror) plane congruent with the tilt plane. Thus, known smectic C phases possess a center of symmetry, i.e. they are centrosymmetric, and therefore possess zero $X^{(2)}$ in the electronic dipolar model.

When a medium is composed of chirally asymmetric molecules, such medium must be acentric, since the medium cannot possess any reflection symmetry. This is true for all media, including specifically isotropic liquids, all LC phases, and all crystalline or amorphous materials (Giordmaine, J. A., (1965) Phys. Rev. 138(6A):A1599–1606, Rentzepis, P. M., et al., (1966) Phys. Rev. Lett. 16(18):792–794). The chirality does not, however, force polar order on the system.

For example, it has been demonstrated that chiral, isotropic liquids such as solutions of sugar molecules in water possess non-zero $X^{(2)}$ due to the acentricity of the medium (Rentzepis, P. M. (1966) supra). In such isotropic liquids there is no polar order, and thus no possibility for orientation of a molecular $\beta$ axis along a polar axis. In general, it is known that orientation of a large $\beta$ axis along a polar axis is a valid method for achieving large $X^{(2)}$. It is known that the $X^{(2)}$ occurring in acentric isotropic liquids is small.

Furthermore, chiral molecules possessing large $\beta$ are often utilized for growth of crystals for $X^{(2)}$ applications. Such crystals must be acentric, and may or may not possess polar order. However, even when polar order exists, in order to achieve large $X^{(2)}$ it is generally appreciated that the $\beta$ axis should be oriented along the polar axis. If the $\beta$ axis is not oriented along the polar axis, small $X^{(2)}$ will result.

When molecules in the smectic C or any other tilted smectic phase are made chirally asymmetric, then by symmetry considerations the phase must possess polar order in addition to acentricity. That is, all chiral fluid media (and non-fluid media) are acentric, but for known fluids, only in the tilted, layered LC case does the chirality also impart polar order upon the system (Walba, D. M. (1991) Ferroelectric Liquid Crystals: A Unique State of Matter. In: Mallouk T. E., ed. Advances in the Synthesis and Reactivity of Solids, Vol 1. Greenwich, Connecticut: JAI Press Ltd 173–235). In the case of the smectic C phase, such a chiral smectic C phase is denoted as the smectic C* phase, which must possess polar order, its symmetry elements being limited to one $C_2$ axis of symmetry, congruent with the polar axis of the phase, and oriented normal to the tilt plane. Such chiral, tilted, layered LCs are the only known fluids possessing thermodynamically stable polar order.

Typically, the polar order occurring smectic C* phases causes the spontaneous formation of a macroscopic electric dipole moment for the phase. The direction of this macroscopic dipole moment switches upon application of an external electric field, though external fields are not required for the macroscopic dipole to exist. Chiral smectic C* phases, and other chiral tilted, layered LC phases, are thus typically ferroelectric, and are often termed ferroelectric liquid crystals (FLCs) (Walba, D. M. (1991) supra). It is understood that this term includes all chiral, tilted, layered LC phases.

The macroscopic dipole moment of the phase present in the absence of applied electric fields is termed the ferroelectric polarization, P, which is the same as $P_s$ in equation 1. This polarization derives from the orientation of molecular dipoles ($\mu$ in equation 2) along the polar axis of the phase. The polarization P has a sign, which by arbitrary convention is positive when P (from negative to positive poles) points along the unit vector $\hat{z} \times \hat{n}$, and negative when P is opposed to $\hat{z} \times \hat{n}$. Enantiomeric (i.e. mirror image) FLC phases possess exactly equal magnitude but opposite sign of P (Walba, D. M. (1991) supra).

The experimental fact that FLCs possess polar order means that FLCs must possess non-zero $X^{(2)}$ in the electronic dipolar model. In addition, may FLC mesogens, including, for example, DOBAMBC, the first FLC ever reported, also possess functional arrays expected to have large $\beta$. Thus, DOBAMBC and many other FLCs possess polar order and are composed of molecules with large $\beta$.

However, the measured values of the ultrafast $X^{(2)}$ in previously known FLCs are very small. Table 1 lists the values of $X^{(2)}$ for several exemplary known FLC materials as measured by the angle phase-matched SHG technique (see Taguchi, A., et al., (1989) Jpn. J. Appl. Phys. 28(6):L 997-L 999. and Liu, J. Y., et al., (1990) Optics Letters 15(5):267–269). Here, $X^{(2)}$ is given as values for the d-tensor coefficients (d=$X^{(2)}$ for SHG). For DOBAMBC and the commercial mixture ZLI 3654, only $d_{eff}$ is given. This value derives from a geometrical combination of various d coefficients, and the square of $d_{eff}$ is proportional to the intensity of second harmonic light output from the sample at the top on an angle phase-matched peak. Experiments providing the values of all non-zero components of the d tensor for the commercial mixture SCE 9 in the homeotropic alignment geometry have been accomplished, said values given in the table (Liu (1990) supra). Note that there is some correlation between the polarization of the sample and the observed $d_{eff}$. This correlation can be indicative, but is not rigorous.

TABLE 1

Values of the ferroelectric polarization, SHG efficiency, and $X^{(2)}$ ($d_{eff}$ and d coefficients), for representative previously known FLCs. Values for some common inorganic NLO crystals are included for comparison.

| Entry number | compound | P (nC/cm²) | SHG arb units* | $d_{eff}$ (pm/V) | d coefficients (pm/V) |
|---|---|---|---|---|---|
| 1 | DOBAMBC[a] | −3 | 1 | 0.0008 | |
| 2 | ZLI 3654[b] | −29 | 40 | 0.005 | |
| 3 | SCE 9[c] | +33.6 | 160 | 0.01 | $d_{2,3}$ = 0.073 |
| | | | | | $d_{2,2}$ = 0.027 |
| | | | | | $d_{2,1}$ =0.0026 |
| | | | | | $d_{2,5}$ = 0.0009 |
| 4 | KDP[d] | | | | $d_{3,6}$ = 0.38 |
| 5 | 5% MgO:LiNbO$_3$[d] | | | | $d_{3,1}$ = −4.7 |

*Intensity of the second harmonic light at the top of the type 1 eeo angle phase-matched peak.
[a]Vtyurin, A. N., et al., (1981) Phys. Status Solidi B 107(2):397–402.
[b]Taguchi (1989) supra.
[c]Liu (1990) supra.
[d]Eckardt, R. C., et al., (1990) IEEE Journal of Quantum Electronics 26(5):922–933.

As can be seen from Table 1, the values of the largest d coefficients (one measure of $X^{(2)}$) for the known FLCs which have been evaluated for $X^{(2)}$ are small relative to the known $X^{(2)}$ crystal KDP. This may be due to a combination of two factors: 1) The $\beta$ axis in FLCs is generally oriented along $\hat{n}$, and there is no polar order along $\hat{n}$; and 2) The degree of net polar order, as evidenced by the magnitude of the macroscopic polarization, is poor.

In this invention we provide a general approach for obtaining molecules which, when introduced into an FLC phase either as a pure mesogen, or component of an FLC mixture, will impart large $X^{(2)}$ to the FLC phase by orientation of a $\beta$ axis of the molecules along the polar axis in the FLC phase, and by achieving a high degree of polar order.

Typical thermotropic LC mesogens or components possess structures combining a rigid core with two relatively "floppy" tails (see Demus et at. (1974) Flüssige Kristalle in Taballen, VEB Deutscher Verlag für Grundstoffindustrie, Liebzig for a compilation of the molecular structures of LC molecules). FLC materials have been prepared by introduction of at least one stereocenter in at least of of the tails. Thus, referring to the general formula A, the rigid core can be, for example, benzylideneamino cinnamyl, biphenyl, phenylbenzoate, phenylpyrimidine or biphenylbenzoate, X and/or Y can be oxygen or $CH_2$, R' is an achiral alkyl grouping with from five to twelve carbon atoms, and R* is a chiral moiety.

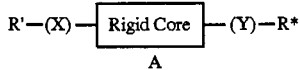

A

The FLCs reported to date are generally designed for use in the Clark-Lagerwaal surface stabilized FLC light valve (Clark, N. A., et al., (1980) Appl. Phys. Lett. 36(11):899–901), or other similar light modulation technology involving large nuclear motions of the FLC molecules for switching in response to applied DC fields or low frequency AC fields (<100 MHz). For such FLCs, an important figure of merit is the characteristic response time of the cell (T), given approximately by equ 3:

$$\tau = \frac{\eta}{PE} \quad \text{equ 3}$$

where $\eta$ is the orientational viscosity and P is the magnitude of the ferroelectric polarization density. The polarization typically derives from the type of chiral tail used, while the viscosity is a function of the core and chiral tail. The first FLC compound to be characterized was DOBAMBC, which contains a benzylideneaminocinnamyl core, a n-decyloxy achiral tail and 2-methylbutyloxy chiral tail. As shown in Table 1, pure DOBAMBC exhibits a smectic C* phase with a ferroelectric polarization of –3 $nC/cm^2$.

There are a number of reports of compounds containing phenylbenzoate, biphenylbenzoate, tolane, diphenyldiacetylene and related cores coupled to 1-methylalkyloxy or lactate chiral tail units which possess monotropic smectic C* phases affording useful switching properties in the Clark-Lagerwaal SSFLC light valve, or which can be employed as FLC dopants to induce high polarization, fast switching speeds, high tilt angle, high birefringence, or other useful properties when combined in mixtures with FLC host materials.

The following are exemplary reports of such FLC compounds:

Furukawa, K. et al. (1988) Ferroelectrics 85:451–459 refers to chiral smectic C compounds having an ester group in the core and an optically active tail group, either alkoxy or alkoxy carbonyl, with an electronegative substituent, either halogen or cyano group, ortho to the chiral tail, for example:

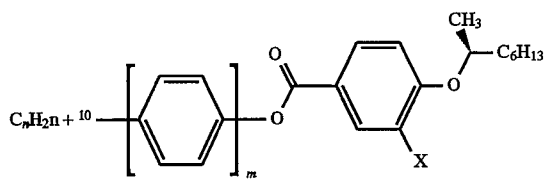

where m=2, X=H, Halogen or CN.

Walba, et. al. (1991) Ferroelectrics 113:21–36 and Walba and Otterholm, U.S. patent application Ser. No. 542,838 refers to FLC components possessing the 1-methylheptyloxy chiral tail unit in combination with pyridine and pyridine-N-oxide core units, where the nitrogen atom of the pyridine ring is adjacent to the point of attachment of the chiral tail, with formula:

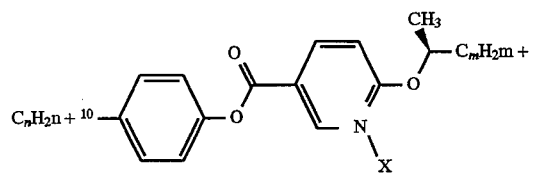

where X=an electron lone pair or oxygen.

It has been demonstrated in Walba, et. al., (1989) J. Chem. Soc. 111:8273–8274 and U.S. patent appl. 07/543,160 that for some side-chain ferroelectric liquid crystal polymers composed of a polymer backbone substituted with mesogenic units wherein the achiral tail provides the connection between the polymer backbone and the mesogenic units, the mesogenic unit in the polymer imparts ferroelectric polarization similarly to the low molar mass mesogen itself, though the switching speeds and alignment properties of such polymers are different than the low molar mass mesogens, the switching speeds generally being slower. An exemplary FLC side chain polymer has formula:

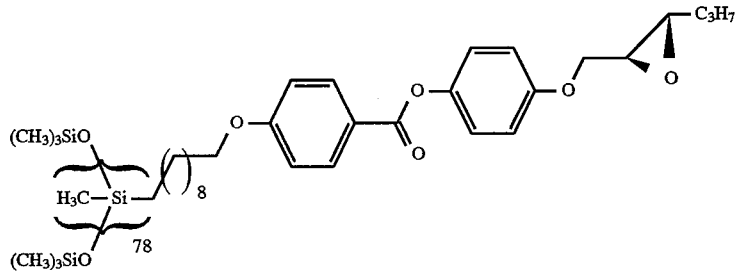

Kapitza et al., (1990) Adv. Mater. 2:539–543 have disclosed side chain FLC siloxane polymers and copolymers of formula:

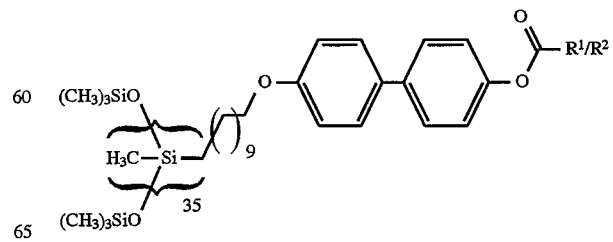

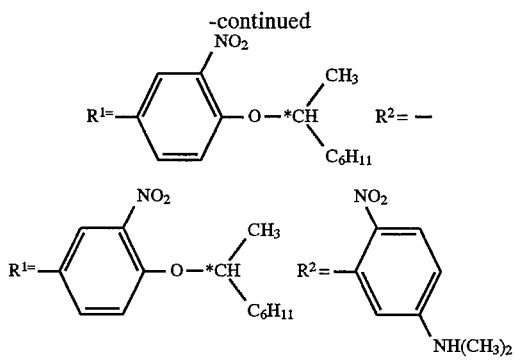

While a number of FLCs (both pure compounds and mixtures) useful in the Clark-Lagerwaal device geometry and other related devices involving large nuclear motions in response to applied fields have been reported, there has been very little work aimed at creating FLCs for electronic NLO applications. Indeed, it has been commonly known in the art of NLO materials design that FLCs are not useful in applications where the medium must respond strongly and quickly to applied fields (either respond to DC or low frequency fields in times less than 10 nsec, or respond to AC fields with frequencies larger than 100 MHz). Such applications require response with small or no nuclear motions. For example, SHG requires response of the material to optical frequency AC applied fields, at which frequencies the molecular nuclei cannot respond.

SUMMARY OF THE INVENTION

It is the object of the present invention to provide new classes of LC and FLC compounds with large $X^{(2)}$. The present invention provides FLC compounds and/or components of the formula:

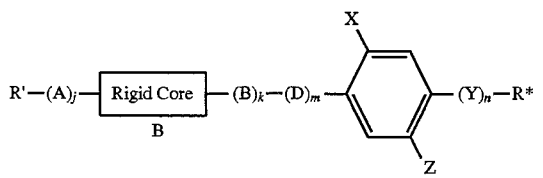

where Z is either an electron donor or acceptor, and cannot be H,
where X is H, a donor, or acceptor grouping, and when Z is an acceptor, X is H or is a donor, and when Z is a donor, X is H or an acceptor,
where j=0, or j=1 and A is O, $(NR_1)$, $(O_2C)$, (CO), $(CO_2)$, $(N(R_1)CO)$, or $(CON(R_1))$ and $R_1$=H, or small alkyl, where n=0, or n=1,
where k=0, or k=1 and (B) is $(O_2C)$, $(CO_2)$, $(N(R_2)CO)$, $(CON(R_2))$, (C≡N) or (N≡C), and $R_2$=H or small alkyl,
where m=0, or m=from 1 to 4 and (D) is (C≡C), (C≡N), (N≡C), (N≡N) or (C≡C), and when m≠0, then (B) ≠ $CO_2$ or $(CON(R_2))$,
where the Rigid Core is a liquid crystal core unit, including but not limited to 1,4-phenylene, 4,4'-biphenyl and substituted aryl rings such as phenylbenzoate rings, an aromatic heterocyclic ring or rings and substituted rings such as phenylpyridines and phenylpyrimidines, 1,4-disubstituted cyclohexyl, [2,2,2]-bicyclooctane ring or rings, [1,1,1]-bicyclopentane ring or rings, cubane ring or rings, or any combination of such ring or rings, and where R' is a straight chain or branched alkyl group having from 1 to 20 carbon atoms which can be chiral or achiral, and R* is a chiral grouping. For use as liquid crystal materials, R', which is an alkyl group or mono alkenyl group, preferably contains 5 to 12 carbon atoms, and where one or more of the non-neighboring carbon atoms in R' can be O, S, or $Si(CH_3)_2$, and R* is a chiral grouping which affords core coupling such that the functional array (Z—Ar—X) is oriented in a polar fashion in the FLC phase, close to the polar axis of the FLC phase.

Where R* is $((Y)_nC^*H(CH_3)R)$ where n=0, or n=1 and Y is O, $NR_3$, or (CO), where $R_3$ is H or small alkyl, where the tetrahedral stereocenter indicated by the asterisk is enriched in one configuration, and where R is a straight chain or branched alkyl having from 2 to 15 carbon atoms and where one or more of the non-neighboring carbon atoms in R can be O, S, or $Si(CH_3)_2$, or where R is $(CO_2R_4)$ where $R_4$ is methyl or an alkyl with from 2 to 13 carbon atoms and where one or more of the non-neighboring carbon atoms in $R_4$ can be O, S, or $Si(CH_3)_2$, or where R* is $((Y) CH_2C^*HFC^*HFR)$, where Y is O $NR_5$, where $R_5$ is H or small alkyl, R is a straight chain or branched alkyl having from 2 to about 11 carbon atoms and where one or more of the non-neighboring carbon atoms in R can be O, S, or $Si(CH_3)_2$ and where the indicated stereocenters considered together are enriched in either the (S), (S) or (R), (R) configurations.

The acceptor groupings useful for X and Z include any grouping known in the art to be an electron acceptor (for example, any grouping causing deactivation of an aromatic ring relative to benzene in an electrophilic aromatic substitution reaction), which includes halogen, (CN), (COR), $(CO_2R)$, $(CON(R)_2)$, $(SO_2R')$, and $(NO_2)$ where R is H or small alkyl, and R' is small alkyl. It is known in the art that for obtaining large molecular β the $NO_2$ grouping is preferred to halogen or (CN). In addition, the $(SO_2CF_2R)$ grouping, where R is alkyl, is a preferred acceptor, and the tricyanovinyl grouping $(C(CN)=C(CN)_2)$ is a preferred acceptor. For ferroelectric liquid crystals, the $NO_2$ and $(SO_2CF_3)$ are preferred. Furthermore, the $(NHCOCH_3)$ grouping can be an acceptor if the lone pair on nitrogen is unable to interact with the aromatic ring in a resonance sense.

The donor groupings useful for X and Z include any grouping known in the art to be an electron donor (for example any grouping causing activation of an aromatic ring relative to benzene in an electrophilic aromatic substitution reaction), which includes (OR), $(N(R)_2)$, (N(R)CO(R')), (OCOR), where R and R' are H or small alkyl, or other atom less electronegative than halogen and where the atom connected to the aromatic ring possesses a lone pair able to interact with the aromatic ring in a resonance sense.

When Z is an acceptor grouping, then when n=1, Y=O or $NR_3$ is preferred. When Z is a donor grouping, then when n=1, Y=(CO) is preferred, Preferred D is (C≡C) and preferred B are $CO_2$, $O_2C$ except that if m≠0, then B≠$CO_2$.

The present invention also provides FLC compounds and/or components of the formula:

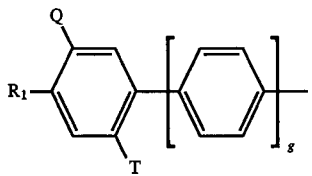 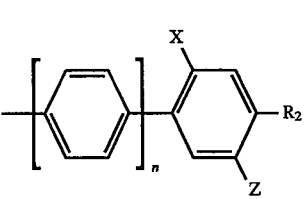

Where Z, X, B and D are as defined above, where Q and T are both H; T is H or an electron donor when Q is an electron acceptor or T is H or an electron acceptor when Q is an electron donor;

where $R_2$ must be a chiral R' group or R* and $R_1$ can be R' or R* where R' and R* are as defined above;

when $R_1=R_2$, then Z and Q are either both donors or both acceptors, and T and X are independently H or an acceptor when Q and Z are donors, or H and a donor when Q and Z are acceptors, and when both $R_1$ and $R_2$ are chiral, but $R_1 \neq R_2$, and $R_1$ and $R_2$ both impart the same sign of P when used individually, then Z and Q are either both donors or both acceptors, and T and X are independently H or an acceptor when Q and Z are donors, and T is H or a donor when Q and Z are acceptors, or when both $R_1$ and $R_2$ are chiral, $R_1 \neq R_2$ and $R_1$ and $R_2$ afford opposite sign of P when used individually, then Z is a donor when Q is an acceptor, and Z is an acceptor when Q is a donor, and T is H or an acceptor when Q is a donor, and T is H or a donor when Q is an acceptor, and X is H or an acceptor when Z is a donor, and X is H or a donor when T is an acceptor, and where n=0 or 1 and g=0 or 1, and where E and F are defined as D and B above, respectively, and where h can be 0 or 1 to 4 and m can be 0 or 1 to 4 independently, and where i and k can be 0 or 1, independently.

Preferably $h+m \leq 4$, k=0 when $m \neq 0$, i=0 when $h \neq 0$, m=0 when k=1, and h=0 when i=1. More preferably, k and h=1 while i and m are both 0 or i and m=1 while both k and h=0.

The rigid core is preferably a 1,4-phenylene

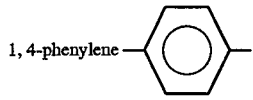

or a

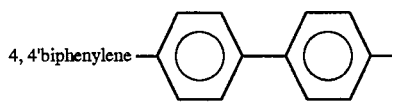

Preferably the numbers of rings in the compound is 3 or 4.

In a specific embodiment, this invention provides chiral, nonracemic compounds of formula I:

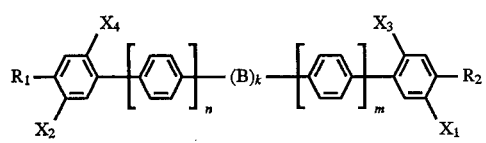

where k=0 or 1, when k=1, B=COO;
n and m, independently of one another are 0 or 1;
$R_1$ and $R_2$ are an $OR_a$, —$COOR_b$ or an R* group such that at least one of $R_1$ or $R_2$ is an R* group wherein:

$R_a$ is a straight-chain or branched alkyl or monoalkene group having from 2 to 16 carbon atoms;

$R_b$ is a straight-chain or branched alkyl or monoalkene group having from 2 to 15 carbon atoms;

R* is a chiral nonracemic tail group selected from the group consisting of OC*H(CH₃)$R_c$, O—C*H(CH₃)COOR$_d$ and OCH₂C*HFC*HFR$_e$ in which the * indicates an asymmetric carbon enriched in one stereoconfiguration which for OCH₂C*HFC*HFR$_e$ is either the (S,S) or (R,R) stereoconfiguration and wherein:

$R_c$ is a straight-chain or branched alkyl or monoalkene group having from two to fifteen carbon atoms, $R_d$ is a straight-chain or branched alkyl or monoalkene group having from 2 to 13 carbon atoms and $R_e$ is a straight-chain or branched alkyl or monoalkene group having from 2 to 11 carbon atoms and wherein for each of $R_a$, $R_b$, $R_c$, $R_d$, $R_e$ one or more of the non-neighboring carbon atoms, except any unsaturated carbon atoms, can be substituted with an O, S, or Si(CH₃)₂ group; and $X_1$, $X_2$, $X_3$, and $X_4$ are either H, an electron donor or an electron acceptor; such that when $X_1$ is an acceptor, $X_3$ is either H or a donor and when $X_1$ is a donor, $X_3$ is either H or an acceptor, and when $X_2$ is an acceptor, $X_4$ is either H or a donor and when $X_2$ is a donor, $X_4$ is either H or an acceptor and such that when $R_2$ is R*, $X_1$ cannot be H and when $R_1$ is R* $X_2$ cannot be H.

In a more specific embodiment, this invention provides chiral, nonracemic o-nitroakoxyaromatic compounds of formula I:

wherein n=0 or 1, m=0 or 1, $X_1$ is an NO₂ grouping, $X_2$, $X_3$ and $X_4$ are H, $R_2$ is a chiral nonracemic group, and $R_1$ is an alkyl group having from 5 to 15 carbon atoms;

or wherein n=0 or 1, m=0 or 1, $X_2$ is NO₂, $X_1$, $X_3$ and $X_4$ are H, $R_1$ is a chiral nonracemic group, and $R_2$ is an alkyl group having from 6 to 12 carbon atoms;

or wherein n=0 or 1, m=0, $X_1$ is NO₂, $X_3$ is NR'R", $X_2$ and $X_4$ are H, $R_2$ is a chiral nonracemic group, and $R_1$ is an alkyl group having from 6 to 12 carbon atoms, and where R' is H or CH₃, and R" is H, CH₃, or (COCH₃);

or wherein n=0 or 1, m=0 or 1, $X_1$ and $X_2$ are NO₂ groups, $X_3$ and $X_4$ are H, $R_1$ is a chiral nonracemic group, and $R_2$ is a chiral non-racemic group;

or wherein n=0, m=0 or 1, $X_2$ is NO₂, $X_4$ is NR'R", $X_1$ and X3 are H, $R_1$ is a chiral nonracemic group, and $R_2$ is an alkyl group having from 6 to 12 carbon atoms, and where R' is H or CH₃, and R" is H, CH₃ or NHCOCH₃ (but R" is NHCOCH₃ only when R' is not H);

or wherein n=0, m=0 or 1, $X_2$ is NH₂, $X_4$ is NHCOCH₃, $X_1$ and $X_3$ are H, $R_1$ is a chiral nonracemic group, and $R_2$ is an alkyl group having from 6 to 12 carbon atoms.

Also provided is the m-nitroalkoxyaromatic compound of formula I wherein n=0 or 1, m=0, $X_3$ is NO₂, $X_1$, $X_2$ and $X_4$ are H, $R_2$ is a chiral nonracemic group, and $R_1$ is an alkyl group having from 6 to 12 carbon atoms, and the m-nitroalkoxyaromatic compound of formula I wherein n=0, m=0 or 1, $X_4$ is NO₂, $X_1$, $X_2$, and $X_3$ are H, $R_1$ is a chiral nonracemic group, and $R_2$ is an alkyl group having from 6 to 12 carbon atoms. These compound are provided as a test and control compounds. While such compounds, specifically where $X_1$ is H when $R_2$ is chiral, and where $X_2$ is H when $R_1$ is chiral, and where only one chiral tail is present, are not expected to possess large $X^{(2)}$, they are useful as, for example, FLC host materials or components of FLC mixtures.

In a further embodiment, this invention provides chiral, nonracemic compounds with tolane cores of formula II:

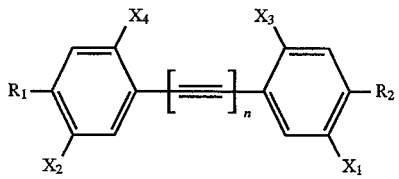

II

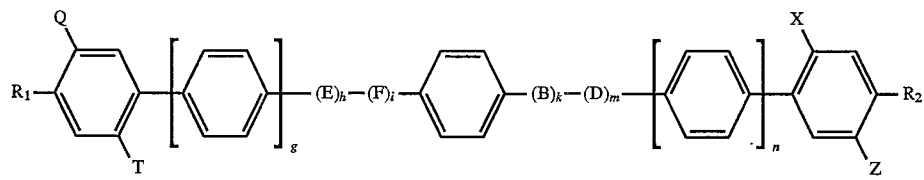

III where n=1 or 2, and where
$R_1$ and $R_2$ are an $OR_a$, —$COOR_b$, or an R* group such that at least one of $R_1$ or $R_2$ is an R* group wherein:
$R_a$ is a straight-chain or branched alkyl or monoalkene group having from 2 to 16 carbon atoms;
$R_b$ is a straight-chain or branched alkyl or monoalkene group having from 2 to 15 carbon atoms;
R* is a chiral nonracemic tail group selected from the group consisting of $OC^*H(CH_3)R_c$, $O$—$C^*H(CH_3)COOR_d$ and $OCH_2C^*HFC^*HFR_e$, in which the * indicates an asymmetric carbon enriched in one stereoconfiguration which for $OCH_2C^*HFC^*HFR_e$ is either the (S,S) or (R,R) stereoconfiguration and wherein:
$R_c$ is a straight-chain or branched alkyl or monoalkene group having from two to fifteen carbon atoms, $R_d$ is a straight-chain or branched alkyl or monoalkene group having from 2 to 13 carbon atoms and $R_e$ is a straight-chain or branched alkyl or monoalkene group having from 2 to 11 carbon atoms and wherein for each of $R_a$, $R_b$, $R_c$, $R_d$, $R_e$ one or more of the non-neighboring carbon atoms, except any unsaturated carbon atoms, can be substituted with an O, S, or $Si(CH_3)_2$ group; and
$X_1$, $X_2$, $X_3$, and $X_4$ are either H, an electron donor or an electron acceptor; such that when $X_1$ is an acceptor, $X_3$ is either H or a donor and when $X_1$ is a donor, $X_3$ is either H or an acceptor, and when $X_4$ is an acceptor, $X_4$ is either H or a donor and when $X_2$ is a donor, $X_4$ is either H or an acceptor and such that when $R_2$ is R*, $X_1$ cannot be H and when $R_1$ is R* $X_2$ cannot be H.

In a more specific embodiment, this invention provides chiral, nonracemic lactate esters with tolane cores of formula II:
wherein $X_1$ is $NO_2$, $X_2$ and $X_3$ are H, $R_2$ is a chiral nonracemic group and $R_1$ is an alkoxy group with from 6 to 12 carbon atoms, and n=1 or 2;
wherein $X_1$ is $NO_2$, and $X_3$ is NR'R", $R_2$ is a chiral nonracemic group, and $R_1$ is an alkyl group having from 6 to 12 carbon atoms, and where R' is H or $CH_3$, and R" is H, $CH_3$, or $(COCH_3)$, and;
wherein $X_3$ is $NO_2$, and $X_1$ is NR'R", $R_2$ is a chiral nonracemic group, and $R_1$ is an alkyl group having from 6 to 12 carbon atoms, and where R' is H or $CH_3$, and R" is H, $CH_3$, or $(COCH_3)$; and wherein $X_1$ and $X_2$ are $NO_2$, $X_3$ is H, n=2, and $R_1$ and $R_2$ are both chiral nonracemic groups and are both the same group.

Also provided is the compound of formula II wherein $X_1$ and $X_3$ are H, $R_2$ is a chiral nonracemic group, and $R_1$ is an alkyl group with from 6 to 12 carbon atoms. While such compounds, specifically where $X_1$ is H when $R_2$ is chiral, and where $X_2$ is H when $R_1$ is chiral, and where only one chiral tail is present, are not expected to possess large $X^{(2)}$, they are useful as, for example, FLC host materials or components of FLC mixtures.

Specifically, the present invention provides compounds of formula II:

where Z, X, B, D, E, F, Q, T, $R_1$, $R_2$, and h, i, k and m are defined as above.

Particularly useful for obtaining large $X^{(2)}$ are compounds of formula IV in which one or both of Z or Q is a $NO_2$ group. Preferred compounds of formula 1 are those in which E and D can be —C≡C— and B and F can be $CO_2$ or $O_2C$ except that B≠$CO_2$ when m≠0 and F≠$O_2C$ when h≠0.

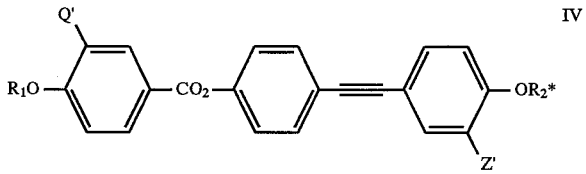

IV where Z'=$NO_2$ and Q' can be H or $NO_2$; $R_2^*$ must be a chiral group either R* or a chiral R' group and $R_1$ can be a chiral or nonchiral R' group. It is preferred that if $R_1O$ is a chiral group that Q' is $NO_2$.

Preferred chiral nonracemic groups $R_1$ or $R_2$ are those which afford a high degree of core coupling, as described in U.S. patent application Ser. No. 542,838, when ortho substituents are present. Such chiral tails generally cause an increase in ferroelectric polarization when one ortho substituent is electronegative relative to the same structure where both ortho substituents are H. That is, the ferroelectric polarization of compounds of formulas I–IV would be larger when $X_1$ is $NO_2$ or other electronegative substituent and $X_2$ and $X_3$ are H, than when $X_1$ is H and $X_2$ and $X_3$ are H. Such chiral tails include the nonracemic 1-methylalkyloxy grouping (R=(CH($CH_3$)$C_nH_{2n+1}$)), where n is greater than 1, and where the 1-methylheptyloxy grouping (n=6) is more preferred, and the nonracemic 1-methylcarbonyloxy grouping (R=(CH($CH_3$)$CO_2C_nH_{2n+1}$)) where n is an alkyl group with from 1 to 10 carbon atoms. In general, the groups $C_nH_{2n+1}$ in both of these tails can also have one or more stereocenters, and can also possess heteroatom substituents at stereocenters or at non-stereogenic carbon atoms, and where non-neighboring carbon atoms can be replaced by S, O or $Si(CH_3)_2$.

In general, the compounds of the present invention are useful as components of liquid crystal materials. In particular, chirally asymmetric molecules of this invention are useful as components of ferroelectric liquid crystal materials. Certain of these compounds can impart high $X^{(2)}$ to ferroelectric liquid crystals, either as pure compounds or as components of mixtures. Certain of the compounds in this invention can be employed as FLC host materials. Certain of the compounds of this invention exhibit liquid crystal phases, including smectic C phases.

DETAILED DESCRIPTION OF THE INVENTION

The compounds of the present invention can be prepared by a variety of techniques known in the art. In particular, compounds of formula B and C can be prepared by those of ordinary skill in the art employing techniques will known in the art and following the procedures provided hereinafter. Some details of the present invention have been provided in: Walba, D. M., et al. (1991) ACS Symp Ser #455:484. Walba et al., (1991) Mol. Cryst. Liq. Cryst. 198:51.

The general synthesis of chiral and achiral compounds of formula I having k=1, $R_1$ and $R_2$ alkoxy, and $X_1$=$NO_2$, n=0 or 1, and m=0, is illustrated in Scheme I. The hydroxyl group of biphenol (1) is protected as the acetate by treatment with acetic anhydride in pyridine to give 2. Acetate 2 is functionalized in the p' position by Friedel-Crafts acylation using oxalyl chloride/$AlCl_3$ to give the p' acid chloride, which is hydrolyzed to the acid in an aqueous workup. This acid is then treated with hydroxide to deprotect the phenolic hydroxyl grouping, affording 3. Alkylation of the phenolic hydroxyl grouping of 3 is accomplished by Williamson etherification to give 4, which is then converted to acid chloride 5 by treatment with oxalyl chloride in benzene/DMF.

Phenol 11 is prepared as follows. Monobenzone (6) is acylated with benzoyl chloride to give phenylbenzoate 7. Removal of the benzyl grouping by hydrogenation using Pd/C catalyst gives the phenol 8. Nitration of 8 is accomplished with the sodium nitrate/lanthanum nitrate reagent, affording o-nitrophenol 9, which is then coupled with $R_2OH$ to give the ether 10 using the stereospecific Mitsunobu reaction. The Mitsunobu coupling proceeds with inversion of configuration at the stereocenter of alcohol $R_2OH$ in the case where $R_2$ is a chiral nonracemic group. Deprotection of the phenolic hydroxyl grouping by treatment of 10 with hydroxide affords phenol 11.

Coupling of acid chloride 5 with phenol 11 then gives the compounds of formula I, wherein $X_1$ is $NO_2$, n=1, and m=0. Alternatively, coupling of a p-alkyloxy benzoic acid chloride 12 with phenol 11 gives the compounds of formula I, wherein $X_1$ is $NO_2$, n=0, and m=0.

The general synthesis of chiral and achiral compounds of formula I having $R_1$ and $R_2$ alkoxy, and where $X_1$=$NO_2$, n=0 or 1, and m=1, is illustrated in Scheme II. Biphenol (13) is protected as the mono-benzoyl ester 14 by treatment with benzoyl chloride in pyridine. The phenol ring of compound 14 is then selectively nitrated using either lanthanum nitrate with nitric acid and HCl, or with nitric acid in acetic acid. The sodium nitrate-lanthanum nitrate conditions are less preferred. Nitrophenol 14 is then coupled with $R_2OH$ using the stereospecific Mitsunobu coupling procedure to give 16 wherein the stereocenter of $R_2OH$ is inverted. Deprotection of the phenol by hydrolysis of the benzoate ester with hydroxide ion then gives 17. Coupling of phenol 17 with ether acid chloride 5 or acid chloride 12 then gives the compounds of formula I wherein n=0 or 1, m=1, and $X_1$ is $NO_2$.

The general synthesis of chiral and achiral compounds of formula I having $R_1$ and $R_2$ alkoxy, and where $X_3$=$NO_2$, n=0 or 1, and m=0, is illustrated in Scheme III. Coupling of $R_2OH$ with monobenzone (6) gives ether 18 with inversion of configuration at the stereocenter of $R_2OH$. Deprotection of the phenolic hydroxyl grouping of 18 is accomplished using hydrogenation, which gives phenol 19. Nitration of 19 using the sodium nitrate-lanthanum nitrate conditions then gives phenol 20, which is coupled with either acid chloride 12 or acid chloride 5 to give the compounds of formula I wherein $X_3$ is $NO_2$, m=0, and n=0 or 1.

The general synthesis of chiral and achiral compounds of formula I having $R_2$ alkoxy and $R_1$ alkoxy or ($OCH(CH_3)$ $CO_2R$), and where $X_2$ is $NO_2$, n=0, and m=0 or 1, is illustrated in Scheme IV. The carboxyl grouping of 4-hydroxy-3-nitrobenzoic acid (21) is protected as the methyl ester to give 22. The alcohol $R_1OH$ is then coupled stereospecifically to the phenolic hydroxyl of 22 to give the ether 23 using the Mitsunobu coupling. The Mitsunobu coupling proceeds with inversion of configuration at the stereocenter of alcohol $R_1OH$ in the case where $R_2$ is a chiral nonracemic group wherein the stereocenter is on the carbon bearing the OH group. Hydrolysis of ester 23 with hydroxide ion then gives the acid 24 which is converted to acid chloride 25 by treatment with thionyl chloride. Alternatively, the ester deprotection step can involve treatment of methyl ester 23 with trimethylsilyl iodide. The latter method is preferred with $R_1$ is ($OCH(CH_3)CO_2R$).

Coupling of the acid chloride 25 with either the alkoxyphenol 26 or 27, prepared by mono-etherification of diphenol 13, or from monobenzone (6) by alkylation then debenzylation, respectively, then affords the compounds of formula I where $X_2$ is $NO_2$, n=0, and m=0 or 1.

The general synthesis of chiral and achiral compounds of formula I having $R_2$ alkoxy and $R_1$ alkoxy or ($OCH(CH_3)$ $CO_2R$), and where $X_2$ is $NO_2$, n=1, and m=0 or 1, is illustrated in Scheme V. Protection of the carboxyl grouping of p'-hydroxy-biphenylbenzoic acid (3) as the methyl ester gives phenol 28. Nitration of phenol 28 with sodium nitrate-lanthanum nitrate and HCl gives the nitro phenol 29, which is coupled with $R_1OH$ using the stereospecific Mitsunobu coupling reaction. Deprotection of the resulting ester 30 using hydroxide or trimethylsilyl iodide, which is preferred when $R_2$ is ($CH(CH_3)CO_2R$), gives acid 31. Coupling of acid 31 with either phenol 26 or phenol 27 then gives the compounds of formula I where $X_2$ is $NO_2$, n=1, and m=0 or 1.

The general synthesis of chiral and achiral compounds of formula I having $R_1$ and $R_2$ are alkoxy, and where $X_4$ is $NO_2$, n=0, and m=0 or 1, is illustrated in Scheme VI. Coupling of $R_1OH$ with 4-hydroxy-2-nitrotoluene (33) using the Mitsunobu coupling reaction gives ether 34 with inversion of configuration at the stereocenter of $R_1OH$ if the stereocenter is the carbon bearing the OH group or $R_1OH$. Bromination of the methyl group of 34 then gives bromide 35, which is converted to aldehyde 36 by treatment of with silver nitrate, then treatment of the resulting nitrate ester with hydroxide. Oxidation of aldehyde 36 gives acid 37, which is converted to acid chloride 38 with oxalyl chloride in benzene/DMF. Coupling of acid chloride 38 with either phenol 26 or phenol 27 then gives the compounds of formula I wherein n=0, m=0 or 1, and $X_4$ is $NO_2$.

The general synthesis of chiral and achiral compounds of formula I having $R_1$=$R_2$' and $R_2$ and $R_2$' are alkoxy, and where $X_1$ and $X_2$ are $NO_2$, n=0 or 1, and m=0 or 1, is illustrated in Scheme VII. Coupling of either phenol 11 or phenol 17 with either acid chloride 25 or acid chloride 32 using NaH in THF solvent gives the compounds of formula I wherein n is 0 or 1, m is 0 or 1, $X_1$ and $X_2$ are $NO_2$, and $R_2$ and $R_2'$ are both chiral tails, not necessarily the same, but both affording the same sign of P when used individually.

Compounds of formula V can be employed as LC or FLC host materials.

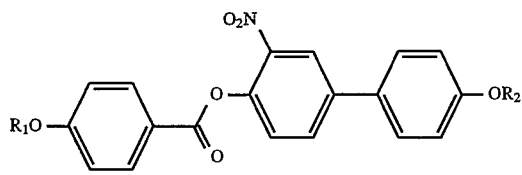

The general synthesis of chiral and achiral compounds of formula V having $R_1$ and $R_2$ alkyl, is illustrated in Scheme VIII. coupling of $R_2OH$ with phenol 14 using the Mitsunobu coupling reaction gives ester 39. When $R_2$ is a chiral group with the hydroxyl-bearing carbon a stereocenter, the product is produced with inversion of configuration at the stereocenter of $R_2$. Treatment of ester 39 with hydroxide ion gives phenol 40, which is nitrated using the sodium nitrate-lanthanumnitrate-HCl conditions to give nitrophenol 41. Coupling of this phenol with acid chloride 12 using NaH then gives the compounds of formula V.

The general synthesis of chiral and achiral compounds of formula I having $R_1$ and $R_2$ alkoxy, and where $X_1$ and $X_3$ are not H, and n=0 or 1, and m=0, and where $X_2$ and $X_4$ are not H, and n=0, and m=0 or 1, proceed through the common aldehyde intermediates 49. The general synthesis of aldehyde intermediates 49 is shown in Scheme IX. Nitration of p-methylacetophenone (42) gives the nitrotoluene derivative 43. Reduction of the nitro group to an amino group with stannous chloride followed by acylation with acetyl chloride/pyridine then gives the amide 44. Baeyer-Villiger oxidation of 44 with mCPBA gives the acetate 45. The ester grouping of 45 is selectively hydrolyzed with hydroxide ion to give phenol 46, which is nitrated to nitrophenol 47 using nitric acid with acetic acid/acetic anhydride. Coupling of 47 with $R_1OH$ or $R_2OH$ using the Mitsunobu coupling reaction then gives the toluene derivative 48. When this ROH is chiral, with a stereocenter at the carbon bearing the hydroxyl grouping, then 48 is formed with inversion of configuration at the stereocenter. Oxidation of the methyl group of 48 to give aldehdye 49 is accomplished by treatment of 48 with ceric ammonium nitrate in acetic acid/water.

The general synthesis of chiral and achiral compounds of formula I having $R_1$ and $R_2$ alkoxy, and where $X_1$ and $X_3$ are not H, and n=0 or 1, and m=0, is shown in Scheme X. Baeyer-Villiger oxidation of aldehyde 49 (where the R group is $R_2$) using mCPBA gives the phenol 50 via an intermediate formate ester which is not isolated. Phenol 50 is coupled with either acid 51 or acid 4 using dicyclohexylcarbodiimide and p-dimethylaminopyridine to give the compounds of formula I where $X_1$ is $NO_2$, $X_3$ is NHAc, n=0 or 1, and m=0. Selective hydrolysis of the amide grouping of I where $X_3$ is NHAc using HCl in acetone then gives the compounds of formula I where $X_1$ is $NO_2$, $X_3$ is $NH_2$, n=0 or 1, and m=0.

The general synthesis of chiral and achiral compounds of formula I having $R_1$ and $R_2$ alkoxy, and where $X_2$ and $X_4$ are not H, and n=0, and m=0 or 1, is shown in Scheme XI.

Oxidation of aldehyde 49 (where the R group is $R_1$) with permanganate gives the acid 52, which is coupled with either phenol 26 or phenol 27 to give compounds 53 with m=0 or 1. The spectral properties of compounds 53 (specifically the fact that these compounds are not absorbing in the visible part of the spectrum and are white) show that in this particular functional group array, the acetamide group (NHAc) is not a donor group. Reduction of the nitro group of 53 gives the amines I, $X_2=NH_2$, $X_4=NHAc$, m=0 or 1. The fact that these amines are absorbing in the visible part of the spectrum and are yellow shows that in this particular functional array the NHAc group is acting as an acceptor and the $NH_2$ group is acting as a donor.

Selective hydrolysis of the amide group of 53 using HCl in aqueous acetone gives compounds of formula I where $X_2=NO_2$, $X_4=NH_2$, m=0 or 1 and n=0. In this case the nitro group is acting as an acceptor and the amino group is acting as a donor.

The general synthesis of chiral and achiral compounds of formula II having $R_1$ alkoxy or $(OCH(CH_3)CO_2R)$ and $R_2$ alkoxy or $(OCH(CH_3)CO_2R)$, and where $X_1$ is $NO_2$, and n=1 is shown in Scheme XII. Coupling of p-iodophenol (54) with $R_1OH$ using the Mitsunobu coupling reaction gives iodo ether 56. Metal catalyzed coupling of iodide 56 with the acetone adduct of acetylene, followed by deprotection of the terminal acetylene with acid then gives acetylenic ether 59.

Coupling of 54 with $R_2OH$ using the Mitsunobu conditions gives ether 58, while nitration of 54 gives the nitrophenol 55. Coupling cf 55 with $R_2OH$ under Mitsunobu conditions gives nitro ether 57. coupling of either 57 or 58 with acetylene 59 using a metal catalyst gives the compounds of formula II where $X_1$ is $NO_2$ or H, and n=1.

The general synthesis of chiral and achiral compounds of formula II having $R_1$ alkoxy or $(OCH(CH_3)CO_2R)$ and $R_2$ alkoxy or $(OCH(CH_3)CO_2R)$, and where $X_1$ and $X_2$ are $NO_2$, and n=2 is shown in Scheme XIII. Coupling of iodoether 57 with the acetone adduct of acetylene using a metal catalyst, followed by deprotection of the terminal acetylene with acid gives acetylene 60. Dimerization of 60 using a copper catalyst in the presence of oxygen then gives the compounds of formula II where $X_1$ and $X_2$ are $NO_2$, and n=2.

The general synthesis of chiral and achiral compounds of formula III and IV is outlined in Scheme XIV. Coupling of the p-iodophenol (54) with TMS-acetylene gives the phenol-substituted acetylene (61). Acid chloride 2 (Scheme 11) or 25 (Scheme IV) is reacted 61 to give a phenylbenzoate acetylene 62. Finally, coupling of iodoethers like 57 or 58 to 62 gives the benzoate tolane IV where Q' and Z' are H or $NO_2$.

The starting materials for synthesis of compounds of formulas I–V by the procedures of Schemes I–XIV are readily available either as commercial products or by synthetic routes that are well known in the art. For example, alkoxy substituted phenols are either available from commercial sources or are readily prepared by known methods (see Neubert et al. (1978) Mol. Cryst. Liq. Cryst. 44:197–210). Introduction of achiral tails wherein nonalternate carbon atoms are replaced by heteroatoms, including oxygen or silicon, is generally discussed in: Hemmerling, W. et al., (1989) European Patent 0355,008.

Scheme I
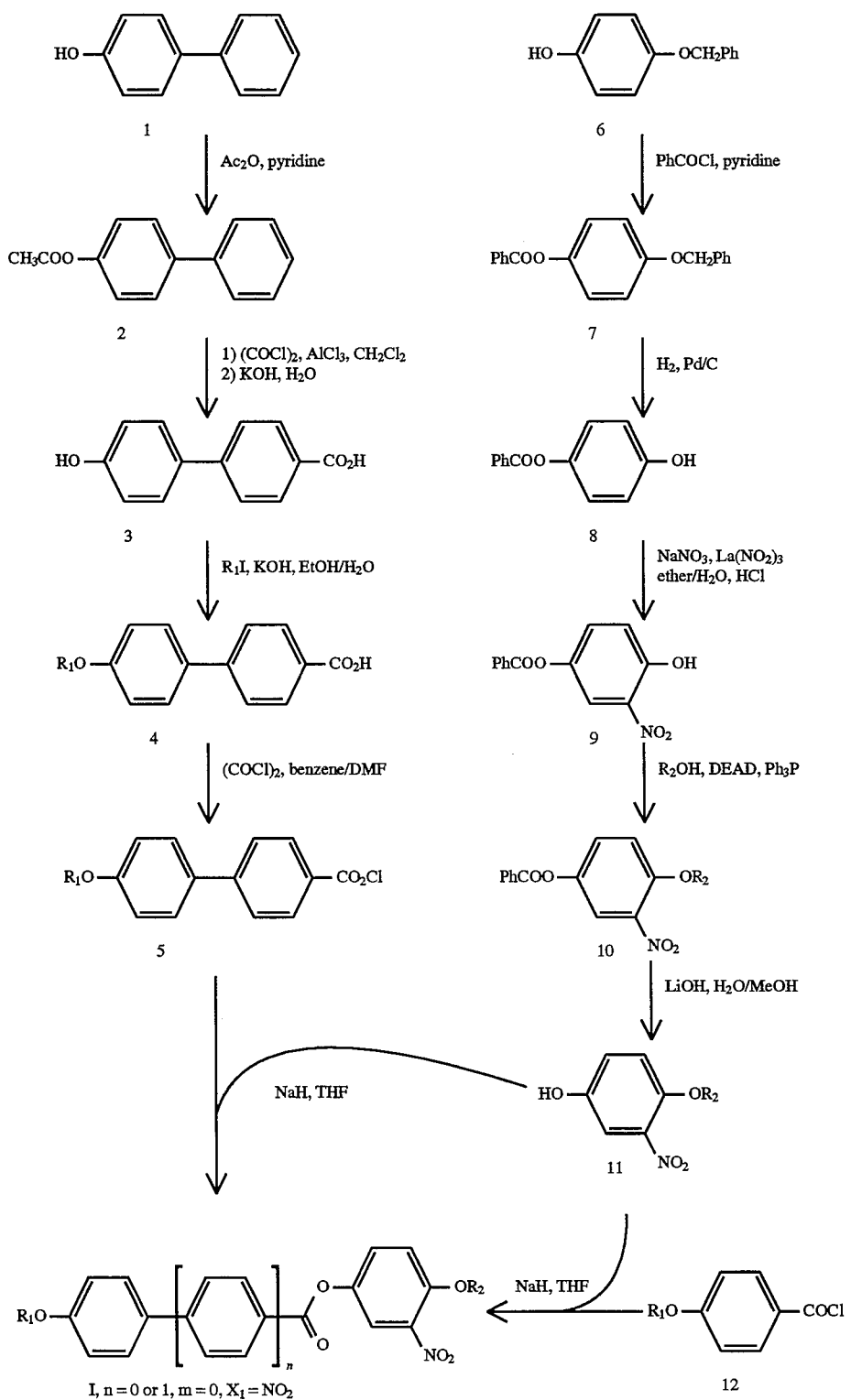

Scheme II
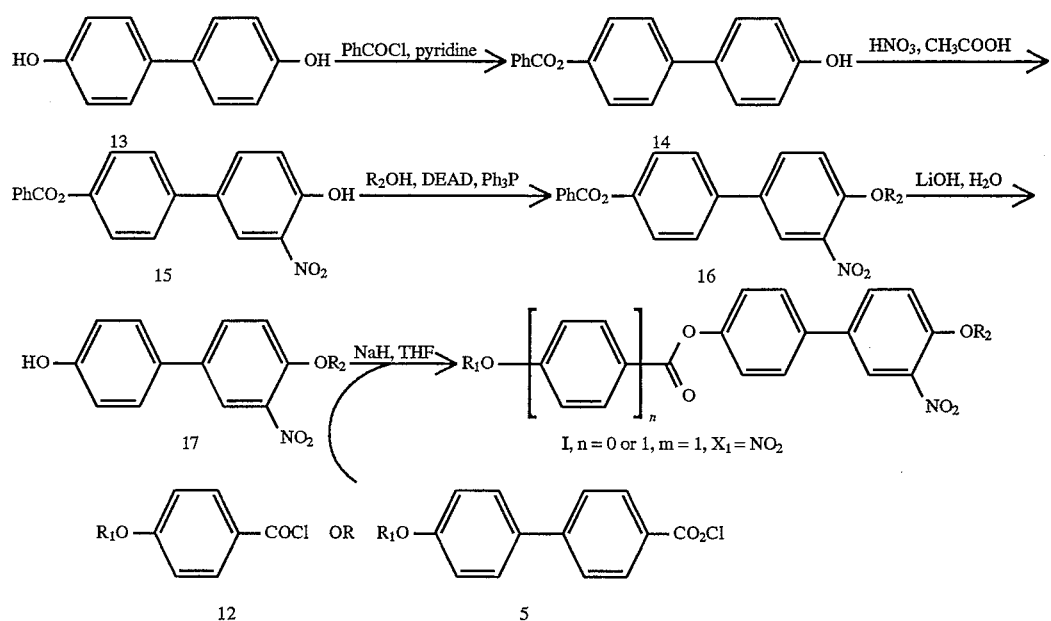
Scheme III
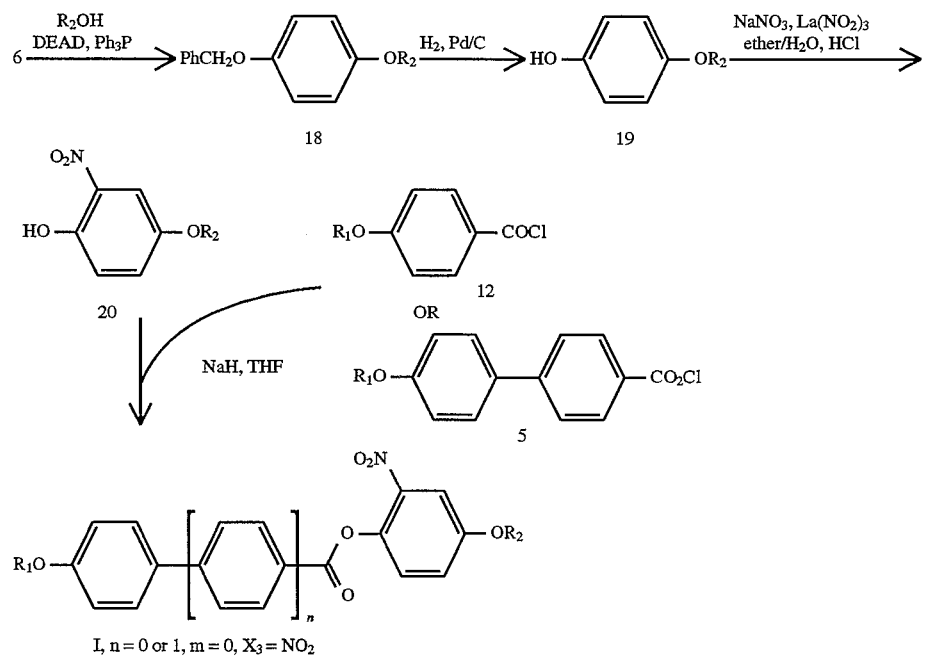

Scheme IV
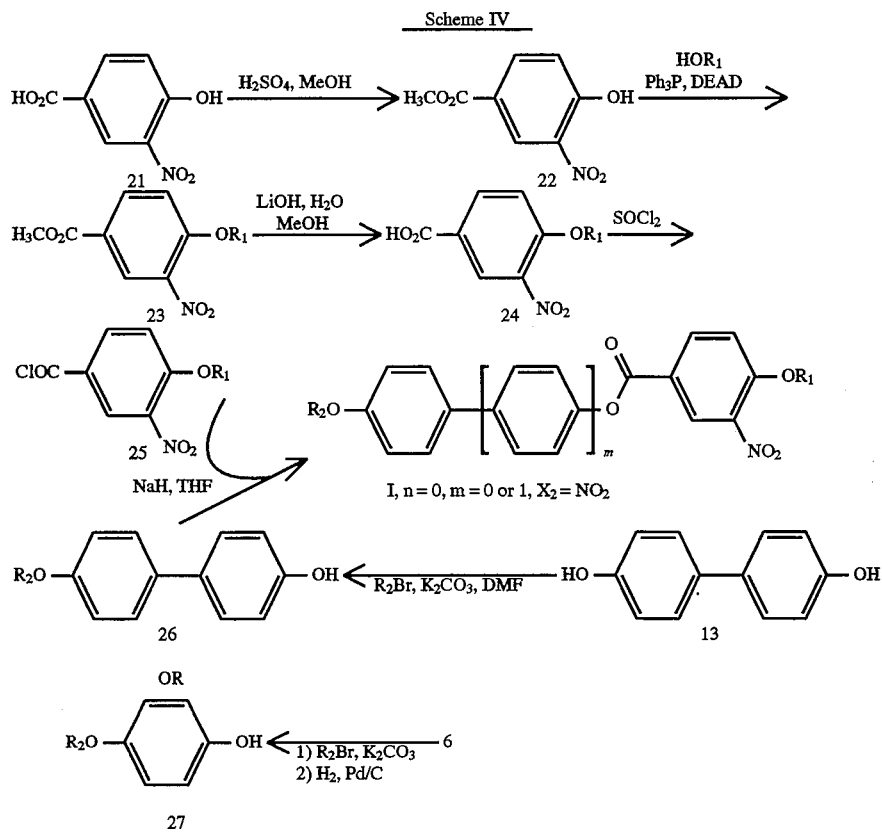
Scheme V
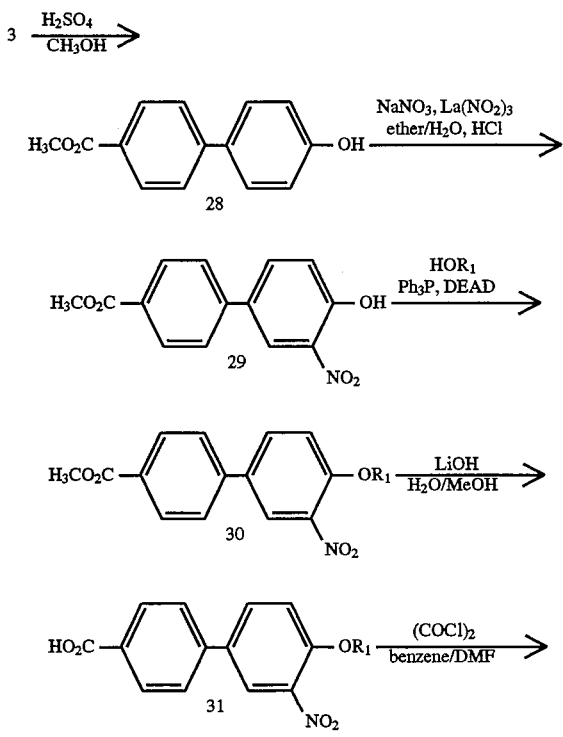
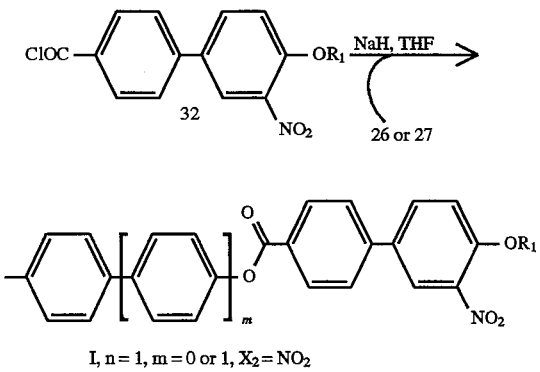
I, n = 1, m = 0 or 1, $X_2 = NO_2$
Scheme VI
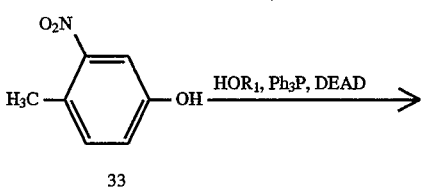

Scheme VI -continued
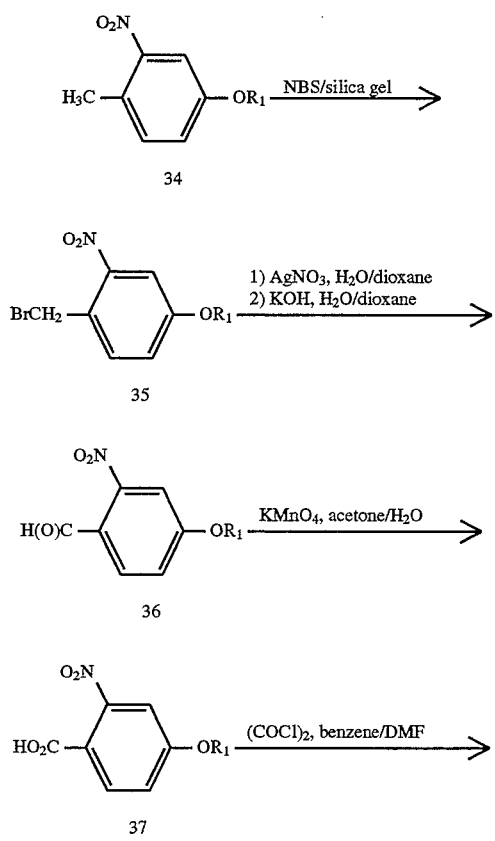
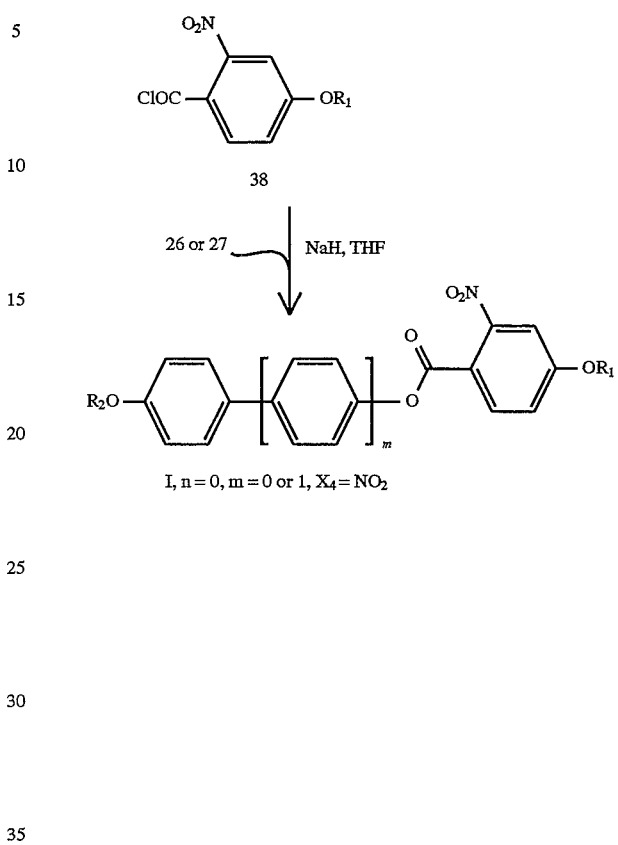
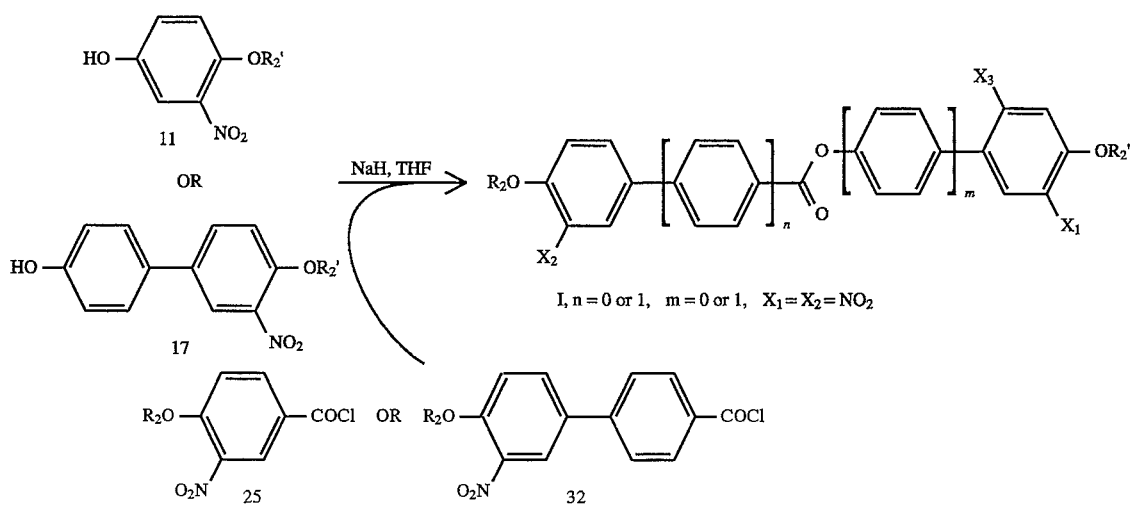
Scheme VII

Scheme VIII
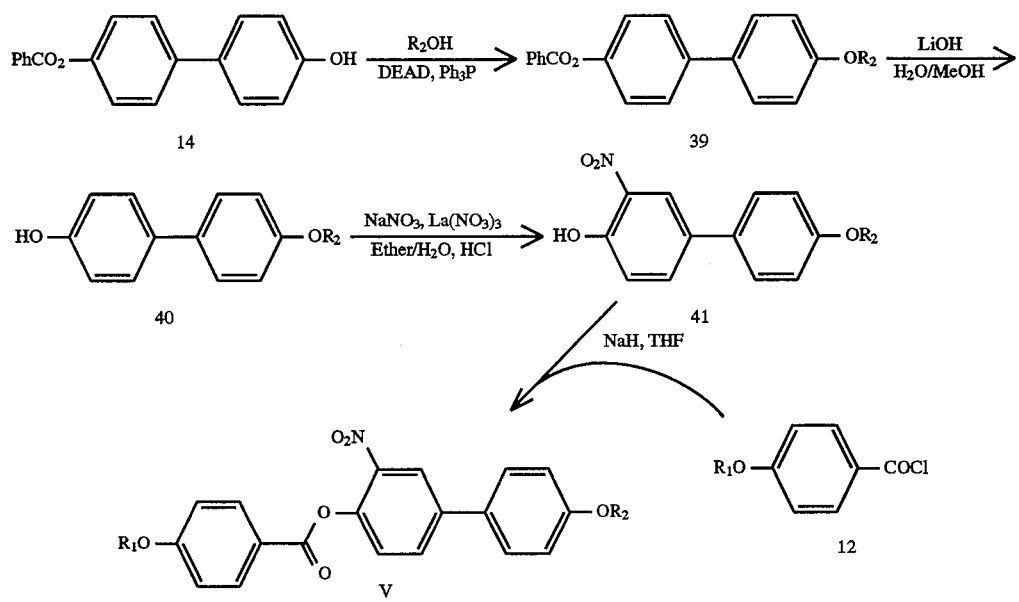
Scheme IX
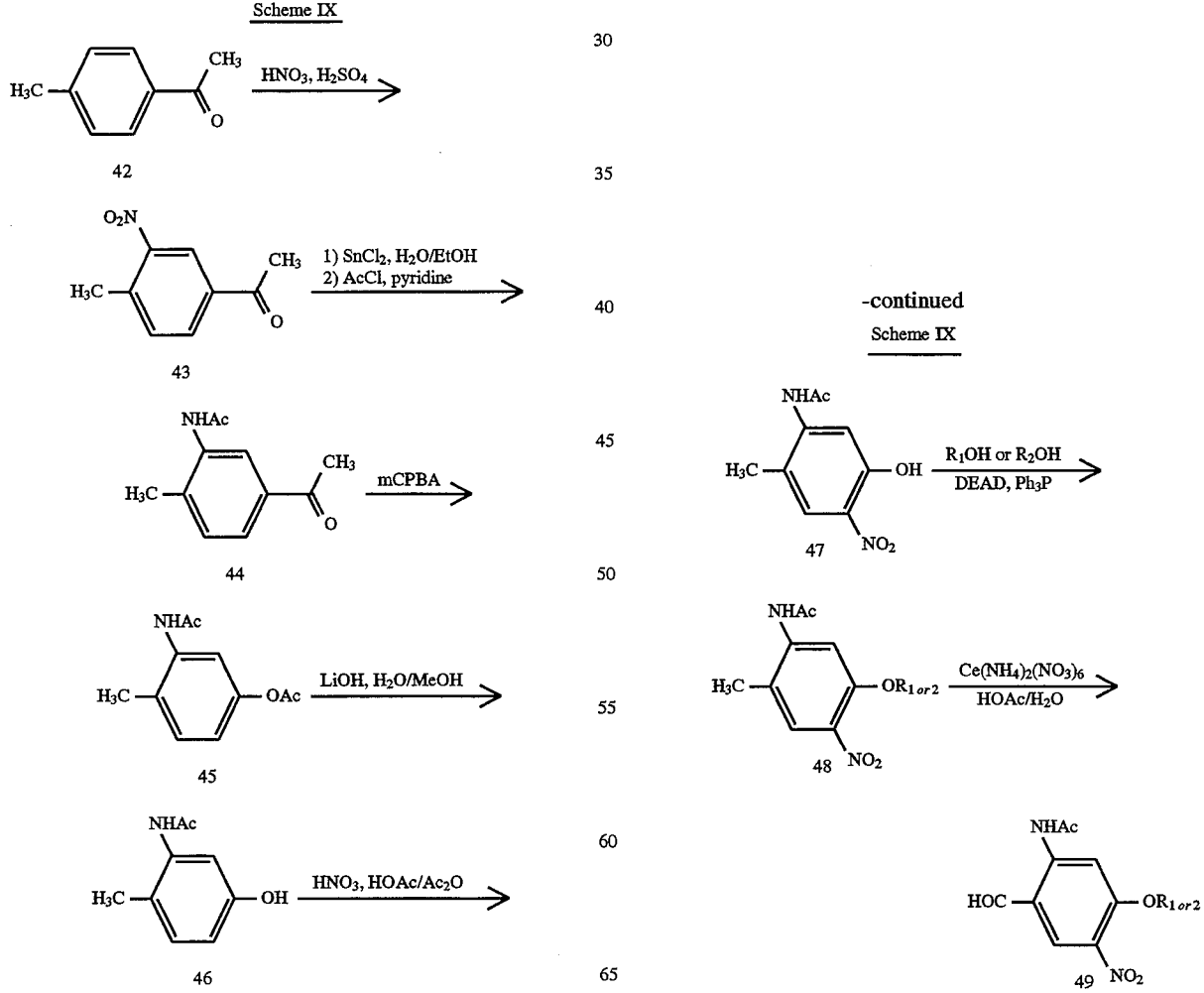

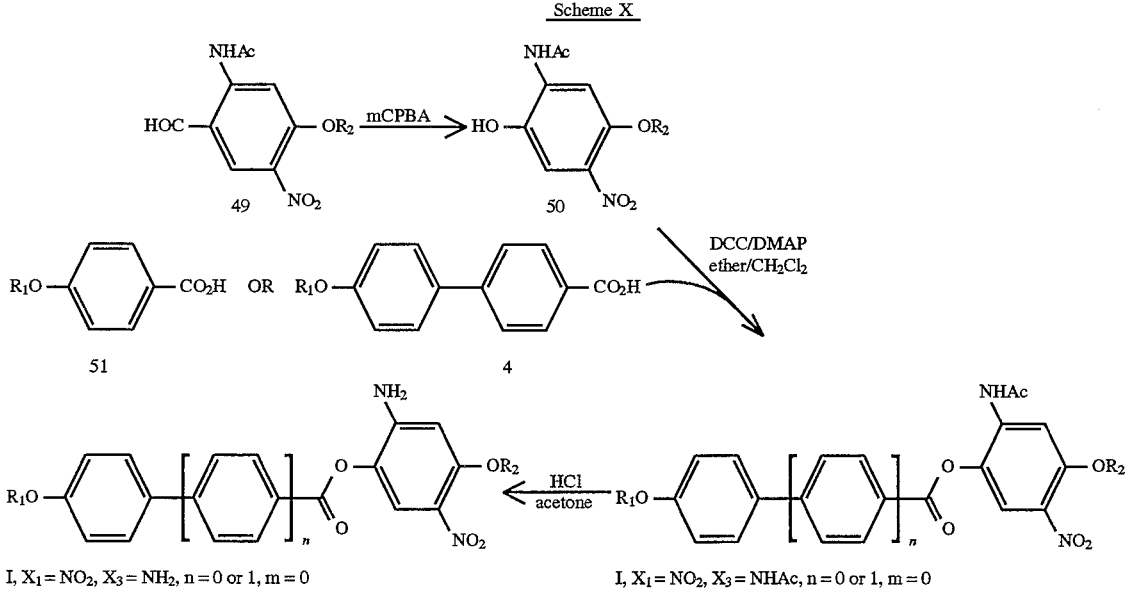
Scheme X
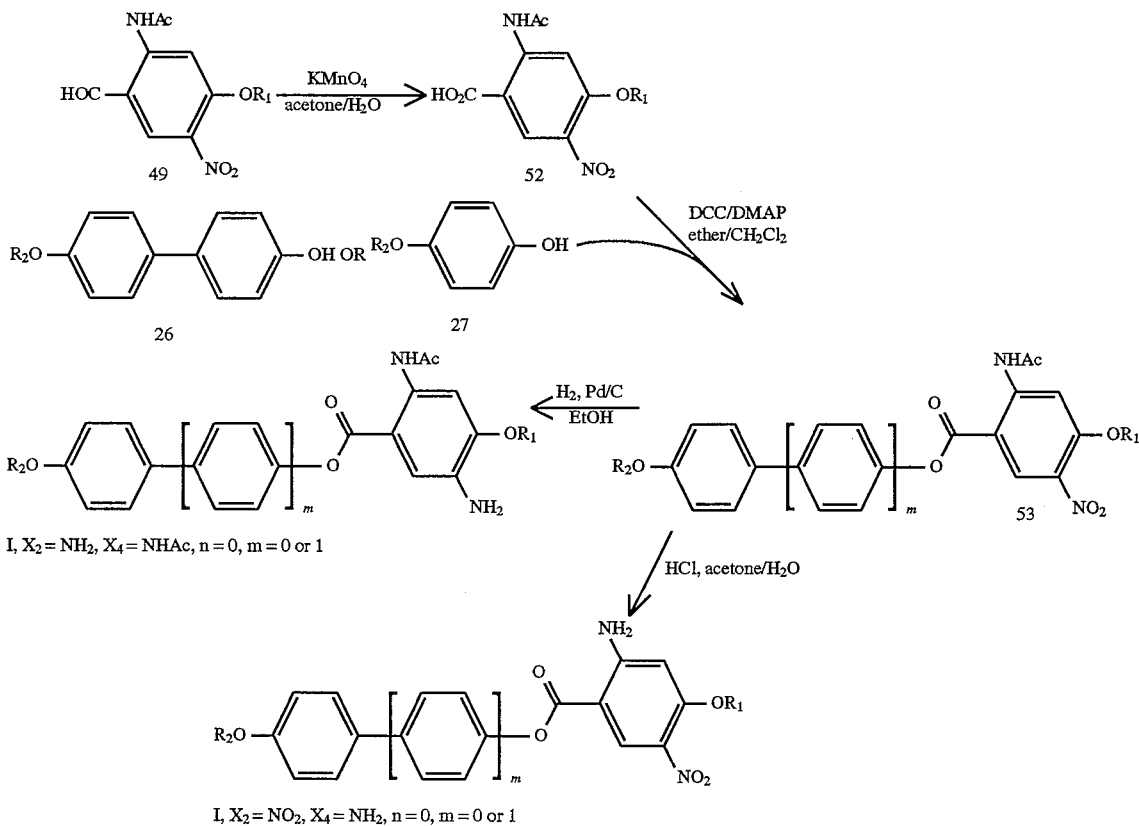
Scheme XI

Scheme XII
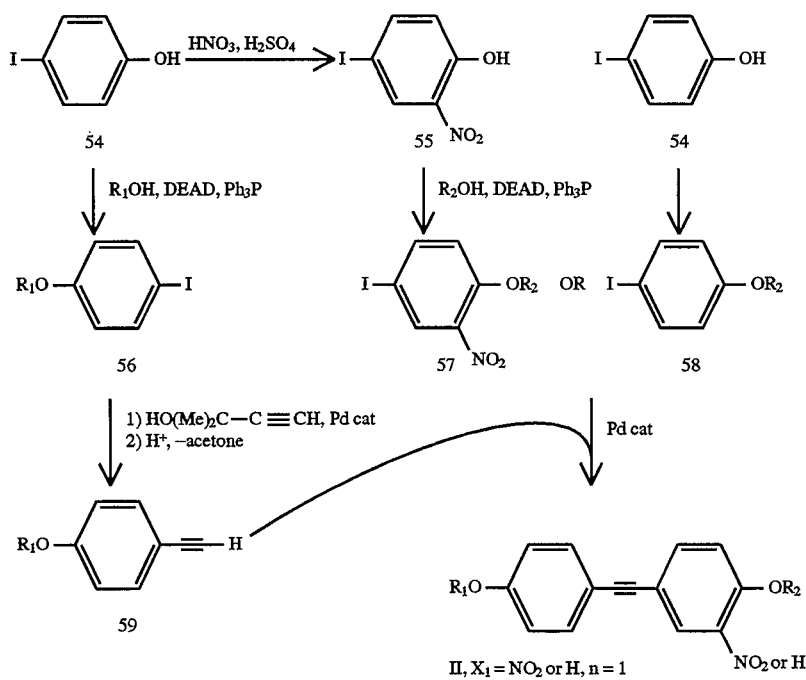
Scheme XIII
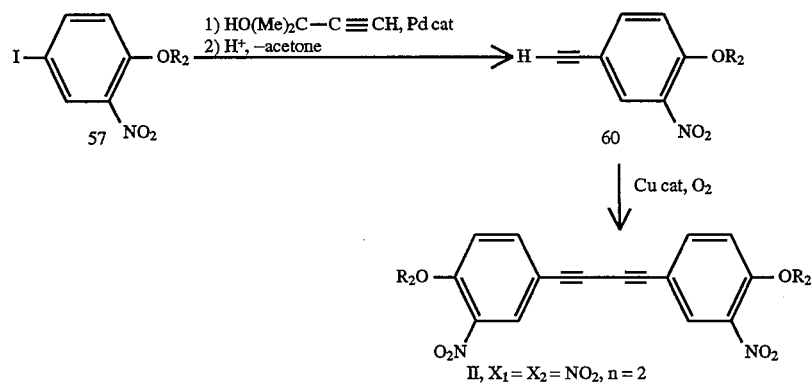

Scheme XIV

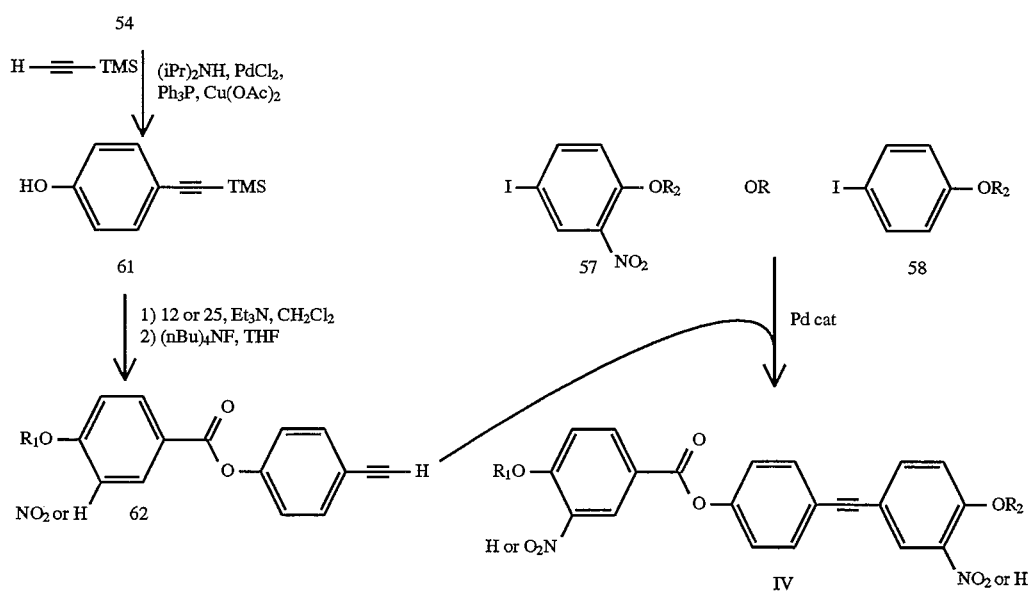

Table 2 (Page 1 of 4)
Compound of formula I where $R_1=OC_{10}H_{21}$, $R_2=(S)$—(OCH(CH$_3$)C$_6$H$_{11}$, $X_1=NO_2$, $X_2=X_3=X_4=H$, k=1, m=0 and n=1 (W 314)

X←33.6°—C*←93.7°—A←119.1°—I
X—80°→C*
P/sin θ=−611
T-Tc=−10°

Compound of formula I where $R_2=OC_{10}H_{21}$, $R_1=(S)$—(OCH(CH$_3$)C$_6$H$_{11}$, $X_2=NO_2$, $X_1$, $X_3$ and $X_4=H$, k=1, m=1 and n=0 (W 313)

X←55°—E←64.8°—C*←94.2°→A←90.5°→I
X—65°→E—84°→C*
P/sin θ=−494
T-Tc=−10°

Compound of formula I where $R_1=(S)$—(OCH(CH$_3$)C$_6$H$_{11}$, $R_2=(S)$—(OCH(CH$_3$)C$_6$H$_{11}$,$X_1=X_2=NO_2$, $X_1=X_2=NO_2$, $X_3=X_4=H$, n=0, k=1, and m=1 (W 319)

For a 20% mixture in W 82
X←15.5°—C*←57.5°—I
P$_{ext}$ T-Tc=−10°=−119
P$_{ext}$ T-Tc=−42°=−402
P$_{ext}$/sin θ=−271
T-Tc=−10°

Table 2 (Page 2 of 4)
Compound of formula I where $R_1=OC_{10}H_{21}$, $R_2=(S)$—(OCH(CH$_3$)C$_6$H$_{11}$, $X_3=NO_2$, $X_1$, $X_2$ and $X_4=H$, k=1, m=0 and n=1 (W 320)

X←50°—C*←62.9°—N*←67.4°—I
P$_{ext}$/sin θ=−130
T-Tc=−10°

Compound of formula I where $R_2=OC_{10}H_{21}$, $R_1=(S)$—(OCH(CH$_3$)C$_6$H$_{11}$, $X_2=NO_2$, $X_1=X_3=X_4=H$, n=1, k=1, and m=0 (W 316)

X←17.5°—C*←60.5°—A←89.1°—I
P$_{ext}$/sin θ=−330
T-Tc=−10°

Compound of formula I where $R_2=(S)$—(OCH(CH$_3$)C$_6$H$_{11}$ $R_1=OC_{10}H_{21}$, $X_1=NO_2$, $X_2=X_3=X_4=H$, k=1, and n=0 and m=1 (W 317)

X←23.5°—A←76.5°—I
X—41°→A—76.5→I Table 2 (Page 3 of 4)
Compound of formula II where $R_1=OC_{10}H_{21}$, $R_2=(R)$—(OCH(CH$_3$)CO$_2$C$_2$H$_5$, $X_1=NO_2$, $X_2=X_3=H$, and n=1 (W 334)

For a 10% mixture in MDW 158
X←23°—C*←60.5°—A←67.5°—I
P$_{ext}$ T-Tc=−10°+79.4
P$_{ext}$ T-Tc=−35.5°=+199
P$_{ext}$/sin θ=+238
T-Tc=−10°

Compound of formula II where $R_1=OC_{10}H_{21}$, $R_2=(R)$—(OCH(CH$_3$)CO$_2$C$_2$H$_5$, $X_1=X_2=X_3=H$, and n=1 (W 336)

For a 10% mixture in MDW 158
X←20°—C*←56.6°—A*←64.3°—N*←66.8°—I
P$_{ext}$ T-Tc=−10°=+63
P$_{ext}$ T-Tc=−31.6°=+100
P$_{ext}$/sin θ=+164
T-Tc=−10°

The 1:1 mixture of W 316 and W 317
X←<rt—C*←45°—A*←79°—I
X←<rt→C*
P$_{ext}$ T-Tc=−23°=−222
P$_{ext}$/sin θ=−545
T-Tc=−23°

Table 2 (Page 4 of 4)
Compound of formula II where $R_1=OC_{10}H_{21}$, $R_2=(R)$—(OCH(CH$_3$)CO$_2$C$_2$H$_5$, $X_1=NO_2$, $X_2=X_3=H$, and n=1 (W 334)

For a 10% mixture in ZLI 3234B
X←<10°—C*←53.7°—A*←68.8°—N*←85°—I
P$_{ext}$ T-Tc=−10°=+112
P$_{ext}$ T-Tc=−43.7°=+203

$P_{ext}/\sin\theta = +362$

T-Tc=−10°

Compound of formula I where $R_2$=OC$_{10}$H$_{21}$, $R_1$=(S)—(OCH(CH$_3$)C$_6$H$_{11}$, X$_2$=NO$_2$, X$_4$=NH$_2$, X$_1$=X$_3$=H, k=1, m=1 and n=0 (W 341)

For a 5% mixture in MDW 158

X←−6°—C*←−70.5°—N*←−75°—I $P_{ext}$ T-Tc=−10°=−141

$P_{ext}$ T-Tc=−40.5°=−202

$P_{ext}/\sin\theta$=−310

T-Tc=−10°

The 1:1 mixture of W 314 and W 317

X←−rt—C*←−51°—A*←−97°—I $P_{ext}$ T-Tc=−29°=−272

$P_{ext}/\sin\theta$=−610

T-Tc=−29°

Table 2 summarizes phase sequences, polarization densities and tilt angles of some exemplary FLC compounds of formula I, and phase sequences, polarization densities and tilt angles of some exemplary FLC mixtures containing exemplary compounds of formulas I and II. In Table 2, the phases are noted as X=crystal, I=isotropic liquid, A=smectic A, C*=chiral smectic C, and phase transition temperatures are given in °C. Also, names such as W 314 are given to the compounds in Table 2 for easier reference.

Polarization densities (P) are given in nC/cm² and the magnitude of P was measured by integration of the dynamic current response to a surface stabilized ferroelectric liquid crystal cell on reversing the applied electric field using a slight modification of the standard methods of Martinot-Lagarde (1976) J. Phys. Colloq. (Orsay, Fr.) 37:129 and Martinot-Lagarde (1977) J. Phys. Lett. (Orsay, Fr.) 38:L-17. The polarization reversal current was measured after applying a triangular wave form (±15 volts) across a 2.5 μm (using polyimide spacers) polymer aligned (DuPont Elvamide 8061) SSFLC cell (Patel, J. S. et al. (1986) J. Appl. Phys. 59:2355; Flatischler, K. et al., (1985) Mol. Cryst. Liq. Cryst. 131:21; Patel, J. S. et al. (1984) Ferroelectrics 57:137) with indium-tin oxide (ITO) conducting glass electrodes. The signal (current v. time) was digitized using a Sony-Tektronix 390AD programmable digitizer. The current waveform showed a peak characteristic of the polarization reversal; this current peak was integrated. Division of the value of this integration (charge) by the active area of the cell afforded the magnitude of the ferroelectric polarization. For all measurements, the diameter of the ITO coated area of the cell was 0.50 inch. The sign of the polarization was determined directly from observation of molecular orientation in SSFLC cells upon application of electric fields.

The optical tilt angle was determined by rotating the shear or polymer aligned cell until extinction was obtained. The polarity of the cell was reversed and the cell was rotated by a measured angle to obtain extinction again. The angle by which the cell was rotated is equal to 2θ. The tilt angle was obtained by dividing this angle by two. Tilt angles and polarizations were measured as a function of temperature, and the data are shown in graphical form in PCT application US 92/03427 published Nov. 12, 1992. For comparison purposes, the values of the normalized polarization (P/sin θ at T-T$_c$=−10° C., where T$_c$ is the temperature of the transition into the C* phase from a higher temperature) or the normalized extrapolated polarization ($P_{ext}/\sin\theta$ where $P_{ext}$ is the extrapolated polarization of the compound obtained by measuring the polarization of a mixture with a known C or C* host, and assuming that the polarization is linear with concentration of the components) are also given in Table 2.

In some of the measurements on mixtures, the smectic C materials W82=4'-(n-decyloxy)phenyl-4-(4(S)-methylhexyloxy) benzote, MDW 158=racemic W82, and ZLI 3234B (an achiral smectic C host material obtained from E. Merk, Darmstadt (see Geelhaar, T. (1988) Ferroelectrics 85:329-349) were used as hosts. W82 is known to possess an enantiotropic ferroelectric C* phase with a very low polarization density of the order of −1 nC/cm². MDW158 and ZLI 3234B are racemic and achiral C phases, respectively, and therefore possess zero polarization. Mixtures of the compounds of the present invention (guests) with these hosts possess polarization density deriving primarily or exclusively from the guest component. Extrapolated polarizations were calculated assuming a linear relationship between polarization and concentration of the components. It is understood that this extrapolation is not rigorous, and that the extrapolated values are only approximate.

Finally, the X$^{(2)}$ of two of the compounds of formula I as measured by the SHG method are also given in Table 2. The data were obtained using the method of type 1 eeo angle phase matched second harmonic generation from 1,064 nm Nd:YAG laser light, combined with Maker fringe experiments and a computational curve-fitting technique to extract the individual components of the d tensor. The application of type 1 eeo angle phase matched SHG to ferroelectric liquid crystals (including ZLI 3654; see Table 1) is reported in: Taguchi (1989) supra. The determination of the individual d-tensor coefficients for a ferroelectric liquid crystal (SCE 9; see Table 1) by this method is described in: Liu (1990) supra.

Referring to the data in Table 2, it should be noted that several of the compounds of formula I possess broad monotropic and in some cases enantiotropic smectic C* liquid crystal phases. Thus achiral or racemic materials of this type are useful as FLC host materials.

It is an important feature of the present invention that the compounds of formulas I and II where X$_1$ and/or X$_2$ are NO$_2$, and R$_2$ and/or R$_1$, respectively, are chiral nonracemic core-coupling tails, possess large ferroelectric polarization density. For example, the compound of formula I wherein X$_1$=NO$_2$, X$_2$=X$_3$=X$_4$=H, R$_1$=OC$_{10}$H$_{21}$, R$_2$=((S)—OCH (CH$_3$)C$_6$H$_{13}$, k=1, m=0, and n=1, also known as W 314, shows a polarization density of −556 nC/cm² at 34° C. To our knowledge this is the highest polarization density reported to date for an FLC with one chiral tail. This is important in the present invention since the functional group array for this compound providing the large B axis oriented along the polar axis also possesses a large nearly colinear permanent molecular dipole moment. Specifically, this functional group array is the o-nitroalkoxy unit, similar to that present in the parent o-nitroanisole as illustrated below.

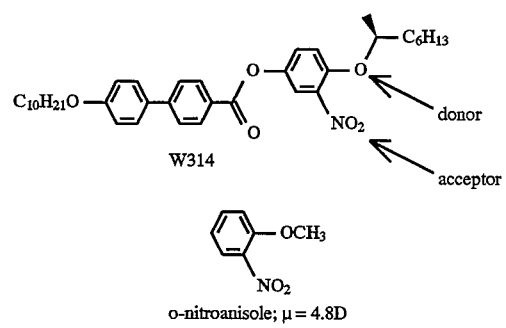

The dipole moment of o-nitroanisole is reported to be 4.8D (McClellan, A. L. (1963) *Tables of Experimental*

*Dipole Moments;* W. H. Freeman and Company: San Francisco). The observed ferroelectric polarization density of W 314, expressed in units of D/molecule, and assuming a density of about 0.8 gms/cm$^3$, is $P_{W314}=-2.1$ D/molecule. Thus, making the reasonable assumption that the nitroalkoxy unit is responsible for the observed polarization, we can see that about 40% of the dipole of the molecules is actually oriented along the polar axis in the FLC phase of W 314. It should be noted that this is much better (by at least a factor of 2) than could be achieved for the same functional array and the same number density of nitroalkoxy units using the poled polymer method.

The large observed polarization density of the FLC phase of W 314, coupled with the fact that the NLO active unit has a large molecular dipole moment, leads to the conclusion that the NLO active units of W 314 are indeed well aligned along the polar axis in the FLC phase. This is consistent with the NLO results obtained for W 314 as shown in Table 3. Note that the second harmonic intensity at the top of the angle phase-matched peak is $8\times10^4$ times that of DOBAMBC, and that the magnitudes of the largest coefficients of the d tensor are in fact larger than that for KDP (see Table 1), even though the data were taken at an elevated temperature of 60° C., where the polar order (as evidenced by the ferroelectric polarization density) is considerable smaller than at 34° C. To our knowledge this compound possesses the largest $X^{(2)}$ measured for any ferroelectric liquid crystal.

TABLE 3

Values of the ferroelectric polarization, SHG efficiency, and $X^{(2)}$ ($d_{eff}$ and d coefficients), for FLCs of the present invention.

| Entry number | compound | P (nC/cm$^2$) | SHG arb units* | $d_{eff}$ (pm/V) | d coefficients (pm/V) |
|---|---|---|---|---|---|
| 1 | W 314 The compound of formula I where $R_1 =$ n-$C_{10}H_{21}$, $R_2 =$ (S)—(CH(CH$_3$)C$_6$H$_{11}$, $X_1 = NO_2$, $X_2 = X_3 = X_4 = H$, m = 0 and n = 1 | −420† | $8 \times 10^4$ | 0.23 | $d_{2,3} = 0.63 \pm 0.03$ $d_{2,2} = 0.6 \pm 0.3$ $d_{2,1} = 0.08 \pm 0.02$ $d_{2,5} = 0.16 \pm 0.05$ |
| 2 | W 316 Compound of formula I where $R_2 =$ n-$C_{10}H_{21}$, $R_1 =$ (S)—(CH(CH$_3$)C$_6$H$_{11}$, $X_2 = NO_2$, $X_1 = X_3 = X_4 = H$, n = 1 and m = 0 | −246 | $2 \times 10^4$ | 0.1 | |

*Intensity of the second harmonic light at the top of the type 1 eeo angle phase-matched peak.
†The SHG measurements with W 314 were performed at 60° C., where P ≅ −420 nC/cm$^2$.

TABLE 4

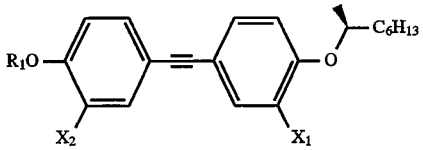

W335, $X_1 = H$, $X_2 = H$, $R_1 = n-C_{10}H_{12}$
MX511, 10% (wt) W335 in MDW158

$X \xleftarrow{21.2} C^* \xleftarrow{64.2} A^* \xleftarrow{68} N^* \xleftarrow{70} I$ $X \xrightarrow{} C^* \xrightarrow{74} N^* \xrightarrow{77} I$ $P_{ext} = -46$ nC/cm² @ 25° C., T−Tc = −39° C., Θ = 23.5°
$P_{ext} = -37$ nC/cm² @ 55° C., T−Tc = −10° C., Θ = 18.5°
MX545, 10% (wt) W335 in W346

$X \xleftarrow{} SB \xleftarrow{7} C^* \xleftarrow{75.5} A^* \xleftarrow{112} I$ $P_{ext} = -150$ nC/cm² @ 30° C., T−Tc = −45.5° C., θ = 29°

$P_{ext} = -120$ nC/cm² @ 65° C., T−Tc = −10° C., Θ = 24.5°
MX546, 16% (wt) W355 in W346

$X \xleftarrow{23} C^* \xleftarrow{69} A^* \xleftarrow{105.8} I$ $P_{ext} = -160$ nC/cm² @ 24° C., T−Tc = −45° C., Θ = 29°
$P_{ext} = -94$ nC/cm² @ 60° C., T−Tc = −10° C., Θ = 22.5°

W333, $X_1 = NO_2$, $X_2 = H$, $R_1 = n-C_{10}H_{21}$
MX542, 10% (wt) W333 in W346

$X \xleftarrow{<31} C^* \xleftarrow{67} A^* \xleftarrow{107} I$ $X \xrightarrow{} C^* \xrightarrow{68} A^* \xrightarrow{107} I$ $P_{ext} = -290$ nC/cm² @ 25° C., T−Tc = −43° C., Θ = 28°
$P_{ext} = -180$ nC/cm² @ 55° C., T−Tc = −10° C., Θ = 18.3°

W340, $X_1 = NO_2$, $X_2 = NO_2$, $R_1 =$ 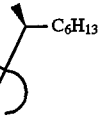

MX547, 10% (wt) W340 in W346

$X \xleftarrow{<32} C^* \xleftarrow{55.5} A^* \xleftarrow{113} I$ $X \xrightarrow{57} A^* \xrightarrow{14} I$ $P_{ext} = -250$ nC/cm² @ 25° C., T−Tc = −30.5° C., Θ = 27.5°
$P_{ext} = -200$ nC/cm² @ 45° C., T−Tc = −10° C., Θ = 26°

TABLE 5

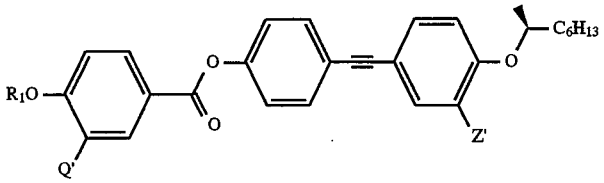

W355, $Z' = H$, $Q' = H$, $R_1 = n-C_{10}H_{21}$ $X \xleftarrow{} S_7 \xleftarrow{61} C^* \xleftarrow{79} N^* \xleftarrow{114} I$ $X \xrightarrow{61} C^* \xrightarrow{75} N^* \xrightarrow{114} I$ $P = -27$ nC/cm² @ 65° C., T−Tc = −14° C., Θ = 26.5°
$P = -27$ nC/cm² @ 69° C., T−Tc = −10° C., Θ = 26.5°
W349, $Z' = NO_2$, $Q' = H$, $R_1 = n-C_{10}H_{21}$ $X \xrightarrow{36} A^* \xrightarrow{80} I$ $X \xleftarrow{} SB \xleftarrow{5} A^* \xleftarrow{80} I$ MX541, 10% (wt) W349 in W346

$X \xleftarrow{29} C^* \xleftarrow{80.5} A^* \xleftarrow{120} I$ $X \xrightarrow{36} C^*$ $P_{ext} = -350$ nC/cm² @ 30° C., T−Tc = −50.5° C., Θ = 30.5°

$P_{ext} = -170$ nC/cm² @ 70° C., T−Tc = −10° C., Θ = 26°

MX548, 25% (wt) W349 in W346

$X \xleftarrow{<25} C^* \xleftarrow{74.9} A^* \xleftarrow{115} I$ $X \xrightarrow{36} C^*$ $P_{ext} = -280$ nC/cm² @ 20° C., T−Tc = −54.9° C., Θ = 28°
$P_{ext} = -190$ nC/cm² @ 65° C., T−Tc = −10° C., Θ = 23.5°

MX549, 50% (wt) W349 in W346

$X \xleftarrow{25} C^* \xleftarrow{45.7} A^* \xleftarrow{105.5} I$ $X \xrightarrow{36} C^*$ $P_{ext} = -95$ nC/cm² @ 10° C., T−Tc = −35.7° C., Θ = 14°
$P_{ext} = -57$ nC/cm² @ 35° C., T−Tc = −10° C., Θ = 11°
MX556, 20% (wt) W349 in [75% W346/25% MDW158]

$X \xleftarrow{<14} C^* \xleftarrow{62} A^* \xleftarrow{105} I$ $X \xrightarrow{<14} C^* \xrightarrow{62} A^* \xrightarrow{107} I$ $P_{ext} = -200$ nC/cm² @ 15° C., T−Tc = −47° C., Θ = 25°
$P_{ext} = -133$ nC/cm² @ 50° C., T−Tc = −10° C., Θ = 16.5°

W350, $Z' = NO_2$, $Q' = NO_2$, $R_1 =$ 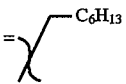

Liquid at room temperature, no apparent LC
phase down to −20° C.
MX550, 10% (wt) W349 in W346

$X \xleftarrow{23} C^* \xleftarrow{69} A^* \xleftarrow{106} I$ $X \xrightarrow{30} C^*$ $P_{ext} = -720$ nC/cm² @ 25° C., T−Tc = −44° C., Θ = 30.5°
$P_{ext} = -460$ nC/cm² @ 60° C., T−Tc = −10° C., Θ = 24.5°

While the individual components of the d tensor have not yet been measured, angle phase-matched SHG from the compound of formula I wherein $X_2=NO_2$, $X_1=X_3=X_4=H$, $R_1=((S)—CH(CH_3)C_6H_{13}$, $R_2=C_{10}H_{21}$, n=1 and m=0, also known as W 316, is also large relative to previously known FLC materials as shown in Table 3.

The polarization density observed for the compound of formula I where $X_1=H$, $X_3=NO_2$, $X_2$ and $X_4=H$, $R_1=OC_{10}H_{21}$, and $R_2=(S)—(O(CH(CH_3)C_6H_{13}$, k=1, m=0, and n=1 (W 320) exhibits the same polarization expected for the compound where all the X groups are H (Furukawa (1988) supra, Walba (1991) supra). Similarly, the compound of formula II where where $R_1=OC_{10}H_{21}$, $R_2=((R)$—$(OCH(CH_3)CO_2C_2H_5)$, $X_1=NO_2$, $X_2=X_3=H$, and n=1 (W 334) shows a considerably larger extrapolated polarization in two hosts than the compound of formula II where $R_1=OC_{10}H_{21}$, $R_2=((R)$—$(OCH(CH_3)CO_2C_2H_5)$, $X_1=X_2=X_3=H$, and n=1 (W 336).

Also provided is the compound of formula I where $R_2=(S)$—$(OCH(CH_3)C_6H_{11})$, $R_1=OC_{10}H_{21}$, $X_1=NO_2$, $X_2=X_3=X_4=H$, k=1, n=0 and m=1 (W 317). This compound possesses a broad temperature smectic A phase, but no smectic C* phase. It is known that chiral smectic A LC materials exhibit the electroclinic effect (Garoff, S., et al., (1977) Phys. Rev. Lett. 28:848) and that the electroclinic effect can be useful for electrooptic device applications of the type involving nuclear motions (Andersson, G., et al., (1987) Appl. Phys. Lett. 51:640). The compound of the present invention (W 317) exhibits a surprisingly large, relatively temperature independent electroclinic effect far from the virtual smectic C*-smectic A transition. When $R_1=\omega$-decenyloxy, the electroclinic effect of the W 317 alkene is approximately half as large.

Finally, two mixtures containing only components of formula I, and possessing room temperature C* phases, including one mixture with an enantiotropic room temperature C* phase (1:1 W316 and W 317) are provided. This illustrates the general fact that when LC components with immiscible crystal phases but miscible LC phases are mixed, then the temperature range of the LC phases are broadened. This technique can produce stable room temperature FLC mixtures composed entirely of the compounds of the present invention. The mixtures wherein W317 is a component, in particular the 1:1 mixture of W316 and W317, also exhibits a large electroclinic effect in the smectic A phase.

The FLC properties of the compounds of formula II are illustrated by the properties of the compounds and mixtures listed in Table 4.

The FLC properties of the compounds of formula IV are illustrated by the properties of the compounds and mixtures listed in Table 5. Of particular interest is the high polarization room temperature smectic C* mixture MX556 of W349 in a 3:1 (by weight) mixture of W346 with MDW158. W346 is racemic W314. Also of interest is W350 which has a very high extrapolated polarization density.

Although not wishing to be bound by any theory, it is believed that the properties of the compounds of the present invention may be qualitatively understood and interpreted in terms of the diagrams shown in Schemes XV–XVIII. These diagrams assume that in the smectic C phase the "crystal packing" forces exerted on an individual molecule by the rest of the molecules in the phase may be approximated by a binding site taking the shape of a bent cylinder (see Walba, D. M., et al., (1986) J. Am. Chem. Soc. 108:5210–5221 and Walba (1991) supra). The functional group orientation occurring in the phase may be considered to result from the way the molecules "dock" into this binding site. The diagrams afford a qualitative estimate of how the molecules are oriented relative to the C* phase tilt plane when docked in a preferred way in the binding site. In order to make this estimate, a judgment concerning the preferred conformations present in the phase, and how these conformations dock into the binding site must be made. For many FLC structural types, it is possible to make educated guesses as to these preferred conformations and their docking mode. Such educated guesses were used to construct the diagrams shown in the schemes.

Scheme XV illustrates the suggested origins of the ferroelectric polarization of compounds of formula I wherein $X_1$–$X_4$ are H, $R_2$ is (S)—$OCH(CH_3)C_6H_{13}$, k=1 and m=0. That is, the polarization derives from an excess of molecules occurring in orientation A relative to orientations B or C. In orientation A, the molecular dipole moment from the Ar—O—$C_\alpha$ functional group is oriented along the polar axis (normal to the tilt plane) in such a way that negative P is predicted (P is opposed to $\hat{z}\times\hat{n}$). If orientation C were favored, the positive P would be expected. If orientation B were favored, then small P would be expected since the dipole component oriented normal to the tilt plane is small. conformation A should be favored by simple conformational analysis arguments (i.e., the methyl group should prefer to be anti to the methylene group at $C_\gamma$ of the tail and the orientation shown relative to the tilt plane comes from the preferred mode of docking in the binding site.

Scheme XVI illustrates the suggested origins of the ferroelectric polarization and $X^{(2)}$ of compounds of formula wherein $X_1=NO_2$, $X_2$–$X_4$ are H, $R_2$ is (S)—$OCH(CH_3)C_6H_{13}$, k=1 and m=0. When one position ortho to the alkoxy tail is occupied by a nitro grouping and the other ortho position bears a hydrogen atom, the preferred conformation A now has two different possible orientations of the nitro group relative to the tilt plane. Due to a clear excess steric hindrance present in conformation A", it is suggested that conformation A' is preferred. In this conformation and orientation, the molecular dipole moment and the molecular β from the nitro alkoxy unit are oriented along the polar axis of the phase. An enhanced ferroelectric polarization relative to the compounds without the ortho nitro grouping is expected, as well as enhanced $X^{(2)}$.

In the case where the nitro grouping is meta to the alkoxy tail, as for example in the compound of formula I W320, no enhancement in the polarization or $X^{(2)}$ relative to compounds without a nitro substituent is expected. This can be seen by inspection of the diagrams in Scheme XVII. In this case the conformations A' and A" are expected to be close in energy, and to have almost equal number densities in the phase. Therefore, the nitroalkoxy grouping of this molecule is not expected to be oriented in a polar fashion relative to the tilt plane, and most or all of the polarization and $X^{(2)}$ of the molecule derives simply from the alkoxy grouping in the chiral tail.

Scheme XVIII illustrates the binding site model for orientation of the prototypical "large β" functional array, the p-nitroaniline unit, along the polar axis in FLC phases of compounds of formula I where $X_1=NO_2$, $X_3=NH_2$, $X_2$ and $X_4$ are H, $R_2$ is (S)—$OCH(CH_3)C_6H_3$, k=1 and m=0 ( diagram on the left), and where $X_2=NO_2$, $X_4=NH_2$, $X_1$ and $X_3$ are H, $R_1$ is (S)—$OCH(CH_3)C_6H_{13}$, k=1 and n=0 (diagram on the right). In the latter case, it is possible that the indicated intramolecular hydrogen bonding is also occurring between the carbonyl oxygen of the group (B)=COO, and one of the hydrogens on the nitrogen atom, leading to additional polar orientation of the carbonyl grouping as indicated.

These same arguments can be made for other core coupling chiral tails. Variation in the structure, length and degree of branching of the $R_1$ and $R_2$ groups of compound encompassed in formulas I and II can affect the liquid crystal properties of the pure material or mixtures containing them. For example, some of the chiral nonracemic compound of the present invention may possess smectic C* phases while others do not and the characteristics of any such smectic C* phases (i.e., stability, temperature range) may vary.

Scheme XV
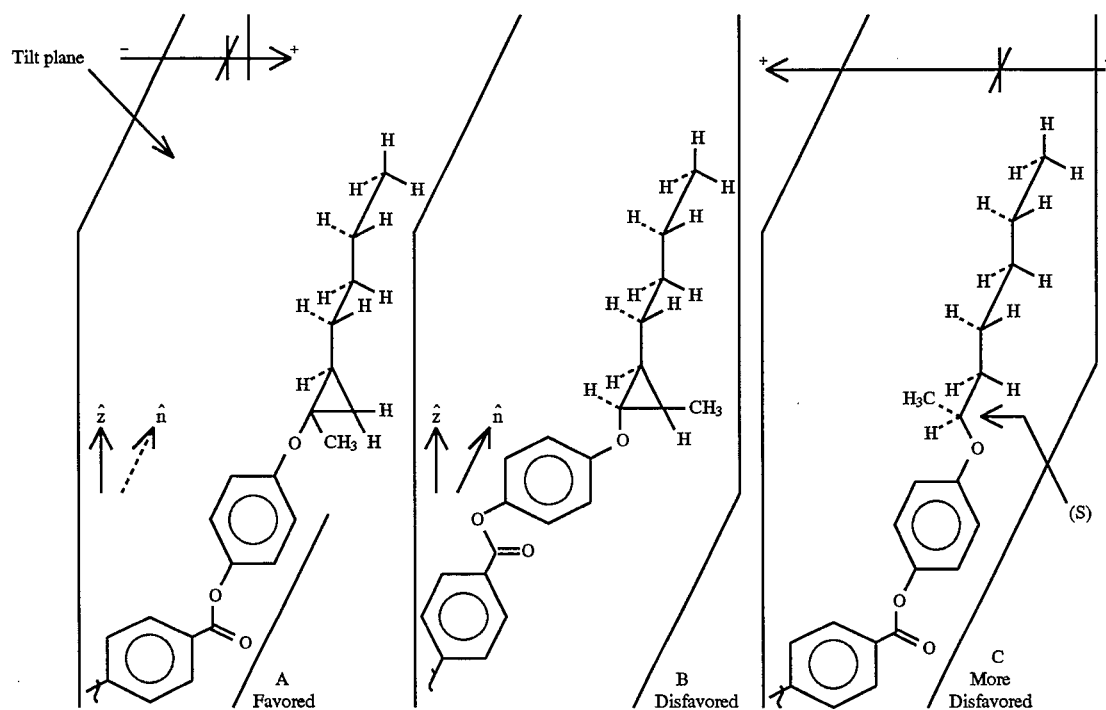
Scheme XVI
Predict large negative P and large γ(2)
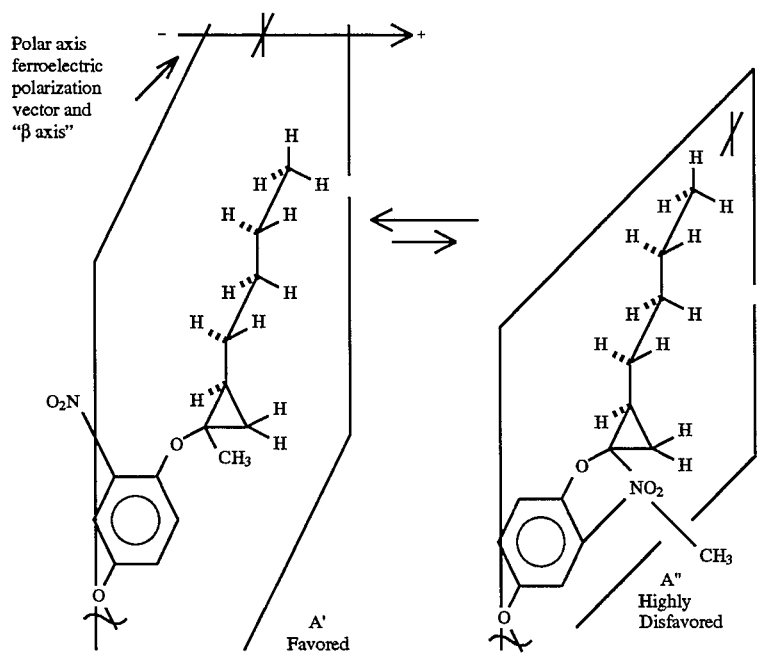

Scheme XVII

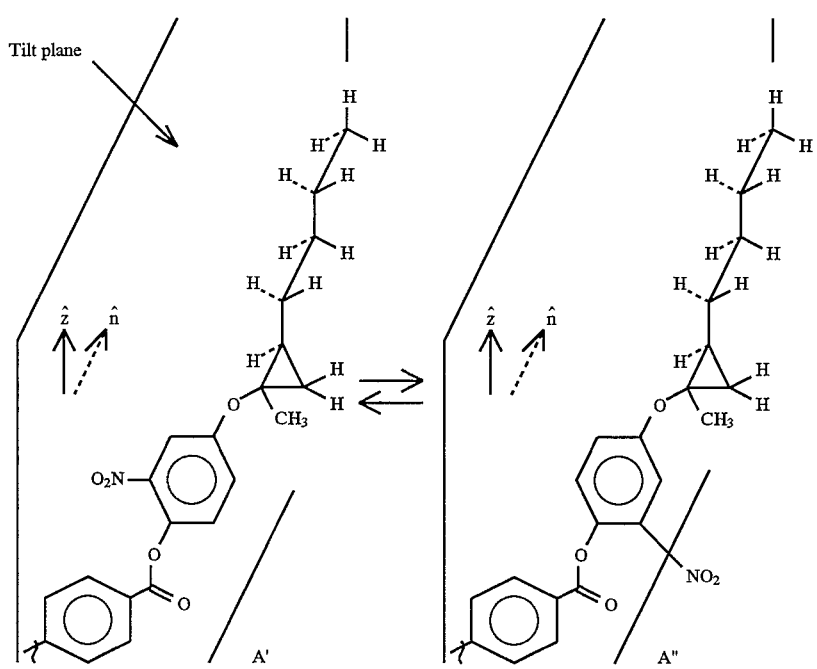

Scheme XVIII

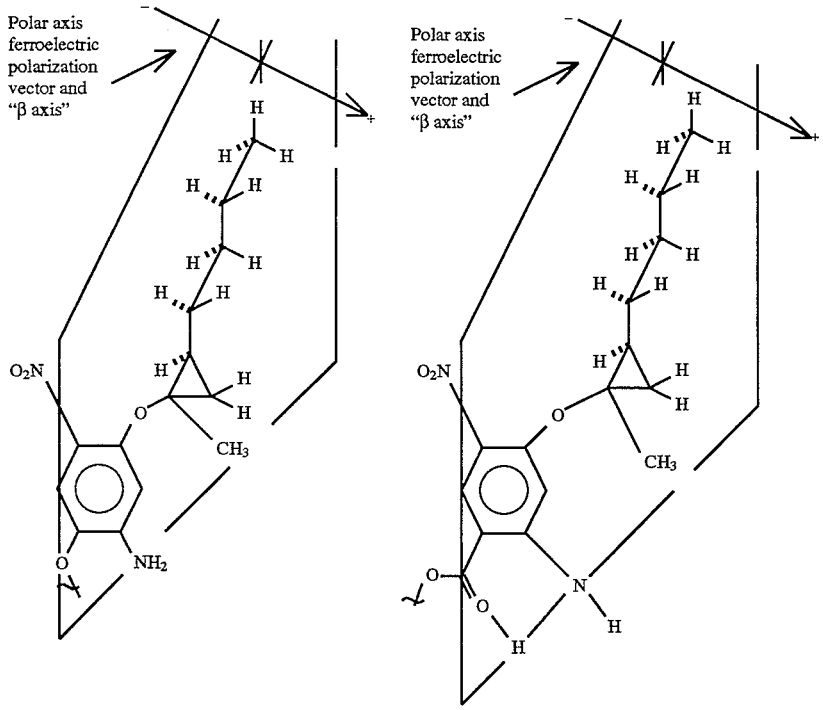

The following examples illustrate the invention and are in no way intended to limit the scope of the invention. In particular, it will be apparent to those of ordinary skill in the art that when attached to a polymeric backbone to give side-chain LC homopolymers or copolymers, the mesogenic units of the present invention may give FLC polymers with LC properties similar to the low molar mass mesogens of the present invention. In addition, such FLC polymers will, upon cooling, give crystalline, microcrystalline, or glassy polymer solids (Walba (1989) supra) with stable polar order which are of particular utility in certain NLO applications requiring a solid thin film material. It is within the skill of an ordinary artisan to prepare FLC polymers, such polysiloxanes, employing the compounds of the present invention, in particular the compounds wherein the achiral tail is an ω-alkenyl tail. It will be understood by those in the art that enantiomers will have equal magnitude but opposite sign of the ferroelectric polarization, and that such enantiomers are of similar utility for NLO applications and are encompased by this invention. This invention also encompasses mixtures of the compounds of the present invention with themselves or with any compatible hosts.

All references cited in this specification are hereby incorporated by reference in their entirety.

EXAMPLES

Example 1: Synthesis of (S)-4-(1-methylheptyloxy)-3-nitrophenol (compound 11 of Scheme I, $R_2$=(S)—OCH$(CH_3)C_6H_{13}$)

(S)—[4-(1-methylheptyloxy)-3-nitrophenyl]-benzoate

To an argon-flushed flask containing 8 mmol of nitrophenol 9 (Scheme I) (literature: Rajamohan, K. et al., (1973) indian J. Chem. 11:1076) and 1.25 eq. of triphenylphosphine dissolved 150 ml of dry THF, a solution of 8.08 mmol of (R)-2-octanol in 20 ml of dry THF was added via syringe. Then 1.25 eq. of diethyl azodicarboxylate dissolved in 40 ml of dry THF was added dropwise over 30 min. The reaction mixture was heated to 60° C. and stirred at this temperature for 19–22 h. Water (5 drops) was added and stirring was continued for another hour. The reaction mixture was evaporated and the crude product was extracted with a hexanes/ethyl acetate (70/30) and filtered through a short pad of silica gel. The filtrate was evaporated and the ether-derivative was purified by flash chromatography on silica gel to give (S)-[4-(1-methylheptyloxy)-3-nitrophenyl]-benzoate (compound 10, Scheme I, $R_2$=(S)—OCH$(CH_3)C_6H_{13}$) in 80–90% yield as a yellow liquid: $R_f$ [hexanes/ethyl acetate 85/15]: 0.52; $^1$H-NMR (300 MHz, CDCl$_3$): δ 0.82 (t, 3 H, J=6.8 Hz); 1.15–1.52(m, 8 H); 1.35(d, 1 H, J=6.1 Hz); 1.62(m, 1 H); 1.78(m, 1 H); 4.48(m, 1 H); 7.09(d, 1 H, J=9 Hz); 7.37(dd, 1 H, J=2.8 Hz, J=9 Hz); 7.46–7.67(m, 3 H); 7.70(d, 1 H, J=2.8 Hz); 8.16(dd, 2 H, J=2.1 Hz, J=7.2 Hz); $^{13}$C-NMR (300 MHz, CDCl$_3$): δ14.00, 19.45, 22.50, 25.18, 29.10, 31.66, 36.16, 76.94, 116.44, 119.12, 127.25, 128.71, 128.77, 130.24, 134.02, 140.44, 142.79, 149.57, 164.96; IR (CHCl$_3$): 3040, 2940, 2850, 1740, 1600, 1525, 1490, 1305, 1260, 1190, 1060, 1025, 900, 825 cm$^{-1}$; Mass spectrum, m/z(rel.intensity): 371 (M$^+$0.2), 259(3), 213(4), 184(14), 105(100), 77(15), 55(10), 43(19), 41(11).

Anal. Calcd. for $C_{21}H_{25}NO_5$: C 67.91, H 6.78, N 3.77. Found: C68.22, H 6.90, N3.99.

(S)-4-(1-methylheptyloxy)-3-nitro-phenol

To a solution of 5.3 mmol of ester 10 in 40 ml of methanol and 15 ml of water, 22 mmol of LiOH.H$_2$O was added. The reaction mixture was stirred vigorously at room temperature for 14–22 h until no starting material was detected by TLC. The solution was diluted with 65 ml of 3.5% (wt/wt) NaOH solution, acidified by adding concentrated HCl with ice and extracted several times with ethyl ether. The combined organic layers were dried over anhydrous MgSO$_4$ and the solvent removed. The phenol were purified by flash chromatography with hexanes/ethyl acetate [90:10] to give (S)-4-(1-methyl-heptyloxy)-3-nitro-phenol (Compound 11, Scheme I, $R_2$=(S)—OCH$(CH_3)C_6H_{13}$) in 89–98% yield as an orange liquid: $R_f$ [hexanes/ethyl acetate 85/15]: 0.24; $^1$H NMR (300 MHz, CDCl$_3$): δ 0.84(t, 3 H, J=6.8 Hz), 1.16–1.48(m, 8 H), 1.27(d, 3 H, J=6.1 Hz), 1.56(m, 1 H), 1.72(m, 1 H), 4.35(m, 1 H), 5.44(broad s, 1 H), 6.94(d, 1 H, J=9 Hz), 7.01(dd, 1 H, J=2.8 Hz, J=9 Hz), 7.28(d, 1 H, J=2.8 Hz); $^{13}$C NMR (300 MHz, CDCl$_3$): δ 13.98, 19.49, 22.50, 25.19, 29.15, 31.66, 36.19, 77.57, 112.03, 118.50, 121.44, 140.98, 145.81, 148.84; Mass spectrum, m/z(rel.intensity): 267(M$^+$ 0.3), 156(8), 155(100), 71(9) 57(20), 55(16), 43(29).

Anal. Calcd. for $C_{14}H_{21}NO_4$: C 62.90, H 7.92, N 5.24. Found: C 62.82, H 8.05, N 5.24.

Example 2. Synthesis of (S)-4'-(1-methylheptyloxy)-3'-nitro-4-hydroxybiphenyl (Compound 17, Scheme II, $R_2$=(S)—OCH$(CH_3)C_6H_{13}$)

4'-Hydroxy-4-biphenylyl-benzoate

To a solution of 100 mmol of biphenol in 120 ml of dry pyridine was added 1.5 eq. of benzoyl chloride dropwise over 45 min. The reaction mixture was stirred for another 45 min at room temperature and then 20 ml of ethanol was added and stirring was continued for 30 min. The mixture was poured into water-ice and stirred for 30 min. The precipitate was filtered and washed several times with water. The product phenol was purified by flash chromatography on silica gel with dichloromethane as eluent. Recrystallization from toluene afforded 4'-hydroxy-4-biphenylyl-benzoate (Compound 14, Scheme II, $R_2$=(S)—OCH$(CH_3)$ $C_6H_{13}$) as a white solid in 22% yield: $R_f$ [dichloromethane]: 0.25; $^1$H NMR (300 MHz, Acetone-d$_6$): δ 7.95(d, 2 H, J=8.8 Hz), 7.34(d, 2 H, J=8.5 Hz), 7.50–7.80(m, 7 H), 8.21(dd, 2 H, J=1.2 Hz J=8.3 Hz), 8.64(broad s, 1 H); $^{13}$C NMR (300 MHz, Acetone-d$_6$): δ 116.60, 123.02, 128.12, 128.90, 129.69, 130.62, 130.78, 132.33, 134.61, 139.65, 150.94, 158.14, 165.64; Mass spectrum, m/z(rel.intensity): 290(M$^+$ 16), 105(100), 77(29).

Anal. Calcd. for $C_{19}H_{14}O_3$: C 78.61, H 4.86. Found: C 79.02, H 4.80.

4'-Hydroxy-3'-nitro-4-biphenylyl benzoate

To an argon-flushed flask containing a suspension 0.486 g (1.68 mmol) of 4'hydroxy-4-biphenylyl benzoate in 10 ml of acetic acid at 10°–15° C., 0.345 ml of HNO$_3$ (d: 1.41) was added dropwise (about a drop per min). Then the reaction mixture was vigorously stirred at the same temperature for 30 min. Water (40 ml) was added and the mixture was again stirred for 30 min. The yellow precipitate was filtered, washed several times with water, dried and purified by flash chromatograPhY on silica gel using dichloromethane/hexanes [65/35] as eluent to give 4'-hydroxy-3'-nitro-4-biphenylyl benzoate (compound 15, Scheme II) as a yellow solid (0.539 g, 96%). This material was recrystallized from ethanol to give product of mp. 163° C.;. $R_f$ [hexanes/dichloromethane 40/60]: 0.42; $^1$H NMR (300 MHz, CDCl$_3$): δ 7.25(d, 1 H, J=8.7 Hz), 7.33(d, 2 H, J=8.7 Hz), 7.50–7.70 (m, 5 H), 7.84(dd, 1 H, J=2.7 Hz, J=8.7 Hz), 8.23(d, 2 H, J=7.2 Hz), 8.32(d, 1 H, J=2.7 Hz), 10.60(s, 1 H); $^{13}$C NMR (300 MHz, CDCL$_3$): δ 120.54, 122.45, 122.81, 127.85, 128.65, 129.33, 130.23, 133.04, 133.78, 136.04, 136.22, 150.91, 154.44, 165.15; IR (CHCL$_3$): 3250(broad), 3020, 1740, 1620, 1540, 1510, 1490, 1325, 1270, 1225, 1220, 1170, 1080, 1065, 1025, 1000, 850 cm$^{-1}$; Mass spectrum, m/z(rel.intensity): 335(M$^+$ 7) , 105(100) , 77(16).

Anal. Calcd. for $C_{19}H_{13}NO_5$: C 68.06, H 3.91, N 4.18. Found: C 68.11, H 3.84, N 4.03.

(S)-4'-(1-methylheptyloxy)-3'-nitro-4-biphenylylbenzoate

4'-Hydroxy-3'-nitro-4-biphenylyl benzoate was alkylated using the same procedure as that used to prepare (S)-[4-(1-methylheptyloxy)-3-nitrophenyl]-benzoate to give (S)-4'-(1-methyl-heptyloxy)-3'-nitro-4-biphenylylbenzoate (Compound 16, Scheme II, $R_2$=(S)—OCH$(CH_3)C_6H_{13}$) as a slightly yellow solid; (top. 39° C.). $R_f$ [toluene/hexanes 70/30]: 0.27; $^1$H NMR(300 MHz, CDCl$_3$); δ 0.87(t, 3 H, J=6.7 Hz), 1.20–1.55(m, 8 H), 136(d, 3 H, J=6.1 Hz), 1.65(m, 1 H), 1.80(m, 1 H), 4.53(m, 1 H), 7.11(d, 1 H, J=8.8 Hz), 7.28(d, 2 H, J=8.7 Hz), 7.46–7.65(m, 5 H), 7.68(dd, 1

H, J=2.4 Hz, J=8.8 Hz), 7.98(d, 1 H, J=2.4 Hz), 8.21(dd, 2 H, J=1.5 Hz, J=7.2 Hz); $^{13}$C NMR (300 MHz, CDCl$_3$); δ 13.99, 19.48, 22.50, 25.16, 29.11, 31.66, 36.17, 76.51, 116.10, 122.34, 123.77, 127.81, 128.63, 129.33, 130.21, 131.95, 132.46, 133.75, 136.35, 141.07, 150.69, 165.18; Mass spectrum, m/z(rel.intensity): 447(M$^+$ 5), 417(12), 416 (9), 335(16), 305(13), 105(100), 77(8), 71(12), 57(18), 55(10), 43(30).

Anal. Calcd. for C$_{27}$H$_{29}$NO$_5$: C 72.46, H 6.53, N 3.13. Found: C 72.46, H 6.55, N 3.10.

(S)-4'-(1-methylheptyloxy)-3'-nitro-4-hydroxybiphenyl

The benzoyl ester of (S)-4'-(1-methylheptyloxy)-3'-nitro-4-biphenylylbenzoate was saponified using the same procedure as that used for saponification of (S)-[4-(1-methylheptyloxy)-3-nitrophenyl]-benzoate except that the reaction was carried out at 60° C. to give (S)-4'-(1-methylheptyloxy)-3'-nitro-4-hydroxybiphenyl (Compound 17, Scheme II, R$_2$=(S)-OCH(CH$_3$)C$_6$H$_{13}$) as a very viscous orange liquid after flash chromatography with hexanes/ethyl acetate [88/12]; R$_f$ [hexanes/ethyl acetate 85/15]: 0.17; $^1$H NMR (300 MHz, CDCl$_3$): δ o.86(t, 3 H, J=6.6 Hz), 1.18–1.52(m, 8 H), 1.35(d, 3 H, J=6.1 Hz), 1.62(m, 1 H), 1.78(m, 1 H), 4.50(m, 1 H), 5.22(broad s, 1 H), 6.89(d, 2 H, J=8.5 Hz), 7.07(d, 1 H, J=8.8 Hz), 7.39( d, 2 H, J=8.5 Hz), 7.62(dd, 1 H, J=2.4 Hz, J=8.8 Hz), 7.92(d, 1 H, J=2.4 Hz); $^{13}$C NMR (300 MHz, CDCl$_3$): δ 13.99, 19.49, 22.50, 25.19, 29.10, 31.65, 36.17, 76.57, 115.94, 116.17, 123.30, 127.99, 131.21, 131.64, 133.09, 141.00, 15.42, 155.52; IR (CHCl$_3$); 350, 3300(broad), 3020, 2920, 2840, 1610, 1540, 1510, 1485, 1350, 1260, 1220, 1160, 1110, 1040, 925, 825 cm$^{-1}$; Mass spectrum, m/z(rel.intensity): 343( M$^+$ 5), 231(100), 185(6), 57(6), 43(12).

Anal. Calcd. for C$_{20}$H$_{25}$NO$_4$: C 69.95, H 7.34, N 4.08. Found: C 69.84, H 7.44, N 4.08.

Example 3. Synthesis of (S)-4(1-methyl-heptyloxy)-2-nitro-phenol (Compound 20, Scheme III, R$_2$=(S)—OCH(CH$_3$)C$_6$H$_{13}$)

(S)-p-Benzyloxy-(1-methylheptyloxy)benzene

To an argon-flushed flask containing a solution of 3.01 g (15 mmol) of p-benzyloxy-phenol and 1.25 eq of triphenylphosphine in 220 ml in dry dichloromethane, was added a solution of 4.91 g (15.14 mmol) of (R)-2-octanol in 30 ml of dry dichloromethane via syringe. Then 1.20 eq of diethyl azodicarboxylate dissolved in 60 ml of dry dichloromethane was added dropwise for 30 min. The reaction mixture was stirred at room temperature for 19 h, Then 5 drops of water were added and the mixture was stirred for 1 h. The solvent was then evaporated and the residual crude product was triturated in a mixture of hexanes/ethyl acetate [70/30] for 1 h and filtered through a short silica gel pad. The filtrate was evaporated and the product was purified by flash chromatography on silica gel using dichloromethane/hexanes [10/90] as eluent, affording 3.32 g (71%) of (S)-p-Benzyloxy-(1-methylheptyloxy) benzene (Compound 18, Scheme III, R$_2$=(S)—OCH(CH$_3$)C$_6$H$_{13}$) as a colorless liquid: R$_f$ [dichloromethane/hexanes 10/90]: 0.13; $^1$H NMR (300 MHz, CDCl$_3$): δ 0.87(t, 3 H, J=6.6 Hz), 1.20–1.60(m, 12 H), 1.70(m, 1 H), 4.21(m, 1 H), 5.00(s, 2 H), Distorted AA'BB' System [6.82(d, 2 H) 6.88(d, 2 H)], 7.30–7.46(m, 5 H); $^{13}$C NMR (300 MHz, CDCl$_3$): δ 14.02, 19.77, 22.55, 25.52, 29.26, 31.77, 36.51, 70.63, 74.95, 115.77, 117.35, 127.49, 127.87, 128.55, 137.39, 152.53, 153.01; IR (CHCl$_3$): 3010, 2940, 2850, 1600, 1500, 1475, 1450, 1375, 1230, 1200, 1125, 1025, 925, 825 cm$^{-1}$; Mass spectrum, m/z (rel. Intensity): 312(M$^+$ 7), 212(15), 91(100), 71(5), 57(8), 43(10).

(S)-p-(1-methylheptyloxy)phenol

A flask fitted with a gas inlet tube was charged with a suspension of 10% Pd/C (6 g) in 100 ml of dry dichloromethane. The flask was evacuated and filled with argon, then evacuated again and filled with hydrogen, which was then allowing to bubble through the stirred suspension for 30 min before a solution of 30 mmol of benzyl ether in 70 ml of dry dichloromethane was added via syringe. After the reaction was judged complete by TLC (about 4 h) hydrogen ebullition was stopped, and the resulting suspension was filtered through a Celite pad. The solvent was evaporated and the resulting crude product was purified by flash chromatography on silica gel (hexanes/ethyl acetate [99/1]) to give (S)-p-(1-methylheptyloxy)phenol (Compound 19, Scheme III, R$_2$=(S)—OCH(CH$_3$)C$_6$H$_{13}$) as a colorless liquid in 85–97% yield: R$_f$ [hexanes/ethyl acetate 95/5]: 0.15. [α]$_D^{25}$: +11.5° (c 3.31, CHCl$_3$) (Literature value=+11.4° (c 10.1, CHCl$_3$): Inukai, T. et. al., (1986) Mol. Cryst. Liq. Cryst. 141:251); $^1$H NMR (300 MHz, CDCl$_3$): δ 0.87(t, 3 H, J=6.3 Hz), 1.15–1.56(m, 9 H), 1.23(d, 3 H, J=6.1 Hz) , 1.70(m, 1 H), 4.17(m, 1 H), 5.28(s, 1 H), Distorted AA'BB' System [6.72(d,2 H) 6.76(d, 2 H)]; $^{13}$C NMR (300 MHz, CDCl$_3$): δ 14.00, 19.72, 22.52, 25.49, 29.22, 31.74, 36.43, 75.55, 116.08, 117.85, 149.64, 152.12; IR (CHCl$_3$): 3600, 3480(broad), 3010, 2940, 2850, 1600, 1500, 1450, 1375, 1225, 1170, 1120, 1030, 925, 825 cm$^{-1}$; Mass spectrum, m/z (rel.intensity): 222(M$^+$ 5), 110(100), 43(7).

(S)-4(1-methylheptyloxy)-2-nitro-phenol

To an argon-flushed flask containing 85 mg (1 mmol) of NANO$_3$, 4.3 mg (0.01 mmol) of La(NO$_3$).6 H$_2$O, 1.2 ml of water and 0.8 ml of HCl, was added a solution of 222 mg (1 mmol) of (S)-4-(1-methylheptyloxy)-phenol in 6 ml of ethyl ether. After 4 h 30 min of vigorous stirring at room temperature the reaction mixture took on a yellow color that changed very fast to orange. After turning orange, the mixture was stirred for another 15–20 min and then water was added. The organic layer was separated and the aqueous layer was extracted several times with water. The combined organic layers were washed with water until the washes were pH-6 and then with brine. The resulting organic solution was dried and the solvent evaporated. Flash chromatography on silica gel with hexanes/ethyl acetate [99/1] (other eluents were used with the same results) afforded a mixture of two compounds that could be purified by flash chromatography on alumina [activity grade III, 6% of water] using Cl$_4$C→Cl$_4$C/Cl$_2$CH$_2$ [80/20] as eluent. The first fractions afforded 130 mg (50%) of (S)-4-(1-methyl-heptyloxy)-2-nitrophenol (Compound 20, Scheme III, R$_2$=(S)—OCH(CH$_3$)C$_6$H$_{13}$) as an orange liquid; R$_f$ [toluene/hexanes 45/55]: 0.45; $^1$H NMR (300 MHz, CDCl$_3$): δ 0.86(t, 3 H, J=6.7 Hz), 115–1.46(m, 11 H), 1.56(m, 1 H), 1.67(m, 1 H), 4.28(m, 1 H), 7.03(d, 1 H, J=9.2 Hz), 7.17(dd, 1 H, J=2.9 Hz, J=9.2 Hz), 7.47(d, 1 H, J=2.9 Hz), 10.27(s, 1 H); $^{13}$C NMR (300 MHz, CDCl$_3$): δ 13.97, 19.34, 22.50, 25.32, 29.14, 31.69, 36.16, 75.32, 108.53, 120.72, 128.71, 133.11, 149.78, 151.16; IR (CHCl$_3$): 3250(broad), 3010, 2930, 2840, 1600, 1570, 1480, 1425, 1375, 1325, 1250, 1125, 1075, 975, 825 cm$^{-1}$; Mass spectrum, m/z (rel.intensity): 267(M$^+$ 5), 155 (100), 71(21), 57(21), 55(10), 43(27);

Anal. Calcd. for C$_{14}$H$_{21}$NO$_4$: C 62.90, H 7.92, N 5.24. Found: C 62.16, H 7.82, N 5.06.

Example 4. Synthesis of (S)-4'-(1-methyl-heptyloxy)-4-hydroxy-3-nitro-biphenyl (Compound 41, Scheme VIII, R$_2$=(S)—OCH(CH$_3$)C$_6$H$_{13}$)

(S)-4'-(1-Methylheptyloxy)-4-biphenylyl benzoate

To an argon-flushed flask containing 2.32 g (8 mmol) of 4'-hydroxy-4-biphenylyl benzoate and 1.25 eq of triphenylphosphine in 200 ml of dry THF was added a solution of 1.052 g (8.08 mmol) of (R)-2-octanol dissolved in 15 ml of dry THF via syringe. Then 1.2 eq of diethyl azodicarboxylate in 30 ml of dry THF was added dropwise over 30 min. The reaction mixture was stirred at room temperature for 20 h and then 5 drops of water was added and stirring was continued for an additional 1 h. The solvent was evaporated and the crude product was triturated for 1 h in a mixture of hexanes/ethyl acetate [70/30]. The solution was filtered through a short silica gel pad and the solvent evaporated. Flash chromatography on silica gel using hexanes/ethyl acetate [98/2] as eluent afforded 2.42 g (75%) of (S) -4'-(1-methylheptyloxy)-4-biphenylyl benzoate (Compound 39, Scheme VIII, $R_2$=(S)—OCH($CH_3$)$C_6H_{13}$) as a white solid (top. 84° C.); $R_f$ [hexanes/ethyl acetate 95/5]: 0.34; $^1$H NMR (300 MHz, CDCl$_3$): δ 0.89(t, 3 H, J=6.8 Hz), 1.14–1.68(m, 9 H), 1.32(d, 3 H, J=6.1 Hz), 1.75(m, 1 H), 4.39(m, 1 H), 6.95(d, 2 H, J=9 Hz), 7.25(d,2 H, J=8.4 Hz), 7.46–7.68(m, 7 H), 8.22(dd, 2 H, J=1.2 Hz J=6.9 Hz); $^{13}$C NMR (300 MHz, CDCl$_3$): δ 14.02, 19.73, 22.55, 25.50, 29.24, 31.75, 36.48, 73.96, 116.10, 121.88, 127.72, 128.58, 129.61, 130.21, 132.64, 133.59, 138.79, 149.87, 157.94, 165.30; IR (CHCl$_3$): 3020, 2930, 2850, 1745, 1600, 1500, 1260, 1240, 1170, 1190, 1070, 1000, 840, 820 cm$^{-1}$; Mass spectrum, m/z(rel.intensity): 402($M^+$ 16), 290(14), 105(100), 77(16), 43(6).

(S)-4'-(1-methylheptyloxy)-4-hydroxybiphenyl

The same procedure as that used for saponification of (S)-4-(1-methylheptyloxy)-3-nitro-phenol was used except the reaction was carried out in a methanol/dichloromethane [4:1] mixture at 60° C. Flash chromatography with hexanes/ethyl acetate [93/7] afforded (S)-4'-(1-methylheptyloxy)-4-hydroxybiphenyl (Compound 40, Scheme VIII, $R_2$=(S)—OCH($CH_3$)$C_6H_{13}$) as a white solid (top 100.5° C.); $R_f$ [hexanes/ethyl acetate 90/10]: 0.2; $^1$H NMR (300 MHz, CDCl$_3$): δ 0.88(t, 3 H, J=6.6 Hz), 1.20–1.64(m, 9 H), 1.33(d, 3 H, J=6.1 Hz), 1.74(m, 1 H), 4.38(m, 1 H), 5.07(s, 1 H), 6.87(d,2 H, J=8.5 Hz), 6.93(d, 2 H, J=8.5 Hz), 7.42(d, 2 H, J=8.5 Hz), 7.44(d, 2 H, J=8.5 Hz); $^{13}$C NMR (300 MHz, CDCl$_3$): δ 14.02, 19.73, 22.54, 25.51, 29.22, 31.74, 36.45, 74.17, 115.59, 116.16, 127.74, 127.94, 133.22, 133 77, 154.55, 157.31; IR (CHCl$_3$): 3560, 3350(broad), 3020, 2920, 2840, 1610, 1500, 1250, 1220, 1175, 825 cm$^{-1}$; Mass spectrum, m/z(rel.intensity): 298 ($M^+$ 11), 186(100), 185(4), 157(4).

Anal. Calcd. for $C_{20}H_{26}O_2$: C 80.50, H 8.78. Found: C 80.41, H 8.77

(S)-4'-(1-methylheptyloxy)-4-hdroxy-3-nitro-biphenyl

To an argon-flushed flask containing 0.127 g (1.5 mmol) of NaNO$_3$, 6.5 mg (0.015 mmol) of La(NO$_3$)$_3$. 6 H$_2$O, 1.2 ml of HCl and 1.5 ml of water was added a solution of 0.447 g (1.5 mmol) of (S)-4'-(1-methylheptyloxy)-4-hydroxybiphenyl in 10 ml of ethyl ether. The reaction mixture was vigorously stirred at room temperature for 2 h and 30 min. Then water was added and the orange organic layer was removed. The aqueous layer was extracted several times with ethyl acetate and the combined organic layers were washed with water until the washes were pH-6, and then with brine. The organic solution was dried and the solvent evaporated. The crude product was purified by flash chromatography using hexanes/ethyl acetate [97/3] as eluent, affording 0.412 g (80%) of (S)-4'-(1-methylheptyloxy)-4-hydroxy-3-nitro-biphenyl (Compound 41, Scheme VIII, $R_2$= (S)—OCH($CH_3$)$C_6H_{13}$) as a yellow solid (mp. 40° C.); $R_f$[hexanes/ethyl acetate [95/5]: 0.5; $^1$H NMR (300 MHz, CDCl$_3$): δ 0.88(t, 3 H, J=6.6 Hz), 1.17–1.69(m, 9 H), 1.32(d, 3 H, J=6.1 Hz), 1.77(m, 1 H), 4.39(m, 1 H), 6.95(d, 2 H, J=8.4 Hz), 7.20(d, 1 H, J=8.7 Hz), 7.47(d, 2 H J=8.4 Hz), 7.78(dd, 1 H J=2.4 Hz, J=8.7 Hz), 8.25(d, 1 H, J=2.4 Hz), 10.55(s, 1 H); $^{13}$C NMR (300 MHz, CDCl$_3$): δ 14.00, 19.65, 22.53, 25.45, 29.21, 31.74, 36.40, 74.03, 116.29, 120.25, 122.03, 127.77, 130.35, 133.68, 133.75, 135.92, 153.86, 158.37; IR (CHCl$_3$): 3240(broad), 3020, 2950, 2850, 1625, 1600, 1510, 1485, 1425, 1325, 1240, 1225, 1175, 825 cm$^{-1}$; Mass spectrum, m/z(rel.intensity): 343($M^+$ 6), 231(100), 230(1), 214(2), 201(5), 185(5), 57(10), 34(15).

Anal. Calcd. for $C_{20}h_{25}NO_4$: C 69.95, H 7.34, N 4.08. Found: C 70.24, H 7.44, N 4.07.

Example 5. Synthesis of (S)-4-(1-methylheptyloxy)-3-nitrobenzoyl chloride (Compound 25, Scheme IV, $R_1$=(S)—OCH($CH_3$)$C_6H_{13}$)

(S)-Methyl-4-(1-methylheptyloxy)-3-nitrobenzoate

Methyl 4-hydroxy-3-nitrobenzoate was coupled with (R)-2-octanol using the same procedure as that given for alkylation of phenol 9, Scheme I, to give (S)-methyl-4-(1-methylheptyloxy)-3-nitrobenzoate (Compound 23, Scheme IV, $R_1$=(S)—OCH($CH_3$)$C_6H_{13}$). The product was purified by flash chromatography with hexanes/ethyl acetate (95/5) as eluent affording a yellow liquid, $R_f$[hexanes/ethyl acetate 95/5]: 0.25; $^1$H-NMR (300 MHz, CDCl$_3$): δ 0.82 (t, 3 H, J=7.1 Hz); 1.14–1.50 (m, 8 H); 1.34(d, 3 H, J=6.1 Hz); 1.60(m, 1 H); 1.75(m, 1 H); 3.87(s, 3 H); 4.57(m, 1 H); 7.06(d, 1 H, J=8.9 Hz); 8.11(dd, 1 H, J=2.2 Hz, J=8.9 Hz); 8.39(d, 1 H, J=2.2 Hz); $^{13}$C-NMR (300 MHz, CDCl$_3$): δ 13.96, 19.31, 22.47, 25.06, 29.02, 31.60, 36.00, 52.35, 76.80, 114.63, 121.80, 127.17, 134.80, 140.27, 154.91, 165.08; Mass spectrum, m/z(rel.intensity): 309 ($M^+$ 1), 197(32), 166(46), 112(48), 71(63), 57(100), 55(46).

Anal. Calcd. for $C_{16}H_{23}NO_5$: C 62.12, H 7.49, N 4.53. Found: C 62.11, H 7.36, N 4.86.

(S)-4-(1-Methyl-heptyloxy)-3-nitro-benzoic acid

The same procedure as that used for saponification of (S)-4-(1-methylheptyloxy)-3-nitro-phenol was used, affording (S)-4-(1-methyl-heptyloxy)-3-nitro-benzoic acid (Compound 24, Scheme IV, $R_1$=(S)—OCH($CH_3$)$C_6H_{13}$) as a white solid after recrystallization from hexanes; $R_f$ [hexanes/ethyl acetate 1:1+a drop of acetic acid]: 0.28; $^1$H NMR (300 MHz, CDCl$_3$): δ 0.83(t, 3 H, J=6.8 Hz), 1.14–1.50(m,8 H), 1.37(d, 3 H, J=6.1 Hz), 1.64(m, 1 H), 1.79(m, 1 H), 4.63(m, 1 H), 7.10(d, 1 H, J=8.9 Hz), 8.20(dd, 1 H, J=2.2 Hz, J=8.9 Hz), 8.48(d, 1 H, J=2.2 Hz); $^{13}$C NMR (300 MHz, CDCl$_3$): δ 13.91, 19.34, 22.47, 25.07, 29.04, 31.62, 36.04, 77.15, 114.81, 120.89, 127.87, 135.35, 140.61, 155.71, 170.20; IR (CHCl$_3$): 3400-2500, 2940, 2850, 1680, 1610, 1530, 1400, 1350, 1280, 1125, 1075, 925 cm$^{-1}$; Mass spectrum, m/z(rel.intensity): 295($M^+$ 17), 184(100), 112(47, 71(53), 57(70), 55(35), 43(80), 41(79).

(S)-4-(1-methylheptyloxy)-3-nitro-benzoyl chloride

Acid 24 (Scheme IV, $R_1$=(S)—OCH($CH_3$)$C_6H_{13}$) was converted to the acid chloride using oxalyl chloride in benzene. After removal of solvent, the crude acid chloride 25 (Scheme IV, $R_f$=(S)—OCH($CH_3$)$C_6H_{13}$) was used directly in the coupling reactions without further purification or characterization.

Example 6. Synthesis of (S)-4'-(1-methylheptyloxy)-3'-nitro-4-biphenylcarboxylic acid chloride (Compound 32, Scheme V, $R_1$=(S)-OCH($CH_3$)$C_6H_{13}$)

Methyl 4'-hydroxy-3'-nitro-4-biphenylcarboxylate

To an argon-flushed flask charged with 0.544 g (6.4 mmol) of NaNO$_3$, 27.7 mg (0.064 mmol) of La(NO$_3$)$_3$.6 H$_2$O, 9 ml of water and 5.1 ml of HCl, was added a solution of 1.46 g (6.4 mmol) of methyl 4'-hydroxy-biphenylcarboxylate (28, Scheme. V, Literature: Otterholm, B., (1987), Ph.D. Thesis, Chalmers Technical University, G öteborg, Sweden) dissolved in 25 ml of THF/ethyl ether (55:45). The reaction mixture was vigorously stirred at 55° C. for 7 h. After cooling, water was added and the organic layer removed. The aqueous layer was extracted several times with ethyl ether and the combined organic layers were washed with water until the washes were pH-6. The organic solution was dried and the solvent evaporated. Flash chromatography on silica gel with hexanes/ethyl acetate [90/10] as eluent afforded 1.5 g (85%) of methyl 4'-hydroxy-3'-nitro-4-biphenylcarboxylate (Compound 29, Scheme V, $R_1$=(S)—OCH(CH$_3$)C$_6$H$_{13}$) as a yellow solid. Recrystallization from cychlohexane gave material with mp. 143° C.; $R_f$ [hexanes/ethyl acetate 90/10]: 0.26; $^1$H NMR (300 MHz, CDCl$_3$): δ 3.92(s, 3 H), 7.24(d, 1 H, J=8.8 Hz), 7.59(d, 2 H, J=8.5 Hz), 7.84(dd, 1 H, J=2.2 Hz, J=8.8 Hz), 8.09(d, 2 H, J=8.5 Hz), 8.20(d, 1 H, J=2.2 Hz), 10.60(s, 1 H); $^{13}$C NMR (300 MHz, CDCl$_3$): δ 52.19, 120.71, 123.77, 126.57, 129.58, 130.40, 132.55, 133.82, 136.18, 142.46, 154.90, 166.66; IR (CHCl$_3$): 3240(broad), 1040, 2950, 1720, 1625, 1600, 1540, 1490, 1425, 1320, 1290, 1210, 1190, 980, 825 cm$^{-1}$; Mass spectrum, m/z(rel.intensity): 273(M$^+$ 85), 242 (100), 196(11), 168(14), 139(41), 59(9).

Anal. Calcd. for C$_{14}$H$_{11}$NO$_5$: C 61.54, H 4.06, N 5.13. Found: C 62.10, H 4.00, N 4.92.

(S)-Methyl 4'-(1-methylheptyloxy)-3'-nitro-4-biphenylcarboxylate

Methyl 4'-hydroxy-3'-nitro-4-biphenylcarboxylate was coupled with (R)-2-octanol using the same procedure as that given for alkylation of phenol 9, Scheme I, to give (S)-methyl 4'-(1-methylheptyloxy)-3'-nitro-4-biphenylcarboxylate (Compound 30, Scheme V, $R_1$=(S)—OCH(CH$_3$)C$_6$H$_{13}$) as a slightly yellow solid after flash chromatography with hexanes/ethyl acetate [93/7]. Recrystallization from hexanes gave material with mp 69° C.; $R_f$ [hexanes/ethyl acetate 90/10]: 0.23; $^1$H-NMR (300 MHz, CDCl$_3$): δ 0.85(t, 3 H, J=6.8 Mz), 1.20–1.52(m, 8 H), 1.36(d, 3 H, J=6.1 Hz), 1.62(m, 1 H), 1.80(m, 1 H), 3.92(s, 3 H), 4.53(m, 1 H), 7.12(d, 1 H, J=8.7 Hz), 7.59(d, 2 H, J=8.4 Hz), 7.72(dd, 1 H, J=2.4 Hz, J=8.7 Hz), 8.02(d, 1 H, J=2.4 Hz), 8.08(d, 2 H, J=8.4 Hz); $^{13}$C NMR (300 Mz, CDCl$_3$):δ 13.99, 19.46, 22.50, 25.19, 29.09, 31.65, 36.13, 52.17, 76.58, 116.07, 124.04, 126.53, 129.31, 130.35, 131.90, 132.06, 141.11, 142.81, 151.49, 166.75; IR (CHCl$_3$): 3020, 2920, 2850, 1725, 1625, 1620, 1540, 1490, 1360, 1280, 1180, 1120, 1020, 820 cm$^{-1}$; Mass spectrum m/z(rel.intensity): 385(M$^+$ 47), 354(27), 273(100), 242(34), 139(17), 71(10) 57(20), 43(45), (41(38).

Anal. Calcd. for C$_{22}$H$_{27}$NO$_5$: C 68.55, H 7.06, N 3.63. Found: C 68.65, H 7.06, N 3.59.

(S)-4'-(1-methyl-heptyloxy)-3'-nitro-4-biphenylcarboxylic acid

The same procedure as that used for saponification of (S)-4-(1-methylheptyloxy)-3-nitro-phenol was used except that the reaction was carried out at 60° C., affording (S)-4'-(1-methyl-heptyloxy)-3'-nitro-4-biphenylcarboxylic acid (Compound 31, Scheme V, $R_1$=(S)—OCH(CH$_3$)C$_6$H$_{13}$) as a yellow solid; $R_f$ [hexanes/ethyl acetate 50%+a drop of acetic acid]: 0.36; $^1$H NMR (300 MHz, CDCl$_3$): δ 0.86(t, 3 H, J=6.7 Hz), 1.20–1.55(m, 8 H), 1.37(d, 3 H, J=6.1 Hz) , 1.65(m, 1 H), 1.80(m, 1 H), 4.55(m, 1 H), 7.14(d, 1 H, J=8.7 Hz), 7.64(d, 2 H, J=8.4 Hz), 7.74(dd, 1 H, J=2.4 Hz, J=8.7 Hz), 8.05(d, 1 H, J=2.4 Hz), 8.17(d, 2 H, J=8.4 Hz); $^{13}$C NMR (300 MHz, CDCl$_3$): δ 13.99, 19.47, 22.51, 25.17, 29.11, 31.64, 36.15, 76.65, 116.13, 124.13, 128.42, 131.04, 132.12, 141.16, 143.78, 151.66, 171.93; Mass spectrum, m/z(rel.intensity): 371(M$^+$ 0.38), 259(100), 139(11), 71(7), 57(16), 55(11), 43(27), 41(23).

(S)-4'-(1-methyl-heptyloxy)-3'-nitro-4-biphenylcarboxylic acid chloride

Acid 31 (Scheme V, $R_1$=(S)—OCH(C$_3$)C$_6$H$_{13}$) was converted to the acid chloride using oxalyl chloride in benzene. After removal of solvent, the crude acid chloride 32 (Scheme V, $R_1$=(S)—OCH(CH$_3$)C$_6$H$_{13}$) was used directly in the coupling reactions without further purification or characterization.

Example 7. Synthesis of (S)-4-(1-methylheptyloxy)-2-nitrobenzoyl chloride (Compound 38, Scheme VI, $R_1$=(S)—OCH(CH$_3$)C$_6$H$_{13}$)

(S)-4-(1-Methylheptyloxy)-2-nitro-toluene

4-Methyl-3-nitrophenol (Compound 33, Scheme VI) was coupled with (R)-2-octanol using the same procedure as that given for alkylation of phenol 9, Scheme I, to give (S)-4-(1-methylheptyloxy)-2-nitro-toluene (Compound 34, Scheme VI, $R_1$=(S)—OCH(CH$_3$)C$_6$H$_{13}$) as a yellow liquid; $R_f$ [Hexanes/ethyl acetate 99/1]: 0.26; $^1$H NMR (300 MHz, CDCl$_3$): δ 0.87(t, 3 H, J=6.6 Hz), 1.16–1.65(m, 12 H), 1.70(m, 1 H), 2.50(s, 3 H), 4.37(m, 1 H), 7.02(dd, 1 H ,J=2.7 Hz, J=8.5 Hz), 7.19(d, 1 H, J=8.5 Hz), 7.47(d, 1 H, J=2.7 Hz); $^{13}$C NMR (300 MHz, CDCl$_3$): δ 13.97, 19.41, 19.63, 22.51, 25.32, 29.14, 31.69, 36.20, 74.72, 111.05, 121.44, 125.12, 133.44, 149.5, 156.77; IR (CHCl$_3$): 3020, 2940, 2850, 1620, 1550, 1525, 1490, 1375, 1300, 1240, 1220, 1110, 1050, 975, 860, 825 cm$^{-1}$; Mass spectrum, m/z (rel.intensity): 265(M$^+$ 11), 153(33), 136(100), 112(21), 71(40), 57(70), 51(11), 43(78), 41(66).

Anal. Calcd. for C$_{15}$H$_{23}$NO$_3$: C 67.90, H 8.74, 5.28. Found:C 67.42, H 8.49, N 5.51.

(S)-α-Bromo-4-(1-methylheptyloxy)-2-nitrotoluene

A suspension of 6.1 g (34.4 mmol) of NBS and 4 g of silica gel in 125 ml of dry dichloromethane was stirred under argon for 30 min. Then a solution of 4.56 g (17.2 mmol) of (S)-4-(1-methylheptyloxy)-2-nitro-toluene in 150 ml of dichloromethane was added via syringe. The reaction mixture was stirred at room temperature for 72 h. The resulting suspension was filtered through a short silica gel pad and the pad was washed several times with dichloromethane. The solvent was evaporated and the crude product extracted with a mixture of hexanes/ethyl acetate [95/5]. The suspension was filtered, the solvent removed and the residue was purified by flash chromatography using hexanes as eluent, affording 4.6 g (78%) of (S)-α-Bromo-4-(1-methylheptyloxy)-2-nitrotoluene (Compound 35, Scheme VI, $R_1$=(S)—OCH(CH$_3$)C$_6$H$_{13}$) as a yellow liquid; $R_f$ [hexanes/ethyl acetate 98/2]: 0.26; $^1$H NMR (300 MHz, CDCl$_3$): δ 0.86(t, 3 H, J=6.7 Hz), 1.18–1.48(m, 8 H), 1.30(d, 3 H, J=6.1 Hz), 1.58(m 1 H), 1.70(m, 1 H), 4.40(m, 1 H), 4.77(s, 2 H), 7.06(dd. 1 H, J=2.7 Hz, J=8.5 Hz), 7.40(d, 1 H, J=8.5 Hz), 7.50(d, 1 H, J=2.7 Hz); $^{13}$C NMR (300 MHz, CDCl$_3$): δ 13.98, 19.36, 22.50, 25.28, 29.10, 29.25, 31.67, 36.12, 75.00, 111.93, 121.08, 124.14, 133.61, 148.69, 158.92; IR (CHCl$_3$): 3020, 2930, 2850, 1625, 1525, 1500, 1350, 1320, 1250, 1100, 975, 850, 825 cm$^{-1}$; Mass spectrum, m/z(rel.intensity): 345(M$^+$+1 1.38), 343(M$^+$−1 1.35), 264(37), 152(100), 112(28), 71(59), 57(93), 55 (38), 43(93), 41(70).

Anal. Calcd. for C$_{15}$H$_{22}$BrNO$_3$: C 52.34, H 6.44, Br 23.21, N 4.07. Found: C 52.38, H 6.33, N 4.37, Br 23.10.

(S)-[4-(1-methylheptyloxy)-2-nitro-phenyl]-methyl nitrate

To a solution of 3.95 g (11.5 mmol) of (S)-α-bromo-4-(1-methyl-heptyloxy)-2-nitro-toluene in 160 ml of dioxane was added a solution of 8.03 g (47.26 mmol) of AgNO$_3$ in 16 ml of water. The reaction mixture was stirred at room temperature for 18 h. The precipitate was filtered and washed with ethyl acetate. The filtrate was treated with 150 ml of water and the organic layer separated. The aqueous layer was extracted with ethyl acetate and the combined organic layers evaporated. The resulting crude product was purified by flash chromatography with hexanes/ethyl acetate [100/0.2] and used in the next step without further purification (2.14 g of a yellow liquid, 57% yield); $^1$H NMR (300 MHz, CDCl$_3$): δ 0.86(t, 3 H, J=6.8 Hz), 1.18–1.50(m, 8 H), 1.31(d, 3 H, J=6.1 Hz), 1.60(m, 1 H), 1.72(m, 1 H), 4.42(m, 1 H), 5.76(s, 2 H), 7.13(dd, 1 H, J=2.5 Hz J=8.6 Hz), 7.43(d, 1 H, J=8.6 Hz), 7.61(d, 1 H, J=2.5 Hz); IR (CHCl$_3$): 3020, 2940, 2840, 1640, 1530, 1500, 1460, 1115, 975, 900, 850, 825 cm$^{-1}$; Mass spectrum, m/z(rel.intensity): 326(M$^+$ 2), 264(2), 151(13), 112(34), 71(70), 57(100), 55(28), 43(79), 41(47). (S)-4-(1-methyl-heptyloxy)-2-nitro-benzaldehyde To a solution of 1.96 g (6 mmol) of the methyl-nitrate prepared above in 96 ml of dioxane was added a solution of KOH (5.52 g) in 20 ml of water. The reaction mixture was stirred at room temperature under argon for 20 h. Then the mixture was poured into 120 ml of water and the resulting solution was treated with brine ( 48 ml). This mixture was then extracted with dichloromethane, the extract dried with MgSO$_4$, and solvent evaporated. Flash chromatography of the resulting crude product using hexanes/ethyl acetate [100/0.4] furnished (S)-4-(1-methylheptyloxy)-2-nitrobenzaldehyde (95%) (Compound 36, Scheme VI, R$_1$= (S)—OCH(CH$_3$)C$_6$H$_{13}$) as a yellow liquid; R$_f$ [hexanes/ethyl acetate 98/2]: 0.2; $^1$H NMR (300 MHz, CDCl$_3$): δ 0.85(t, 3 H, J=6.6 Hz), 1.16–1.51(m, 8 H), 1.34(d, 3 H, J=6.1 Hz), 1.60(m, 1 H), 1.76(m, 1 H), 4.50(m, 1 H), 7.15(dd, 1 H, J=2.4 Hz, J=8.8 Hz), 7.43(d, 1 H, J=2.4 Hz), 7.93(d, 1 H, J=8.8 Hz), 10.24(s, 1 H); $^{13}$C NMR (300 MHz, CDCl$_3$): δ 13.95, 19.29, 22.47, 25.21, 29.05, 31.63, 36.05, 75.63, 110.81, 120.02, 122.86, 131.50, 151.84, 162.71, 186.98; Mass spectrum, m/z(rel.intensity): 279(M$^+$ 1), 167(31), 120 (11), 112(14), 92(9), 71(70), 57(100), 43(85), 41(57).

Anal. Calcd. for C$_{15}$H$_{21}$NO$_4$: C 64.50, H 7.58, N 5.01. Found: C 64.11, H 7.46, N 5.25.

(S)-4-(1-Methylheptyloxy)-2-nitrobenzoic acid

To a solution of 1.086 g (3.89 mmol) of (S)-4-(1-methylheptyloxy)-2-nitrobenzaldehyde in 40 ml of acetone was added a solution of KMnO$_4$ (0.984 g, 6.23 mmol) in 47 ml of water dropwise. The reaction mixture was stirred at room temperature for 6 h and then treated with 5% Na$_2$SO$_3$ (100 ml), acidified with conc. HCl (pH: 4–5), and the resulting solution was extracted with ethyl ether several times. The organic extract was concentrated and extracted with 10% NaOH solution. The alkaline extract was washed with ether, acidified with conc. HCl/ice, and the resulting solution extracted with ethyl ether. The organic layer was washed with water, dried, and the solvent evaporated. (S)-4-(1-Methylheptyloxy)-2-nitrobenzoic acid (Compound 37, Scheme VI, R$_1$=(S)—OCH(CH$_3$)C$_6$H$_{13}$) was obtained as a dark orange liquid (0.8 g, 70% ) which was used in the next step without further purification; R$_f$ [hexanes/ethyl acetate 70/30+1 drop of acetic acid]: 0.16; $^1$H NMR (300 MHz, CDCl$_3$): δ 0.86(t, 3 H, J=6.8 Hz), 1.16–1.48(m, 8 H), 1.32(d, 3 H, J=5.(Hz), 1.60(m, 1 H), 1.72(m, 1 H), 4.45(m, 1 H), 7.02(dd, 1 H, J=2.4 Hz J=8.8 Hz), 7.09(d, 1 H, J=2.4 Hz) , 7.90(d, 1 H, J=8.8 Hz); $^{13}$C NMR (300 MHz, CDC$_3$): δ 13.98, 19.22, 22.51, 25.24, 29.14, 31.68, 36.14, 79.94, 110.26, 117.84, 118.98, 132.97, 150.69, 160.61, 170.81; Mass spectrum, m/z(rel.intensity): 295(M$^+$ 1), 265(9), 166 (8), 135(36), 112(14), 71(66), 57(100), 55(27), 43(94), 41(69).

(S)-4-(1-Methylheptyloxy)-2-nitrobenzoyl chloride

Acid 36 (Scheme VI, R$_1$=(S)—OCH(CH$_3$)C$_6$H$_{13}$) was converted to the acid chloride using oxalyl chloride in benzene. After removal of solvent, the crude acid chloride 37 (Scheme VI, R$_1$=(S)—OCH(CH$_3$)C$_6$H$_{13}$) was used directly in the coupling reactions without further purification or characterization.

Example 8. General procedure for coupling phenols with acid chlorides, and synthesis of exemplary compounds of formula I Procedure for coouling phenols with acid chlorides To a flame dried and argon-flushed flask containing a suspension of 2.1 mmol of NaH in 30 ml of dry THF was added a solution of 2.1 mmol of phenol in 17 ml of dry THF via syringe. After stirring for 20–45 min, a solution of 2.1 mmol of acid chloride in 12 ml of dry THF was added. The reaction mixture was then allowed to stir at room temperature. When the reaction was judged complete by TLC (19–22 h), the reaction was quenched by addition of water, and the resulting aqueous phase was extracted with ethyl ether. The combined organic extracts were washed with 10% aqueous HCl, 5% aqueous NaOH and brine, then dried and filtered. Once the filtrate was evaporated to dryness, the crude product was purified by flash chromatography to give the product ester in 70–92% yield. In order to obtain material suitable for liquid crystals studies, several flash chromatographic purifications and often recrystallizations from hexanes were required to obtain material of sufficient purity as judged by TLC and the sharpness of the LC phase transitions or melting points.

Analytical data for compounds of formula I (S)-4"-(1-Methylheptoloxy)-3"-nitrophenyl-4'-n-decloxy-4-biphenylcarboxylate The compound of formula I where R$_1$=n-C$_{10}$H$_{21}$O, R$_2$=(S)—OCH(CH$_3$)C$_6$H$_{13}$, m=0, n=1, k=1, X$_1$=NO$_2$, and X$_2$–X$_4$=H (Scheme I) was purified by flash chromatography with toluene/hexanes [80/20]; R$_f$ [hexanes/ethyl acetate 95/5]: 0.22; [α]$_D^{25}$+12.3° (2.74, CHCl$_3$); $^1$H NMR (300 MHz, CDCl$_3$): δ 0.87 (m, H), 1.18–1.54(m, 22 H), 1.35(d, 3 H, J=6.1 Hz), 1.62(m, 1 H), 1.80(m, 3 H), 4.00(t, 2 H, J=6.6 Hz), 4.48(m,.1 H), 6.99(d, 2 H, J=8.7 Hz), 7.09(d, 1 H, J=9.3 Hz), 7.38(dd, 1 H, J=2.8 Hz, J=9.3 Hz), 7.56(d, 2 H, J=8.3 Hz), 7.68(d, 2 H, J=8.3 Hz), 7.71(d, 1 H, J=2.8 Hz), 8.19(d, 2 H, J=8.7 Hz); $^{13}$C NMR (300 MHz, CDCl$_3$): δ 13.99, 14.04, 19.47, 22.51, 22.62, 25.18, 25.99, 29.11, 29.19, 29.26, 29.34, 29.50, 29.52, 31.67, 31.84, 36.19, 68.15, 77.00, 115.04, 116.51, 119.14, 126.68, 127.26, 128.40, 130.79, 131.78, 140.55, 142.95, 146.43, 149.53, 159.75, 164.92; IR (CHCl$_3$): 3020, 2940, 2860, 1740, 1610, 1540, 1490, 1300, 1260, 1170, 1015, 825 cm$^{-1}$; Mass spectrum, m/z(rel.intensity): 603(M$^+$ 0.03), 337(100), 197 (13), 57(5), 55(3), 43(12).

Anal. Calcd. for C$_{37}$H$_{49}$NO$_6$C 73.60, H 8.18, N 2.32. Found: C 73.98, H 8.23, N 2.29.

(S)-4"-1-Methylheptyloxy)-3"-nitro-4'-biphenylyl-4-4-n-decyloxy-benzoate

The compound of formula I where R$_1$=n-C$_{10}$H$_{21}$O, R$_2$=(S)-OCH(CH$_3$)C$_6$H$_{13}$, m=1, n=0, k=1, X$_1$=NO$_2$, and X$_2$–X$_4$=H (Scheme II) was purified by flash chromatography with hexanes/ethyl acetate [99/1]; R$_f$ [hexanes/ethyl acetate 95/5]: 0.16. [α]$_D^{25}$: +7.2° (c 2.57, CHCl$_3$); $^1$H NMR (300 MHz, CDCl$_3$): δ 0.88(t, 6 H, J=6.6 Hz), 1.15–1.50(m, 22 H), 1.36(d, 3 H, J=6.1 Hz), 1.62(m, 1 H), 1.80(m, 3 H), 4.03(t, 2 H, J=6.4 Hz), 4.52(m, 1 H), 6.96(d, 2 H, J=8.7 Hz), 7.11(d, 1 H, J=8.7 Hz), 7.26(d, 2 H, J=8.7 Hz), 7.56(d, 2 H, J=8.4 Hz), 7.67(dd, 1 H, J=2.1 Hz, J=8.7 Hz), 7.98(d, 1 H, J=2.1 Hz), 8.13(d, 2 H, J=8.4 Hz); $^{13}$C NMR (300 MHz, CDCl$_3$): δ 14.00, 14.07, 19.51, 22.52, 22.63, 25.20, 25.92, 29.04, 29.13, 29.26, 29.31, 29.50, 31.68, 31.85, 36.20, 68.33, 76.58, 114.35, 116.14, 121.34, 122.47, 123.78, 127.78, 131.94, 132.35, 132.63, 136.16, 141.15, 150.89, 163.70, 164.95; IR (CHCl$_3$): 3020, 2940, 2850, 1740, 1600, 1540, 1490, 1350, 1270, 1210, 1175, 1075, 1025, 975, 840 cm$^{-1}$; Mass spectrum, m/z(rel.intensity): 603(M$^+$ 0.03), 261(100), 121(66), 57(10), 55(6), 43(17).

Anal. Calcd. for C$_{37}$H$_{49}$NO$_6$: C 73.60, H 8.18, N 2.32. Found: C 73.68, H 8.32, N 2.33.

(S)-4"-(1-Methylheptyloxy)-2"-nitrophenyl-4'-n-decyloxy-4-biphenylcarboxylate

The compound of formula I where R$_1$=n-C$_{10}$H$_{21}$O, R$_2$= (S)—OCH(CH$_3$)C$_6$H$_{13}$, m=0, n=1, k=1, X$_2$=NO$_2$, and X$_1$, X$_3$ and X$_4$=H (Scheme III) was purified by flash chromatography with hexanes/dichloromethane [77/23]; R$_f$ [hexanes/ethyl acetate 90/10]: 0.57. [α]$_D^{25}$+3.8° (c 3.16, CHCl$_3$); $^1$H NMR (300 MHz, CDCl$_3$): δ 0.88(m, 6 H), 1.18–1.54(m, 22 H), 1.34(d, 3 H, J=6.1 Hz), 1.62(m, 1 H), 1.80(m, 3 H), 4.03(t, 2 H, J=6.6 Hz), 4.40(m, 1 H), 7.00(d, 2 H, J=8.7 Hz), 7.18(dd, 1 H, J=2.7 Hz J=9 Hz), 7.26(d, 1 H, J=9 Hz), 7.61(d, 1 H, J=2.7 Hz), 7.70(d, 2 H, J=8.7 Hz), 8.22(d, 2 H, J=8.7 Hz); $^{13}$C NMR (300 MHz, CDCl$_3$): δ 14.00, 14.05, 19.39, 22.52, 22.63, 25.34, 25.99, 29.15, 29.20, 29.28, 29.35, 29.52, 29.53, 31.71, 31.85, 36.19, 68.13, 75.28, 11.67, 115.00, 122.38, 126.06, 126.58, 126.68, 128.44, 131.04, 131.93, 137.39, 142.10, 146.45, 156.10, 159.69, 164.82; IR (CHCl$_3$): 3020, 2930, 2850, 1740, 1620, 1540, 1510, 1340, 1270, 1250, 1170, 1140, 1075, 975, 825 cm$^{-1}$; Mass spectrum, m/z(rel.intensity): 603(M$^+$ 0.5), 337 (100), 214(27), 197(18), 169(71), 155(22), 150(28), 119 (11), 71(13), 69(41), 57(31), 55(18), 43(42).

(S)-4"-n-Decyloxy-4'-biphenylyl]-4-(1-methylheptyloxy)-3-nitrobenzoate

The compound of formula I where R$_2$=n-C$_{10}$H$_{21}$O, R$_1$= (S)—OCH(CH$_3$)C$_6$H$_{13}$, m=1, n=0, k=1, X$_2$=NO$_2$, X$_1$, X$_3$ and X$_4$=H (Scheme IV) was purified by flash chromatography with toluene/hexanes [88/12]; R$_f$ [toluene/hexanes 90/10]: 0.45. [α]$_D^{25}$: +5.8° (c 2.26, CHCl$_3$); $^1$H NMR (300 MHz, CDCl$_3$): δ 0.88(t, 6 H, J=6.8 Hz), 1.15–1.55(m, 22 H), 1.33(d, 3 H, J=6.1 Hz), 1.67(m, 1 H), 1.82(m, 1 H), 3.99(t, 2 H, J=6.4 Hz), 4.65(m, 1 H), 6.97(d, 2 H, J=8.8 Hz), 7.16(d, 1 H, J=9 Hz), 7.24(d, 2 H, J=8.8 Hz), 7.51(d, 2 H J=8.5 Hz), 7.59(d, 2 H, J=8.5 Hz), 8.32(dd, 1 H, J=2.2 Hz J=9 Hz), 8.63(d, 1 H, J=2.2 Hz); $^{13}$C NMR (300 MHz, CDCl$_3$): δ 14.00, 14.07, 19.34, 22.05, 22.09, 25.09, 26.01, 29.05, 29.24, 29.28, 29.36, 29.51, 29.56, 31.64, 31.85, 36.00, 68.09, 77.00, 114.83, 121.13, 121.74, 127.76, 127.80, 128.12, 132.57, 135.42, 139.03, 140.44, 149.52, 155.43, 158.89, 163.34; IR (CHCl$_3$): 3010, 2940, 2840, 1740, 1610, 1525, 1490, 1310, 1280, 1240, 1200, 1170, 1090, 1000, 840, 825 cm$^{-1}$; Mass spectrum, m/z(rel.intensity): 603(M$^+$ 21), 326(28), 248(37), 246(30), 186(87), 166(100), 136(70), 71(11), 57(26), 55(22), 43(43).

Anal. Calcd. for C$_{37}$H$_{49}$NO$_6$: C 73.60, H 8.18, N 2.32. Found: C 73.97, H 8.12, N 2.34.

(S)-4"-n-Decyloxyphenyl-4'-(1-methylheptyloxy)-3'-nitro-4-biphenylcarboxylate.

The compound of formula I where R$_2$=n-C$_{10}$H$_{21}$O, R$_1$= (S)—OCH(CH$_3$)C$_6$H$_{13}$, m=0, n=1, k=1, X$_2$=NO$_2$, and X$_1$, X$_3$ and X$_4$=H (Scheme V) was purified by flash chromatography with toluene/hexanes [75/25]; R$_f$ [hexanes/ethyl acetate 90/10]: 0.41. [α]$_D^{25}$:+5.0° (c 2.46, CHCl$_3$); $^1$H NMR (300 MHz, CDCl$_3$): δ 0.88(m, 6 H) , 1.16–1.54(m, 22 H), 1.37(d, 3 H, J=5.9 Hz) , 1.64(m, 1 H), 1.80(m, 3 H), 3.94(t, 2 H, J=6.6 Hz), 4.55(m , 1 H), 6.92(d, 2 H, J=9 Hz), 7.17(d, 2 H, J=9 Hz), 7.14(d, 1 H, J=8.8 Hz), 7.66(d, 2 H, J=8.4 Hz), 7.76(dd, 1 H, J=2.4 Hz J=8.8 Hz), 8.06(d, 1 H, J=2.4 Hz), 8.24(d, 2 H J=8.4 Hz); $^{13}$C NMR (300 MHz, CDCl$_3$): δ 13.98, 14.04, 19.47, 22.50, 22.62, 25.17, 25.99, 29.11, 29.22, 29.26, 29.51, 29.52, 31.66, 31.84, 36.16, 68.43, 76.66, 115.14, 116.16, 122.35, 124.09, 126.68, 128.87, 130.92, 131.82, 132.09, 141.23, 143.40, 144.23, 151.61, 157.02, 165.21; IR (CHCl$_3$): 3040, 2940, 2860, 1735, 1610, 1510, 1530, 1360, 1275, 1190, 1180, 1070, 1020, 825 cm$^{-1}$; Mass spectrum, m/z(rel.intensity): 603(M$^+$ 0.6), 573(2), 354(44), 324(30), 242(100), 212(46), 110(33), 57(19), 55(14), 43(34).

Anal. Calcd. for C$_{37}$H$_{49}$NO$_6$: C 73.60, H 8.18, N 2.32. Found: C 73.60, H 8.34, N 2.35.

(S)-[4"-n-Decyloxy-4'-biphenylyl]-4-(1-methylheptyloxy)-2-nitrobenzoate

The compound of formula I where R$_2$=n-C$_{10}$H$_{21}$O,, R$_1$= (S)—OCH(CH$_3$)C$_6$H$_{13}$, m=1, n=0, k=1, X$_4$=NO$_2$, and X$_1$, X$_2$ and X$_3$=H (Scheme VI) was purified by flash chromatography with hexanes/dichloromethane [75/25]; R$_f$ [hexanes/ethyl acetate 95/5]: 0.19. [α]$_D^{25}$:+2.1° (c 2.72, CHCl$_3$); $^1$H NMR (300 MHz, CDCl$_3$): δ 0.87(m, 6 H), 1.16–1.54(m, 22), 1.34(d, 3 H, J=6.1 Hz), 1.62(m, 1 H), 1.72(m, 3 H), 3.97(t, 2 H, J=6.6 Hz), 4.48(m, 1 H), 6.94(d, 2 H, J=8.5 Hz), 7.12(dd, 1 H, J=2.4 Hz J=8.8 Hz), 7.23(d, 2 H, J=8.5 Hz), 7.29(d, 1 H, J=2.4 Hz), 7.47(d, 2 H, J=8.5 Hz), 7.55(d, 2 H, J=8.5 Hz), 7.90(d, 1 H, J=8.8 Hz); $^{13}$C NMR (300 MHz, CDCl$_3$): δ 14.00, 14.06, 19.32, 22.52, 22.63, 25.26, 26.01, 29.09, 29.24, 29.28, 29.36, 29.52, 29.54, 31.67, 31.85, 36.05, 68.10, 75.48, 110.85, 114.84, 117.08, 118.74, 121.52, 127.80, 128.16, 132.51, 132.67, 139.18, 149.47, 151.05, 158.89, 161.63, 163.46; Mass spectrum, m/z(rel.intensity): 603(M$^+$ 0.3), 325(20), 201(64), 185(19), 166(8), 91(100), 71(17), 57(37), 43(51), 41(54).

(S,S)-4,4'-Di-(1-methylheptyloxy)-3,3'-dinitrophenylbenzoate

The compound of formula I where R$_2$=(S)—OCH(CH$_3$)C$_6$H$_{13}$, R$_1$=(S)—OCH(CH$_3$)C$_6$H$_{13}$, m=0, n=1, k=1, X$_1$ and X$_2$=NO$_2$, X$_3$ and X$_4$=H (Scheme VII) was purified by flash chromatography with hexanes/ethyl acetate [88/12]; R$_f$ [Hexanes/ethyl acetate 90/10]: 0.24. [α]$_D^{25}$:+18.9° (c 2.75, CHCl$_3$); $^1$H NMR (300 Fritz, CDCl$_3$): δ 0.88(t, 6 H, J=6.8 Hz), 1.20–1.55(m, 16 H), 1.37(d, 3 H, J=6.1 Hz), 1.41(d, 3 H, J=6.1 Hz), 1.68(m, 2 H), 1.82(m, 2 H), 4.50(m, 1 H), 4.62(m, 1 H), 7.11(d, 1 H, J=9 Hz), 7.17(d, 1 H, J=9 Hz), 7.37(dd, 1 H, J=2.7 Hz, J=9 Hz), 7.71(d, 1 H, J=2.7 Hz), 8.28(dd, 1 H, J=2.1 Hz J=9 Hz), 8.58(d, 1 H, J=2.1 Hz); $^{13}$C NMR (300 MHz, CDCl$_3$): δ 13.96, 19.28, 19.41, 22.45, 22.47, 25.03, 25.14, 29.00, 29.07, 31.57, 31.69, 35.95, 36.13, 77.00, 77.10, 114.92, 116.47, 119.00, 120.22, 127.05, 127.78, 135.44, 140.38, 142.38, 149.72, 155.72, 162.97; IR (CHCl$_3$): 3010, 2930, 2850, 1740, 1610, 1540, 1360, 1290, 1200, 1110, 1075, 880, 825 cm$^{-1}$; Mass. spectrum, m/z (rel.intensity): 544(M$^+$ 0.7), 278(100), 166(100), 120(63), 112(18), 71(79), 57(100), 55(54), 43(100), 41(81).

Anal. Calcd. for C$_{29}$H$_{40}$N$_2$O$_8$: C 63.95, H 7.40, N 5.14. Found: C 63.53, H 7.52,, N 5.12.

(S,S)-4,4"-Di-(1-methylheptyloxy)-3,3"-dinitro-4'-biphenylylbenzoate

The compound of formula I where R$_2$=(S)—OCH(CH$_3$)C$_6$H$_{13}$), R$_1$=(S)—OCH(CH$_3$)C$_6$H$_{13}$, m=1, n=0, k=1, X$_1$ and X$_2$=NO$_2$, X$_3$ and X$_4$=H (Scheme VII) was purified by flash chromatography with hexanes/ethyl acetate [95/5]; R$_f$ [hexanes/ethyl acetate 85/15]: 0.20. [α]$_D^{25}$:+12.0° (c 2.53, CHCl$_3$); $^1$H NMR (300 MHz, CDCl$_3$): δ 0.86(t, 6 H, J=6.4 Hz), 1.16–1.54(m, 16 H), 1.36(d, 3 H, J=6.1 Hz), 1.40(d, 3 H, J=6.1 Hz), 1.66(m, 2 H) , 1.80(m, 2 H) , 4.53(m, 1 H), 4.64(m, 1 H), Distorted AA'BB' System [7.14 (4 H)], 7.26(d, 1 H, J=8.7 Hz), 7.58(d, 1 H, J=8.7 Hz), 7.68(dd, 1 H, J=2.4 Hz J=8.7 Hz), 7.92(d, 1 H, J=2.4 Hz), 8.30(dd, 1 H, J=2.1 Hz J=8.7 Hz), 8.61(d, 1 H, J=2.1 Hz); $^{13}$C NMR (300 MHz, CDCl$_3$): δ 13.97, 19.32, 19.42, 22.47, 22.49, 25.06, 25.17, 29.02, 29.10, 31.61, 31.65, 35.98, 36.17, 76.57, 114.87, 116.14, 120.91, 122.19, 123.79, 127.76, 127.88, 131.93, 132.35, 135.43, 136.62, 140.45, 141.12, 150.36, 150.99, 155.54, 163.18; IR (CHCl$_3$): 3020, 2940, 2850, 1740, 1610, 1525, 1510, 1490, 1350, 1275, 1240, 1175, 1090, 925, 875, 820 cm$^{-1}$; Mass. spectrum, m/z(rel.intensity); 620(M$^+$ 1), 508(7), 397(8), 278(19), 231(22), 230(10), 166(100), 120 (12), 71(14), 69(6), 57(24), 55(10), 43(27).

Anal. Calcd. for C$_{35}$H$_{44}$N$_2$O$_8$: C 67.72, H 7.15, N 4.51. Found: C 67.65, H 7.26, N 4.48.

(S)-4"-(1-Methylheptyloxy)-3'-nitro-4'-biphenylyl-4-n-decyloxybenzoate

The compound of formula III where R$_2$=(S)—OCH(CH$_3$) C$_6$H$_{13}$) and R$_1$=C$_{10}$H$_{21}$O (Scheme VIII) was purified by flash chromatography with hexanes/ethyl acetate [99/1]; R$_f$ [hexanes/ethyl acetate 95/5]: 0.28. [α]$_D^{25}$:-0.88° (c 2.55, CHCl$_3$); $^1$H NMR (300 MHz, CDCl$_3$): δ 0.87(t, 6 H. J=6.8 Hz), 1.13-1.64(m, 23 H), 1.32(d, 3 H, J=6.1 Hz), 1.80(m, 3 H), 4.03(t, 2 H, J=6.5 Hz), 4.40(m, 1 H), 6.96(d, 4 H, J=8.7 Hz), 7.37(d, 1 H, J=8.7 Hz), 7.51(d, 2 H, J=8.7 Hz), 7.81(dd, 1 H, J=2.4 Hz, J=8.7 Hz), 8.13(d, 2 H, J=8.7 Hz), 8.24 (d, 1 H, J=2.4 Hz); $^{13}$C NMR (300 MHz, CDCl$_3$): δ 14.03, 14.06, 19.67, 22.55, 22.63, 25.47, 25.93, 29.03, 29.22, 29.27, 29.31, 29.51, 31.76, 31.85, 36.41, 68.36, 74.06, 114.48, 116.35, 120.46, 122.44, 125.69, 128.57, 130.12, 132.28, 132.76, 139.81, 142.22, 142.93, 158.84, 164/05, 164.25; IR (CHCl$_3$): 3020, 2920, 2850, 1740, 1610, 1550, 1520, 1480, 1360, 1250, 1170, 1090, 1050, 1010, 825 cm$^{-1}$; Mass spectrum, m/z(rel.intensity): 603 (M$^+$ 0.23), 261(100), 121(70), 71(5), 69(5), 57(15), 55(10), 43(27).

Anal. Calcd. for C$_{37}$H$_{49}$NO$_6$: C 73.60, H 8.18, N 2.32. Found: 73.48, H 8.31, N 2.32.

We claim:

1. A chiral nonracemic compound of formula:

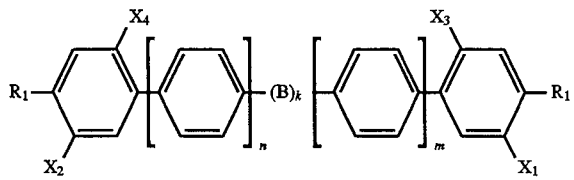

wherein k=0 or 1 and when k=1, B=COO or OOC; X$_1$, X$_2$, X$_3$ and X$_4$ are either H, an electron donor or an electron acceptor such that at least one of X$_1$, X$_2$, X$_3$ or X$_4$ is an electron acceptor and at least one of X$_1$, X$_2$, X$_3$ or X$_4$ is an electron donor and wherein when one of X$_1$ or X$_3$ is an electron donor, the other of X$_1$ or X$_3$ is then an electron acceptor and when one of X$_2$ or X$_4$ is an electron donor, the other of X$_2$ or X$_4$ is then an electron acceptor; n and m are either 0 or 1 with the proviso that one of n or m is 1; R$_1$ and R$_2$, independently of one another, are selected from the group OR$_a$, —COO—R$_b$, R' or R* wherein:

R$_a$ is a straight-chain or branched alkyl or monoalkene group having from 2 to 16 carbon atoms;

R$_b$ is a straight-chain or branched alkyl or monoalkene group having from 2 to 15 carbon atoms;

R' is a straight-chain or branched alkyl or monoalkene group having from 1 to 20 carbon atoms where one or more of the non-neighboring —CH$_2$ groups in R' may be replaced with an O or S atom or a Si(CH$_3$)$_2$ group; and R* is a chiral non-racemic tail group selected from the group consisting of —O—C*H(CH$_3$)R$_c$, —O—C*H (CH$_3$)COOR$_d$, and —O—CH$_2$C*HF—C*HF—R$_e$ in which the * indicates an asymmetric carbon enriched in one stereoconfiguration, which for —O—CH$_2$C*HF—C*HF—R$_e$ is either the (S,S,) or the (R,R) stereoconfiguration where:

R$_c$ is a straight-chain or branched alkyl or monoalkene group having from 2 to 15 carbon atoms; R$_d$ is a straight-chain or branched alkyl or monoalkene group having from 2 to 13 carbon atoms; and R$_e$ is a straight-chain or branched alkyl or monoalkene group having from 2 to 11 carbon atoms wherein in R$_c$, R$_d$ or R$_e$ one or more non-neighboring —CH$_2$ groups may be replaced with an O or S atom or a Si(CH$_3$)$_2$ group; and with the proviso that when X$_2$ and X$_4$ are H, X$_1$ is NO$_2$ and R$_2$ is R* then X$_3$ must be H.

2. The compound of claim 1 wherein said electron acceptor is selected from the group consisting of a halogen, CN, COH, COR, CO$_2$H, CO$_2$R, CONH$_2$, CONHR, CON(R)$_2$, SO$_2$R, SO$_2$CF$_2$R, SO$_2$CF$_3$, C(CN)=C(CN)$_2$, NHCOCH$_3$ or NO$_2$ group where R is a small alkyl group having one to three carbon atoms.

3. The compound of claim 1 wherein said electron donor is selected from the group consisting of OR, NH$_2$, NHR, N(R)$_2$, NHCOH, NRCOH, NHCOR, N(R) COR" and OCOR, where R and R" are small alkyl groups having from one to three carbon atoms.

4. The compound of claim 1 wherein said electron acceptor is selected from the group consisting of a halogen, CN, or NO$_2$ group.

5. The compound of claim 1 wherein said electron donor is selected from the group consisting of NH$_2$, NHR or N(R)$_2$ where R is a small alkyl group having from one to three carbon atoms.

6. The compound of claim 4 wherein said electron donor is selected from the group consisting of NH$_2$, NHR or N(R)$_2$ where R is a small alkyl group having from one to three carbon atoms.

7. The compound of claim 5 wherein said electron acceptor is NO$_2$.

8. The compound of claim 1 where both n and m are 1.

9. The compound of claim 1 wherein one of n or m is 1 and the other of n or m is 0.

10. The compound of claim 5 wherein both n and m are 1.

11. The compound of claim 5 wherein one of n or m is 1 and the other of n or m is 0.

12. The compound of claim 1 wherein R$_1$ or R$_2$ is an —OR$_a$, R' or an R* group.

13. The compound of claim 12 wherein R* is an —O—C*H(CH$_3$)COOR$_d$ group.

14. The compound of claim 12 wherein R* is an —O—CH$_2$C*HF—C*HF-R$_e$ group.

15. The compound of claim 12 wherein R* is an —O—C*H(CH$_3$)R$_c$ group.

16. The compound of claim 15 wherein X$_1$, X$_2$, X$_3$ and X$_4$ are selected from the group consisting of NO$_2$, NH$_2$, NRH, or N(R)$_2$.

17. The compound of claim 16 wherein both n and m are 1.

18. The compound of claim 16 wherein one or n or m is 0 and the other of n or m is 1.

19. The compound of claim 12 wherein X$_1$ and X$_3$ are selected from the group consisting of NO$_2$, NH$_2$, NRH, or N(R)$_2$ and X$_2$ and X$_4$ are both hydrogens.

20. The compound of claim 19 wherein both n and m are 1.

21. The compound of claim 19 wherein one or n or m is 0 and the other of n or m is 1.

22. The compound of claim 1 wherein X$_1$, X$_2$, X$_3$ and X$_4$ are either NO$_2$, NH$_2$, NRH, or N(R)$_2$.

23. The compound of claim 22 wherein both n and m are 1.

24. The compound of claim 22 wherein one of n or m is 0 and the other of n or m is 1.

25. The compound of claim 1 wherein both n and m are 1, $X_1$, $X_2$, $X_3$ and $X_4$ are either $NO_2$, $NH_2$, NRH, or $N(R)_2$, and one of $R_1$ or $R_2$ is —O—$C^*H(CH_3)$ $R_c$.

26. The compound of claim 25 wherein one of $R_1$ or $R_2$ is —O—$C^*H(CH_3)R_c$ and the other of R.

27. The compound of claim 1 wherein both n and m are 1, one of $X_1$ or $X_3$ is $NO_2$ and the other of $X_1$ or $X_3$ is $NH_2$, $R_2$ is —O—$C^*H(CH_3)R_c$ and $R_1$ is —$OR_a$.

28. The compound of claim 1 wherein one of n or m is 1 and the other of n or m is 0, $X_1$, $X_2$, $X_3$ and $X_4$ are either $NO_2$, $NH_2$, NRH, or $N(R)_2$, and one of $R_1$ and $R_2$ is —O—$C^*H(CH_3)R_c$.

29. The compound of claim 28 wherein one of $R_1$ and $R_2$ is —$OR_a$ and the other of $R_1$ of $R_2$ is —O—$C^*H(CH_3)R_c$.

30. The compound of claim 1 wherein one of n or m is 1 and the other of n or m is 0, one of $X_1$ or $X_3$ is $NO_2$ and the other of $X_1$ or $X_3$ is $NH_2$, $R_2$ is —O—$C^*H(CH_3)R_c$ and $R_1$ is —$OR_a$.

31. The compound of claim 1 wherein both n and m are 1, one of $X_1$ or $X_3$ is $NO_2$ and the other of $X_1$ or $X_3$ is $N(CH_3)_2$, $R_2$ is —O—$C^*H(CH_3)R_c$ and $R_1$ is —$OR_a$.

32. The compound of claim 1 wherein both n and m are 1, $X_1$ is $NO_2$, $X_3$ is $NH_2$, $R_2$ is —O—$C^*H(CH_3)R_c$ and $R_1$ is —$OR_a$.

33. The compound of claim 1 wherein both n and m are 1, $X_1$ is $NH_2$, $X_3$ is $NO_2$, $R_2$ is —O—$C^*H(CH_3)$ $R_c$ and $R_1$ is —$OR_a$.

34. The compound of claim 1 wherein both n and m are 1, $X_1$ is $NO_2$, $X_3$ is $N(R)_2$, $R_2$ is —O—$C^*H(CH_3)R_c$ and $R_1$ is —$OR_a$.

35. The compound of claim 1 wherein both n and m are 1 $X_1$ is $N(R)_2$, $X_3$ is $NO_2$, $R_2$ is —O—$C^*H(CH_3)R_c$ and $R_1$ is —$OR_a$.

36. The compound of claim 1 wherein one of n or m is 1 and the other of n or m is 0, one of $X_1$ or $X_3$ is $NO_2$ and the other of $X_1$ or $X_3$ is $N(CH_3)_2$, $R_2$ is —O—$C^*H(CH_3)R_c$ and $R_1$ is —$OR_a$.

37. The compound of claim 1 wherein one of n or m is 1 and the other of n or m is 0, $X_1$ is $NO_2$, $X_3$ is $NH_2$, $R_2$ is —O—$C^*H(CH_3)R_c$ and $R_1$ is —$OR_a$.

38. The compound of claim 1 wherein one of n or m is 1 and the other of n or m is 0, $X_1$ is $NH_2$, $X_3$ is $NO_2$, $R_2$ is —O—$C^*H(CH_3)R_c$ and $R_1$ is —$OR_a$.

39. The compound of claim 1 wherein one of n or m is 1 and the other of n or m is 0, $X_1$ is $NO_2$, $X_3$ is $N(R)_2$, $R_2$ is —O—$C^*H(CH_3)R_c$ and $R_1$ is —$OR_a$.

40. The compound of claim 1 wherein one of n or m is 1 and the other of n or m is 0, $X_1$ is $N(R)_2$, $X_3$ is $NO_2$, $R_2$ is —O—$C^*H(CH_3)R_c$ and $R_1$ is —$OR_a$.

41. An FLC mixture comprising the compound of claim 1.

42. A non-linear optical device wherein the non-linear optical material comprises a compound of claim 1.

* * * * *